US007698316B2

(12) United States Patent
Song et al.

(10) Patent No.: US 7,698,316 B2
(45) Date of Patent: Apr. 13, 2010

(54) UNIVERSAL KNOWLEDGE INFORMATION AND DATA STORAGE SYSTEM

(75) Inventors: Michael R. Song, Guilford, CT (US); Timothy S. Burress, Richmond, VA (US)

(73) Assignee: Cohesive Knowledge Solutions, Inc., Guilford, CT (US)

( * ) Notice: Subject to any disclaimer, the term of this patent is extended or adjusted under 35 U.S.C. 154(b) by 18 days.

(21) Appl. No.: 10/541,798

(22) PCT Filed: Jan. 9, 2004

(86) PCT No.: PCT/US2004/000527

§ 371 (c)(1),
(2), (4) Date: Jul. 8, 2005

(87) PCT Pub. No.: WO2004/063967

PCT Pub. Date: Jul. 29, 2004

(65) Prior Publication Data

US 2006/0277205 A1      Dec. 7, 2006

Related U.S. Application Data

(60) Provisional application No. 60/439,181, filed on Jan. 10, 2003, provisional application No. 60/482,171, filed on Jun. 24, 2003.

(51) Int. Cl.
*G06F 7/00* (2006.01)
(52) U.S. Cl. ..................................... 707/608; 707/665
(58) Field of Classification Search .................. 709/203; 707/102, 103
See application file for complete search history.

(56) References Cited

U.S. PATENT DOCUMENTS 5,265,207 A * 11/1993 Zak et al. ...................... 712/15
6,496,850 B1 * 12/2002 Bowman-Amuah ......... 709/203

(Continued)

FOREIGN PATENT DOCUMENTS

EP          1209599 A2 *  5/2002

OTHER PUBLICATIONS

International Search Report for PCT/US2004/000527, dated Sep. 28, 2004.

(Continued)

*Primary Examiner*—Neveen Abel-Jalil
*Assistant Examiner*—Vei-Chung Liang
(74) *Attorney, Agent, or Firm*—Michaud-Kinney Group LLP

(57) ABSTRACT

A system (100) is provided for storing knowledge, information and data (KID). The system includes a plurality of sources of KID (20), at least one receiver of KID (30) from the plurality of sources, a universal knowledge, information and data store (UKIDS 160) and an interface (150) coupling the receiver and the UKIDS. The interface provides a plurality of logical partitions (200) for storing KID within the UKIDS. In one embodiment, a first level of the logical partitions segregates information into personal and professional KID. A plurality of second personal levels under the first personal level (210) segregates KID storage into a teams of people subset (212), an activities and organization subset (214) and an organization and administration subset (216). A plurality of second professional levels under said first professional level (220) segregates KID storage into a clients subset (230), an output subset (250), a teams subset (270) and an administration subset (290).

19 Claims, 19 Drawing Sheets

U.S. PATENT DOCUMENTS

| | | | |
|---|---|---|---|
| 6,711,585 B1* | 3/2004 | Copperman et al. | 707/104.1 |
| 7,181,438 B1* | 2/2007 | Szabo | 707/2 |
| 2002/0002571 A1* | 1/2002 | Manohar et al. | 707/526 |
| 2002/0040369 A1* | 4/2002 | Multer et al. | 707/201 |
| 2002/0091686 A1 | 7/2002 | Keith, Jr. | |
| 2002/0194046 A1 | 12/2002 | Sullivan et al. | |
| 2003/0009518 A1* | 1/2003 | Harrow et al. | 709/203 |
| 2003/0065663 A1* | 4/2003 | Chu | 707/10 |
| 2003/0101153 A1* | 5/2003 | Francis et al. | 706/47 |
| 2004/0024775 A1* | 2/2004 | Kemp | 707/102 |

OTHER PUBLICATIONS

Mike Song, et al., The Hamster Revolution, Dec. 2006, pp. 81-104, Berrett-Koehler Publishers, Inc., San Francisco, CA.

* cited by examiner

FIG. 7

| | SENDER | DOCUMENT DELIVERED | DELIVERY LOCATION | DOCUMENT |
|---|---|---|---|---|
| 1 | SALES ADMIN. | ✉ TERRITORY COMPOSITION REPORTS | 1.CLIENT/GENERAL CLIENT INFORMATION/REPORTS | MONTHLY TERRITORY UPDATE REPORT NO MAJOR CHANGES |
| 2 | SALES ADMIN. | ✉ 003 04 NEW CAR POLICY COMING IN JUNE | 4.ADMIN/COMPANY CAR/NEW CAR POLICY | NEW CAR POLICY ONLY RELEVANT WHEN YOU HAVE OVER 50K MILES ON YOUR CAR |
| 3 | PUBLIC RELATIONS | ✉ 003 04 PRESS RELEASE ABC CEO .ms | 4.ADMIN/PR/CEO SPEECHES | OUR CEO'S POSITION ON WIDGETS AND THE ECONOMY |
| 4 | NEW ROSTER FOR SAN DIEGO DISTRICT | ▢ ROBAT DOCUME | 3.TEAMS/DISTRICT TEAM/ROSTER UPDATE | SHERYL KELLY INFORMATION ADDED TO ROSTER |
| 5 | HR | ✉ 003 04 MD LIST FROM HR.msg | 4.ADMIN/HR/BENEFITS PLANS/MDs | 2 NEW DOCTORS AVAILABLE THROUGH OUR HEALTH PLAN |
| 6 | MARKETING | ✉ 003 04 COPY OF YESTERDAY'S PRESENTAT | 2. OUTPUT/WIDGETS/MARKETING PRESENTATIONS | COPY OF YESTERDAY'S PRESENTATION ON WIDGETS AND THE AMERICAN WAY OF LIFE |

FIG.9

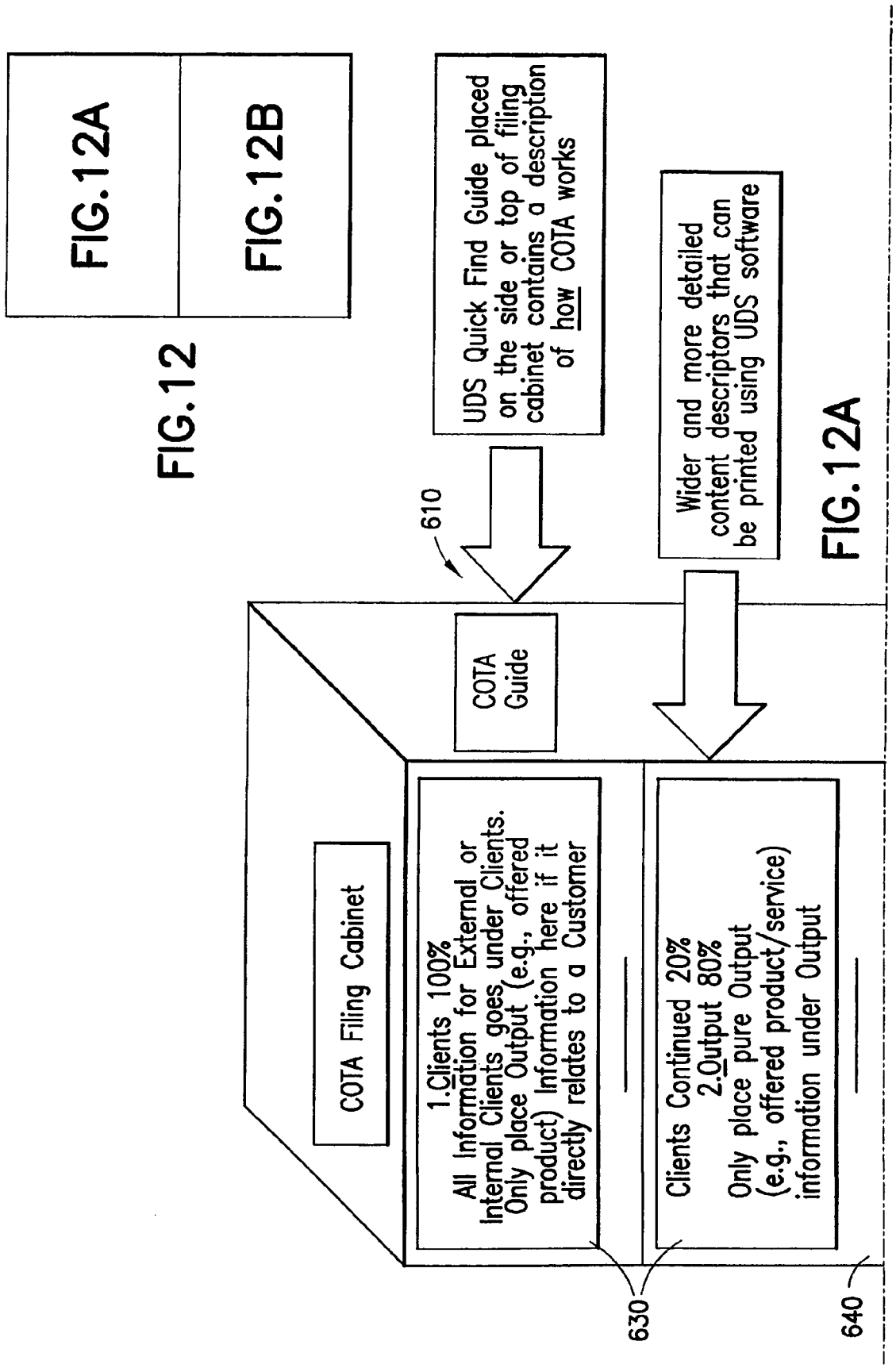

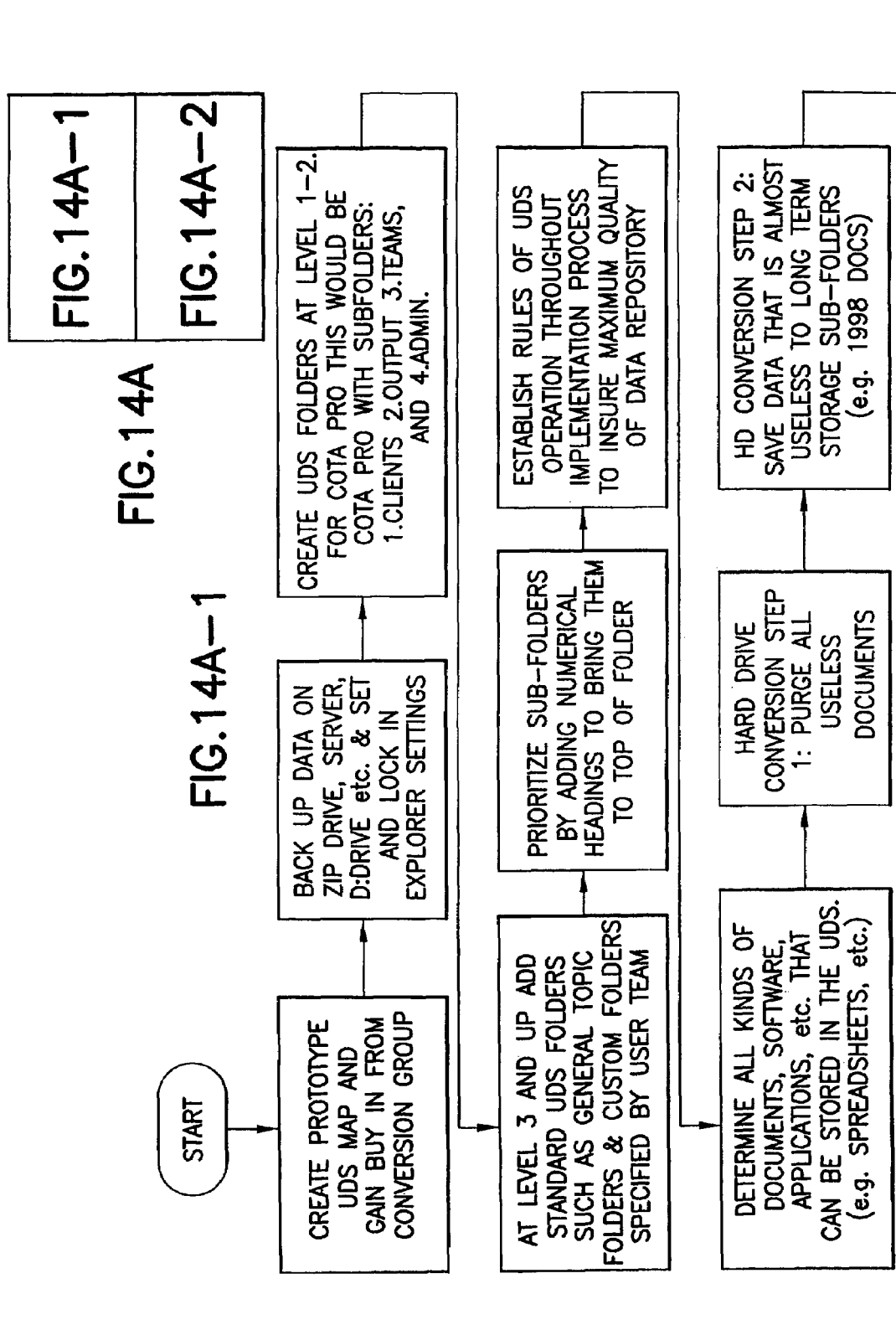

UNIVERSAL KNOWLEDGE INFORMATION AND DATA STORAGE SYSTEM

CROSS-REFERENCE TO RELATED APPLICATIONS

This patent application claims the benefit of U.S. Provisional Patent Applications Ser. No. 60/439,181, entitled "UNIVERSAL INFORMATION STORAGE MANAGEMENT SYSTEM AND METHOD" that was filed on Jan. 10, 2003 and 60/482,171, entitled "UNIVERSAL KNOWLEDGE, INFORMATION AND DATA STORAGE MANAGEMENT SYSTEM AND METHOD" that was filed on Jun. 24, 2003. The disclosures of these patent documents are incorporated by reference in their entireties as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to systems and methods for storing information such as, for example, electronic and printed "hard copy" documents and portions thereof, in a universal knowledge, information and data repository residing across multiple electronic and physical storage platforms.

BACKGROUND OF THE INVENTION

One problem facing people in today's information age is managing the volume of information that each person receives, reviews, stores and/or passes on to others. While computers and other electronic devices assist in these tasks, electronic forms of communication and duplication have themselves supported an explosive increase in the volume of information transmitted within the home and workplace. Experts describe people experiencing adverse physical and psychological affects of managing an ever-increasing volume of information as suffering from "information overload."

One aspect of information overload, for example, is an inability to locate a document or a portion of a document containing information of interest. Often, a person generally recalls seeing the information but cannot recall the specific content and wishes to review the information again. Regrettably, the location of the information is not known. Therefore, a search of electronic and/or printed copies of documents is performed to locate the information. As can be appreciated, this inefficient handling of information consumes time and generally leads to frustration.

In an attempt to increase the efficiency by which information is stored, individuals often employ customized naming conventions for storing electronic and printed information in electronic folders and/or filing cabinets. The aim of the customized naming convention is to describe information stored in the storage system to facilitate more efficient retrieval. While a naming convention may assist a first person that develops the convention, a second person or persons seeking access to the stored information typically does not understand the naming convention. This lack of understanding is particularly troublesome when the first person is not available to explain the convention and the second person needs the stored information to complete a job task. One example of an unavailable person includes an occurrence when a person leaves a job and a next person assumes responsibility for the job. Such responsibility includes locating and managing previously stored information.

Systems and methods exist in the art for managing information storage. For example, FIG. 1 depicts a simplified block diagram of an information management system 10 as is known in the art. As shown in FIG. 1, a plurality of sources 20 provide information to receivers of information 30. Sources 20 include, for example, paper 22 and electronic 24 information provided by hand delivered mailing systems such as, for example, internal office mailing systems, carrier services such as the U.S. Postal Service and FEDERAL EXPRESS® (registered trademark of the Federal Express Corporation, Memphis, Tenn.) or the like, and electronic systems such as, for example, email systems, time management systems, software application programs such as MICROSOFT® WORD™ (registered trademark of Microsoft Corporation, Seattle, Wash.) and LOTUS® NOTES™ (registered trademark of Lotus Development Corporation, Cambridge, Mass.) or the like. The receivers of information 30 include, for example, individual addressees 32 of the provided information that take receipt by hand or electronically via a computing device 34 such as a portable electronic device such as, for example, PDA, laptop computer or the like, personal computer, work station or terminal coupled to a mainframe computer. It should be appreciated that it is within the scope of the present invention for the computing devices 34 to broadly define all standalone and networked computing devices as are known in the art.

As noted above, information of interest to the receiver 30 is typically stored in at least one of a plurality of storage devices 40 for subsequent retrieval. Storage devices 40 include, for example, filing cabinets 42 for storing hand delivered information and/or printed copies of electronic information, electronic records 44 in files or database formats residing within memory devices (e.g., hard drives and other memory devices of the aforementioned computing devices 34).

A number of computer software applications running on the computing devices 34 provide mechanisms for storing and managing data. However, the inventors have found a number of deficiencies in such systems. For example, the use of such conventional systems typically yields divergent and counter intuitive data structures having information stored in non-standard and often incompatible storage devices. As noted above, stress and frustration increase as individuals attempt to find information of interest within these systems.

FIG. 2 illustrates a conventional data storage paradigm 50 wherein computer software applications and manual business processes (referred to collectively as information inputs 60) direct information to a user. The user evaluates the information and typically stores it in a data store. In the data storage paradigm 50, the data store corresponds to a process by which the user receives or evaluates the information. Since the user receives and evaluates information in a number of different ways, a plurality of unconsolidated, divergent data stores 70 are created. The divergent data stores include, for example, electronic files and data bases to paper-based filing cabinets. Generally speaking, the data stores 70 are created "on the fly" and, whether electronic or paper-based, include data stored in alphabetically ordered sequences.

Manufacturers of computer software applications have created many different kinds of data storage shells. In most cases, these shells are designed to hold only the data created by a particular software application. For example, a pre-set storage location for MICROSOFT® WORD documents in a WINDOWS® operating system environment is a hard disk file folder referred to as "C:/My Documents/WORD." Similarly, email is generally stored within the email application's hanging file folder system. In addition to these electronic applications, users may have manually stored information in, for example, filing cabinets, on their desktop, and on bookshelves. The inventors have observed that the aforementioned application/process specific storage locations contribute to the number of divergent data stores (e.g., stores 70) and make it more difficult for users to locate information within an increasingly large number of places. The resulting "clutter" contributes to the aforementioned "information overload" syndrome that is a challenge for almost every knowledge worker in the world.

While some computer software application such as, for example, Microsoft Corporation's WINDOWS operating system and EXPLORER file management system provide a frame of reference for accessing data stored in differing file folders by most software applications, there appears to be no common portal or universal data structure available to users. Complicating the conventional data storage paradigm (illustrated in FIG. 2), the inventors have observed that most employees have no rules or standards for their individual storage structures 70. As a result, each employee's storage structures, which include their library of stored documents, are unique and highly customized. The lack of storage rules and resulting high degree of customization is seen to cause the following business challenges:

(1) When an employee leaves an enterprise their successor(s) find it extremely difficult to understand and manage inherited information because only the departing employee understands their individually customized data storage structure.

(2) The lack of rules or standards causes most storage systems such as, for example, corporate data servers, and individual libraries of knowledge to degrade over time. One cause is that the vast majority of employees have no system of "breaking ties" between documents that could be placed in one or more folders within their data storage system 70. Another cause is that ninety-nine percent (99%) of employees do not appear to have a system in place that allows for a uniform data structure to be applied across all storage platforms (e.g., electronic and physical data storage devices).

(3) It is difficult to tell an employee where to put an important file or document because everyone has his or her own customized filing system. Similarly, it is difficult to advise an employee how to name files in a logical standardized way.

(4) Rarely does the typical person separate personal and professional documents within electronic and physical storage devices. As a result, a greater number of documents must be searched through before a document of interest can be located.

Efficiency experts market file management seminars and/or guides such as, for example, products and services of the Franklin Covey Co., Salt Lake City, Utah USA. However, there appears to be no entity that markets or teaches a specific, universal, concrete, and tangible information structure that is not employee, industry, or business unit specific. Most marketed data storage classes and systems help users to create a customized filing structure that matches their chosen vocation and storage style. Such filing structures are seen to include, for example:

(1) Data structures created for a specific individual, industry, vocation, or group.

(2) Data structures created "on the fly" by well intentioned individuals, the structures are customized in the sense that they have been slowly constructed over time in a fashion that even their creators find difficult to navigate after a predetermined period of time.

The inventors have found that the vast majority of these teachings do not direct trainees to merge or synchronize email hanging file folder system with other electronically stored information such as, for example, documents within a "C:/My Documents" hard drive directory to facilitate formation of a central data repository. As a result, employees are tasked with managing multiple and divergent data stores such as, for example, email hanging file folders, hard drive documents, various computer applications with separate data storage locations, filing cabinets, bookshelves for manuals, CD Rom libraries, etc., as illustrated generally at 70 of FIG. 2. There appears to be no existing product designed to synchronize, organize, and pare down these divergent structures. Since there is no guidance for organizing storage structures the inventors have found that there are almost as many divergent knowledge storage structures as there are people.

Accordingly, a need existing for systems and methods of providing a universal knowledge, information, and data store to simplify the process of storing and retrieving information and increasing personal and professional productivity and quality of life. As described herein, the inventors have discovered that such systems and methods based on the human thought process and the free enterprise model provide an efficient storage structure.

SUMMARY OF THE INVENTION

The present invention provides a system for storing knowledge, information and data (KID). The system includes a plurality of sources of KID, at least one receiver (30) of KID from the plurality of sources, a universal knowledge, information and data store (UKIDS), and an interface coupling the receiver and the UKIDS. The interface provides a plurality of logical partitions for storing KID within the UKIDS. A first level of the logical partitions segregates KID storage into personal and professional levels. A plurality of second personal levels under the first personal level segregate KID storage into a "teams of people" subset, an "activities and organization" subset and an "organization and administration" subset. A plurality of second professional levels under the first professional level segregate KID storage into a "clients" subset, an "output" subset, a "teams" subset and an "administration" subset.

BRIEF DESCRIPTION OF THE DRAWINGS

The features and advantages of the present invention will be better understood when the Detailed Description of the Preferred Embodiments given below is considered in conjunction with the figures provided, wherein:

FIG. 7 depicts a graphical user interface, in accordance with one embodiment of the present invention, for directly accessing the logical partitions of the UKIDS;

FIG. 9 depicts one embodiment of a summary direct deposit sheet detailing automated delivery of knowledge, information and data to a user of the inventive information management system;

In these figures, like structures are assigned like reference numerals, but may not be referenced in the description for all figures.

DETAILED DESCRIPTION OF THE PREFERRED EMBODIMENTS

Figure 1:
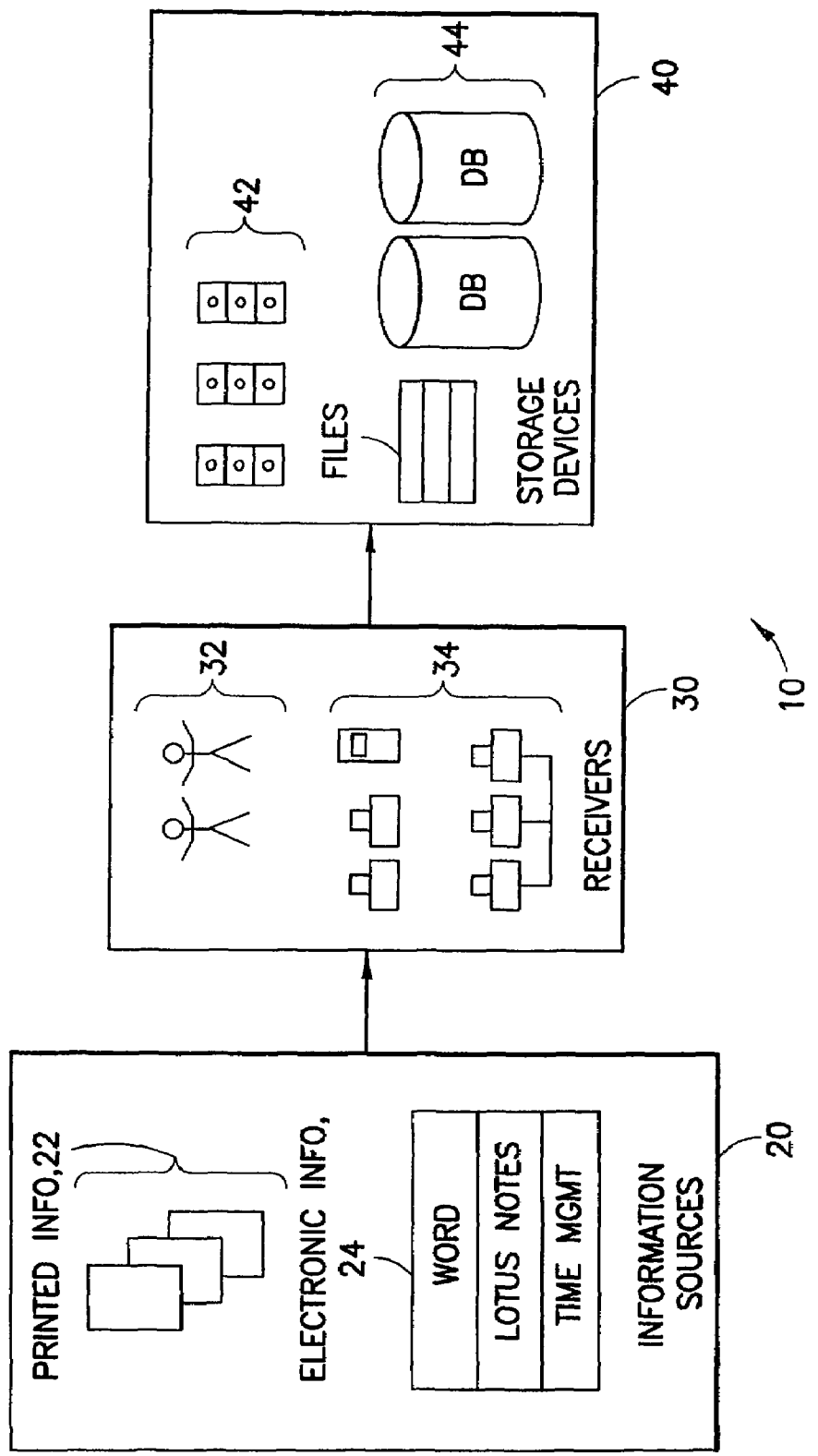
FIG. 1 is a simplified block diagram representation of a conventional information management system.
Figure 2:
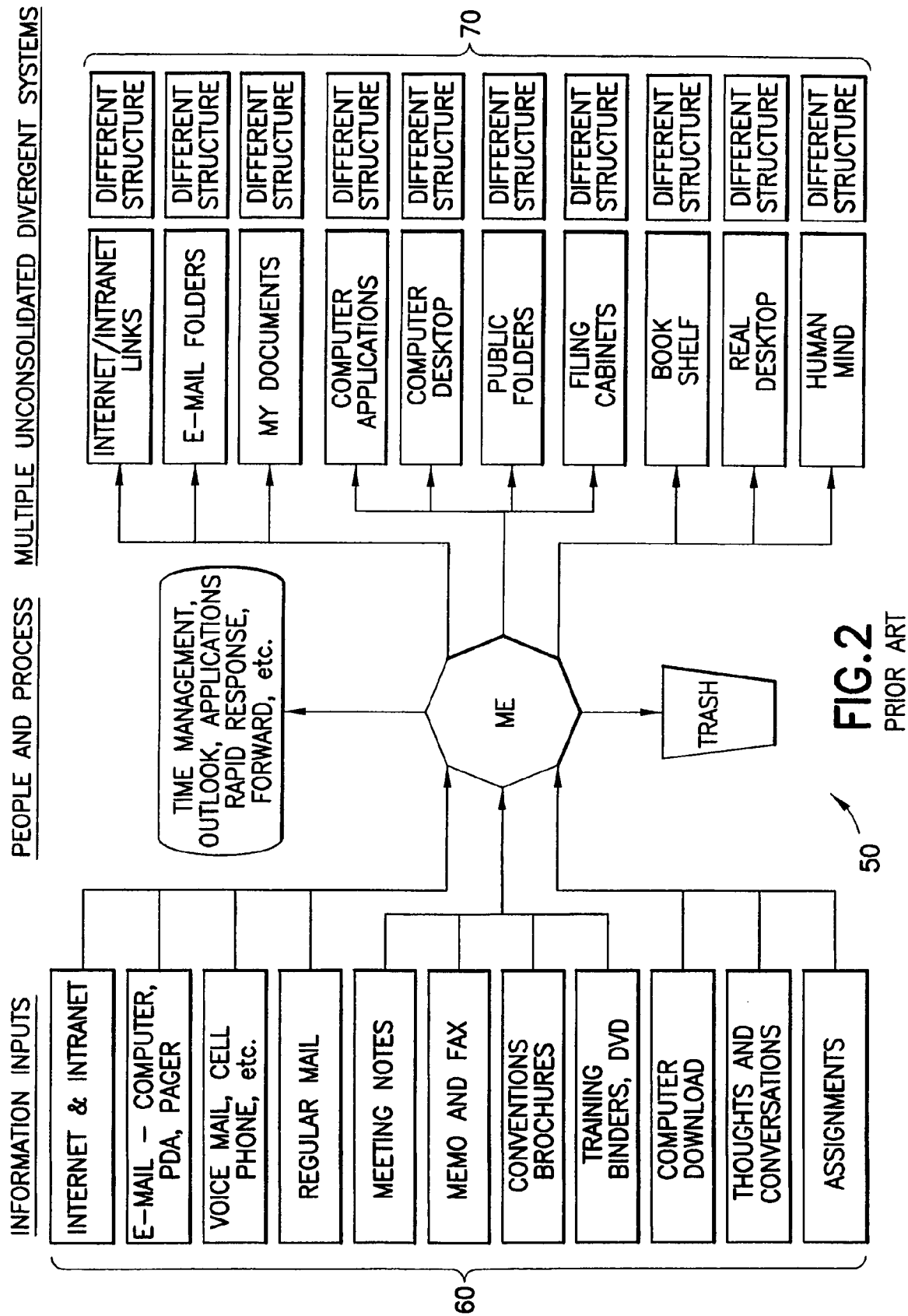
FIG. 2 illustrates a conventional data storage paradigm including a plurality of unconsolidated, divergent data stores.
Figure 3:
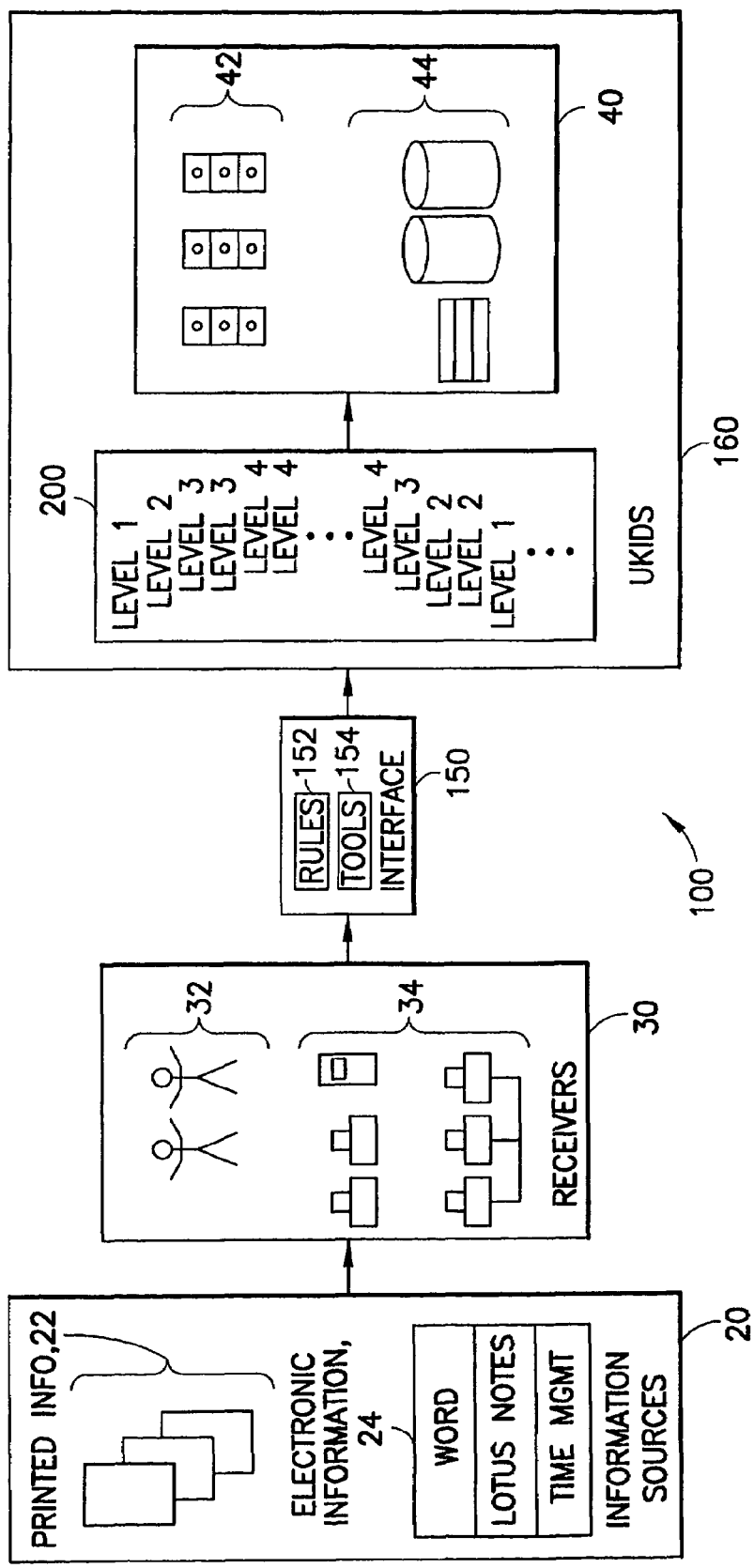
FIG. 3 is a simplified block diagram of an inventive information management including a universal knowledge, information and data store (UKIDS) configured and operating in accordance with one embodiment of the present invention.

FIG. 3 depicts a simplified block diagram of one embodiment of an information management system 100 configured and operating in accordance with the present invention for providing an interface 150 between the receivers of information 30 and a universal knowledge, information and data store (UKIDS) 160. In accordance with the present invention the UKIDS 160 includes the plurality of conventional data storage devices 40 such as, for example, the filing cabinets 42 and the electronic records 44 stored in files and database formats as well as a plurality of logical partitions 200 for accessing information (as described below) within the UKIDS 160.

In one embodiment the interface 150 includes rules 152 and tools 154 (as described herein) for configuring the UKIDS 160 and for storing and accessing information in the UKIDS 160 in a standardized, easily understandable and transferable manner. Briefly stated, the interface 150 enables a structuring of conventional data storage devices into a highly effective and universal library of cohesive knowledge (LOCK) that spans storage platforms (e.g., physical and electronic storage platforms).

As used herein, the term LOCK refers to a cohesive collection of information in the form of documents, and portions thereof, that an individual is responsible for creating, receiving, editing, storing, retrieving, and managing. Examples of such documents include computer generated items such as word processing documents, spreadsheets, e-mail, web pages, links, etc., and "hard copy" documents such as regular mail, meeting handouts, brochures, documents printed by users, notes taken in meetings, binders, books, CD ROM, forms, etc. Additionally, it should be appreciated that the term UKIDS is intended to broadly define a single, scalable, data management structure that is extended across virtually all data management platforms including, for example, computer hard drives, computer email archives, computer desktops, office desk tops, filing cabinets, bookshelves, and the like. In one embodiment, the rules 152 include manual and/or computerized processes, standards and instructions for storing knowledge, information and data within the UKIDS 160. In one embodiment, tools 154 include features and functions for presenting corporate news, internal and/or external advertising to users, utilities to facilitate storage within specific locations within the UKIDS 160 (e.g., described below as a data targeting button), backup and archive utilities and a security and/or locking feature (e.g., described below as a COTALOCK function).

Figure 4:
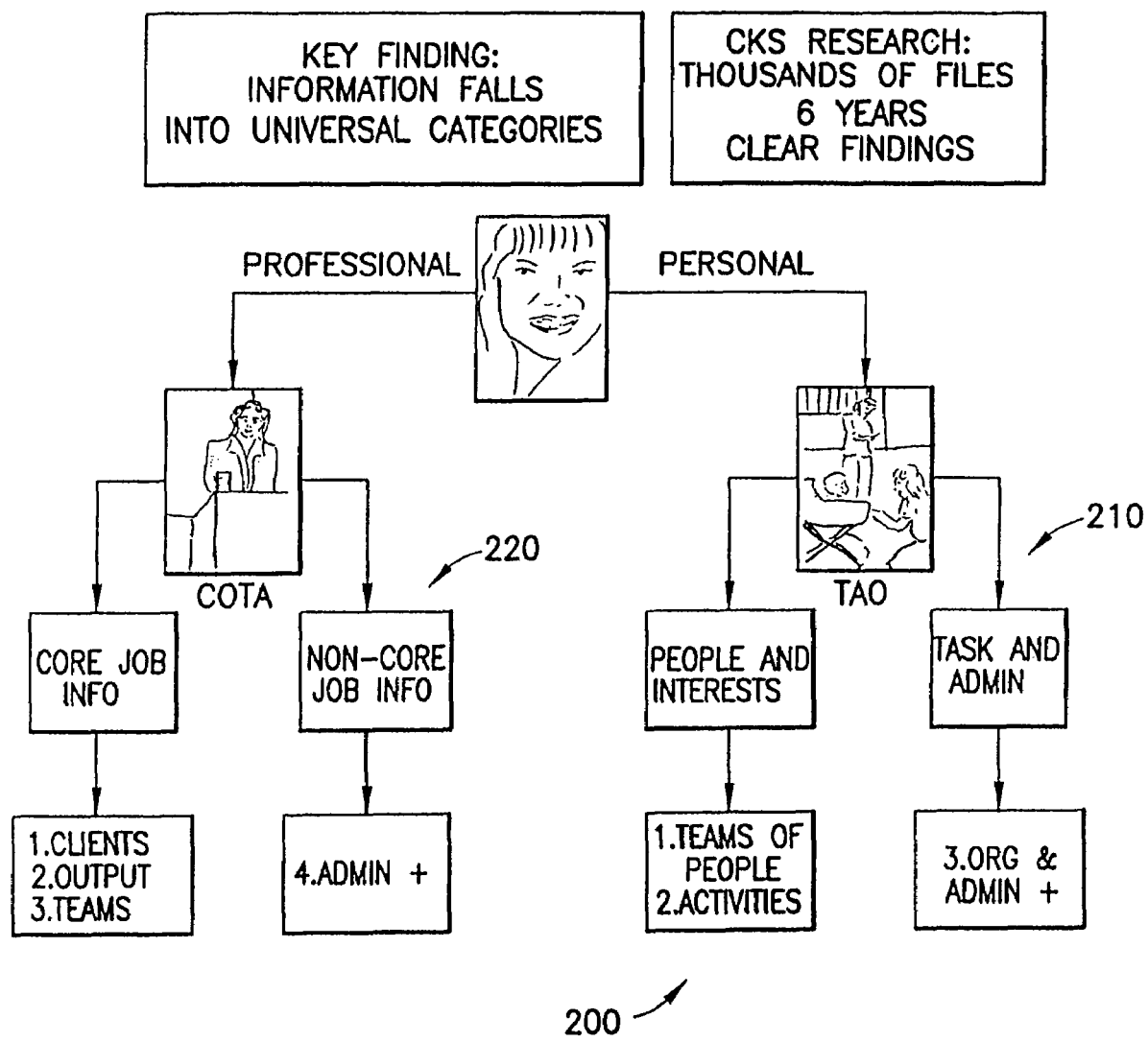
FIG. 4 is a simplified block diagram representation of logical partitions segregating knowledge, information and data stored within the inventive UKIDS.
Figure 5A:
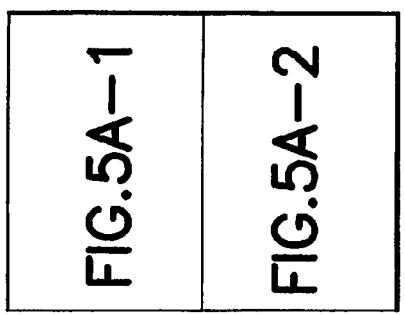
FIGS. 5A and 5B are detailed diagrams of the logical partitions of FIG. 4 in accordance with one embodiment of the present invention.
Figure 1:
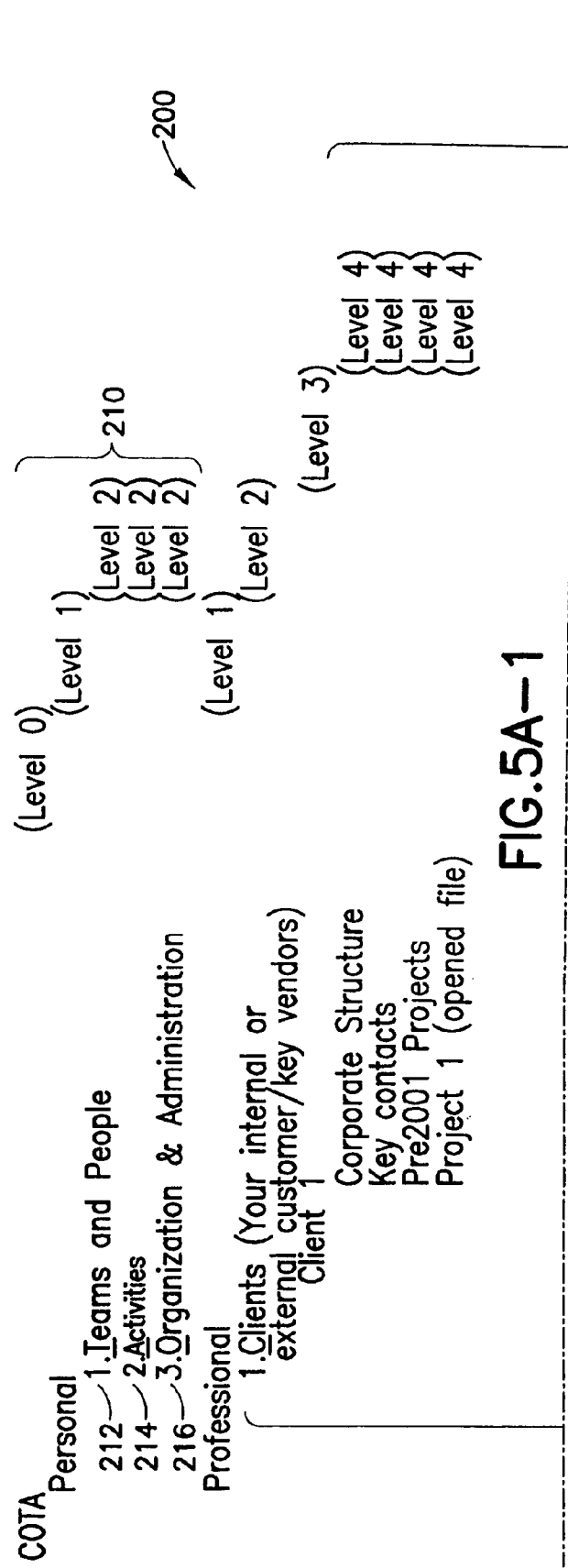
Figures 2, 5A:
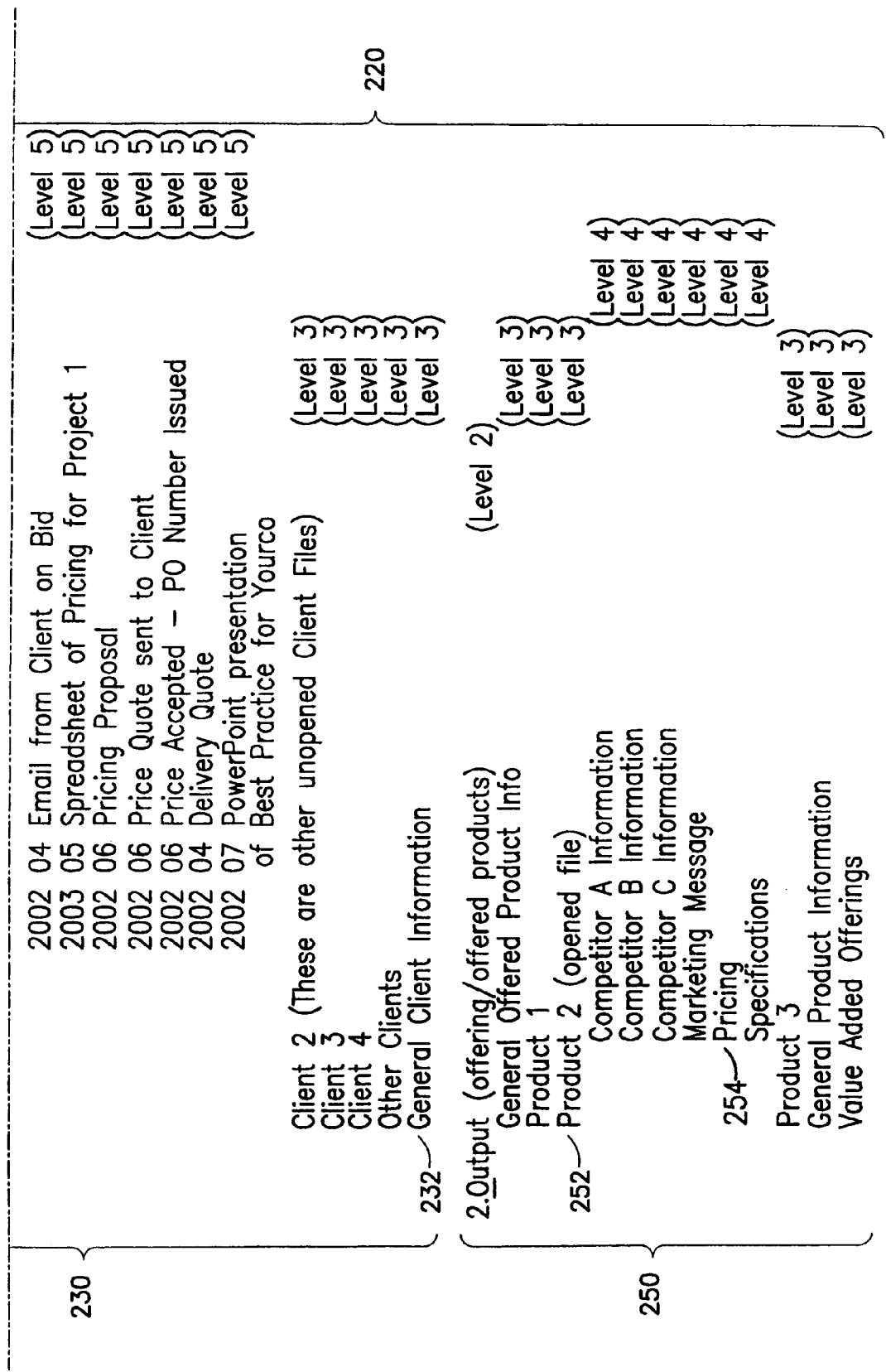
Figure 5B:
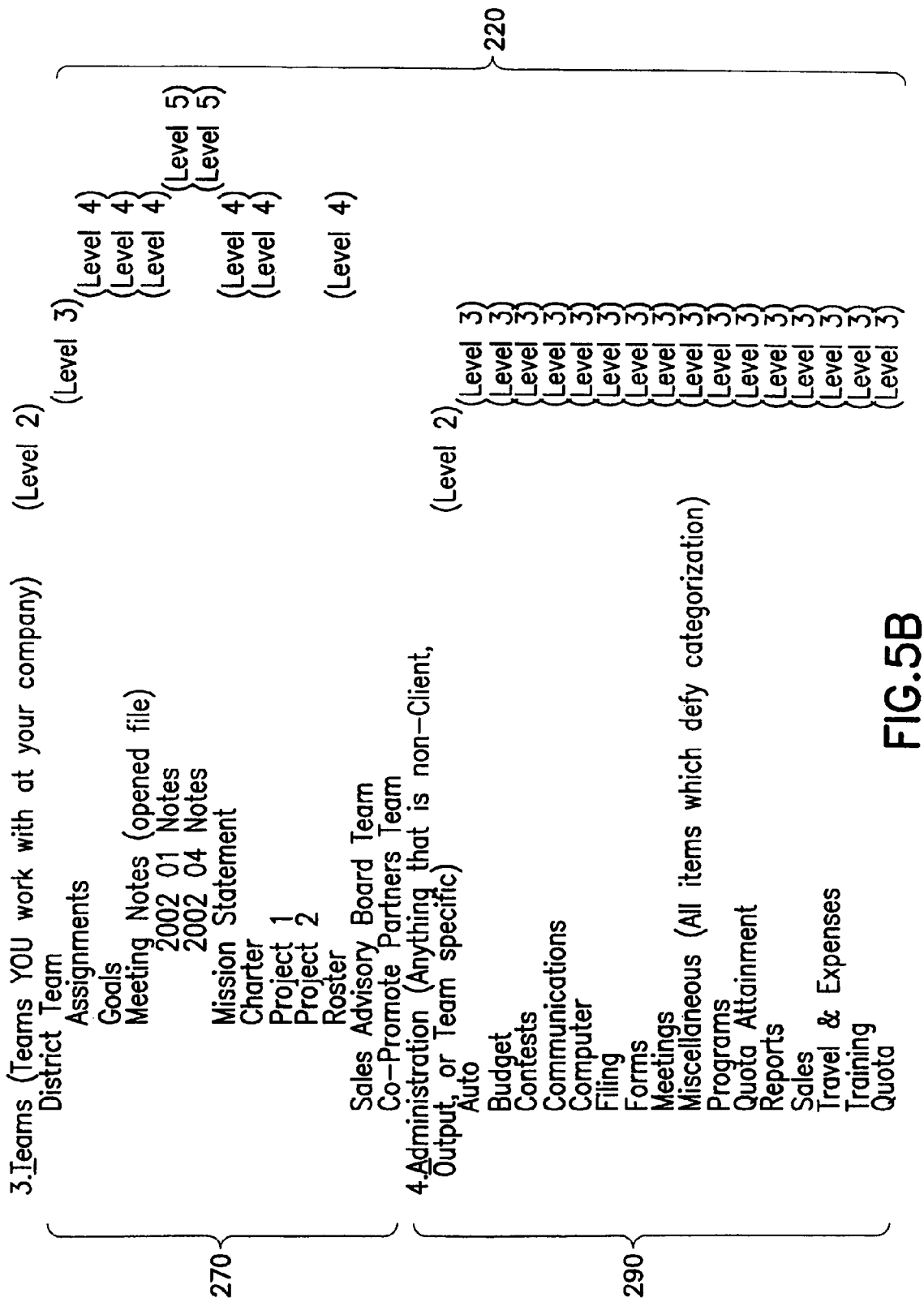

In one embodiment of the present invention the interface 150 and the plurality of logical partitions 200 segregate the UKIDS 160 into a multi-level scheme. As illustrated in FIGS. 4, 5A and 5B, a first level (Level 1) of the logical partitions 200 segregates information into "personal" and "business" information 210 and 220, respectively. The inventors have discovered that the separation of personal and professional information eases transition of a UKIDS from one person to a next person as personal, and perhaps private, information is not mistakenly passed along. A second level under the first "personal" subset 210 segregates information into "teams of people" 212, "activities" 214 and "organization and administration" 216 storage subsets. For example, in the "teams of people" subset 212 information is stored about family, friends, and the like. In the "activities" subset 214 information is stored about vacations, sports, entertainment, spirituality, hobbies, and the like. In the "organization and administration" subset 216 information is stored about home upkeep, bills and other financial concerns, and the like.

A second level (Level 2) under the first "business" level 220 segregates information into "client" 230, "output" 250, "teams" 270, and "administration" 290 storage subsets. For example, in the "client" 230 subset information is stored that pertains to philosophical groups of internal (within a company and/or organization) and external (outside the company and/or organization) clients, customers, patrons, consumers, constituents, client projects, markets, key vendors, sales territories, and the like. In the "output" subset 250 information is stored that pertains to products, services, processes, value added products and services, and any of the aforementioned offered/delivered to clients. In the "teams" subset 270 information is stored that pertains to groups, units, workforce, partnerships, collaborations, and any grouping of individuals that provide output to clients. In the "administration" subset 290 information is stored that pertains to the operation and coordination of the business, business services, workflow, personnel or any non-core job responsibility.

It should be appreciated that the interface 150 provides rules (e.g., the rules 152) for storing information within the logical partitions 200 in both electronic (e.g., computerized folders and databases) and printed formats (e.g., physical file folders and filing cabinets). A detailed overview of the interface 150 and its relationship with the UKIDS 160 is provided below.

Overview

As described herein, the data management system 100, hereinafter the COTA™ system 100 (COTA is a trademark of Cohesive Knowledge Solutions, Inc., Guilford, Conn.) provides a distinct structure, rules, layout, and creation process. The COTA System 100 implements a UKIDS having:

(1) a universal knowledge, information and data storage taxonomy (e.g., the logical partitions 200 of FIG. 4) modeled upon the human thought process and concepts of free enterprise wherein vocation knowledge, information and data (KID) is stored within one of the aforementioned "clients," "output," "teams," and "administration" categories, COTA categories 220, and non-vocational information is stored within one of the "teams of people," "activities" and "organization and administration" categories, TAO categories 210. The categories employed within the COTA system's 100 taxonomy 200 mirrors the human thought process of clustering and prioritizing KID. The prioritization reflects core values of the free enterprise system wherein "clients" are assigned a top priority, "output" is provided by "teams", and "administration" while necessary, is not emphasized, as it is a by-product of most enterprises.

(2) the COTA system 100 taxonomy 200, while standardized, is flexible such that the universal categories of storing KID adapt to the particular needs of an industry, company, business unit, department within a company, group and/or team within a department, and individuals. For example, "clients" of a company's Human Resources department include other departments of the company such as the Sales department, Accounting department and the like. On the other hand, "clients" of the Sales department include external customers of the company. The COTA system's 100 taxonomy 200 is applicable at each.

In addition to its universality, other attributes of the inventive COTA system 100 include transferability, extensibility and scalability. By transferability, the inventors are referring to the ease at which KID is shared across an organization. For example, when all employees of an organization are using a universal storage methodology (e.g., the COTA system's 100 logical partitions 200) KID transfer is easier when:

(1) on-boarding—When a new employee arrives they can inherit a UKIDS that can be easily understood, navigated and leveraged. For example, by referring to the UKIDS COTA subsets 220 and, more particularly, the "clients" subset 230 clients of the organization are immediately visible as is KID pertaining to the clients.

(2) information targeting—Currently, senders transmit information to receivers who store information based on their judgment and their highly individualized storage systems. As a result, senders generally have a low level of confidence in the ability of receivers to accurately store and leverage information sent. When all members of a team employ a UKIDS members can target information to each other because there is a greater level of standardization. A UKIDS creates opportunities for senders to suggest an actual location for the storage of important information.

The COTA system 100 is extensibility as it spans all data storage platforms including computer hard drives (standalone and server based), backup and recovery media, off-line media such as, for example, zip drives and the like, as well as hard copy storage systems such as bookcases, filing cabinets, desk tops, and the like. In effect, the COTA system 100 consolidates all KID storage into a single, central repository (e.g., the UKIDS 160).

Figure 6:
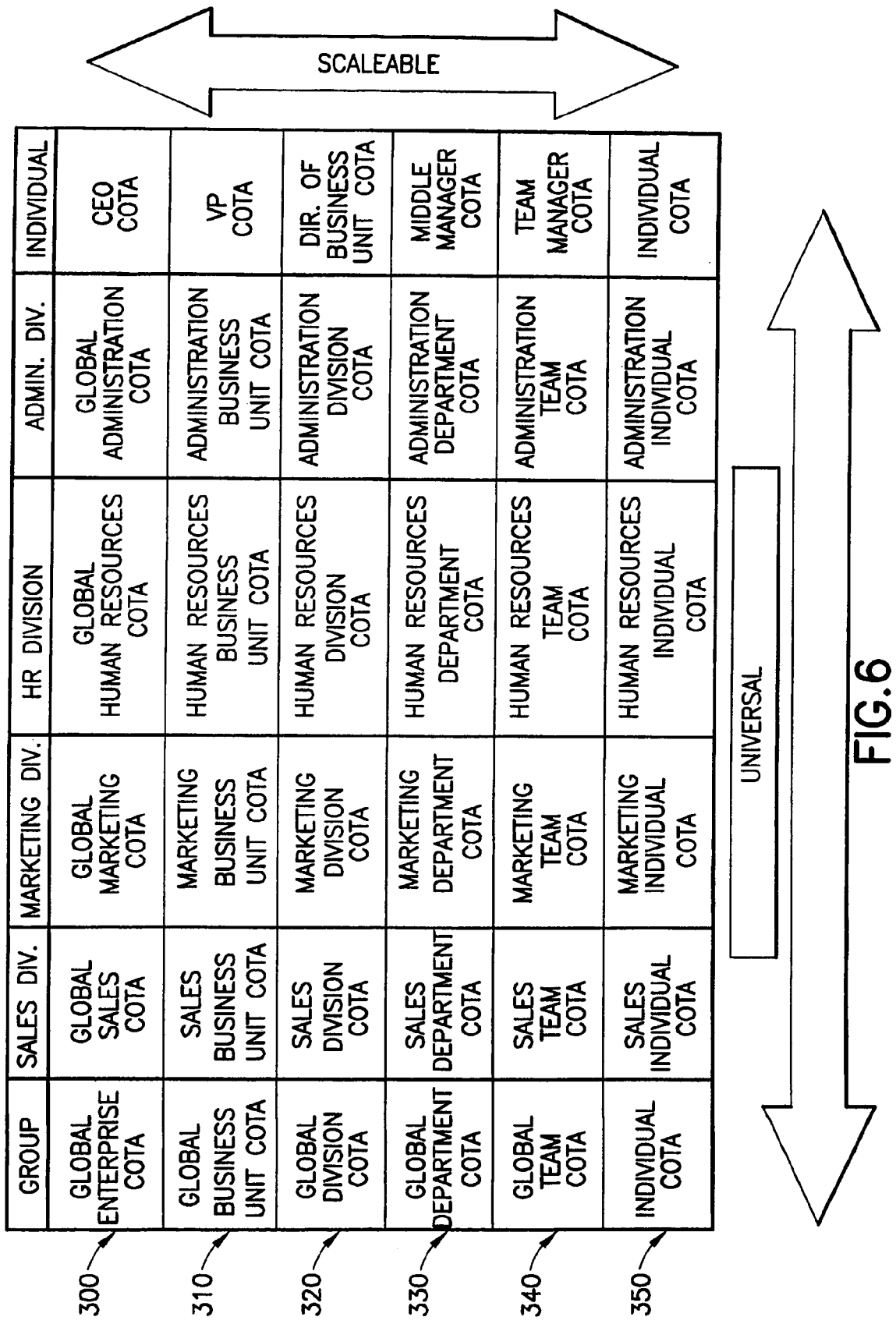
FIG. 6 is a chart illustrating scalability and universality of the inventive information management system.

As illustrated in FIG. 6, the COTA system 100 is scalable as it applies globally from an enterprise view down to an individual's view of their COTA categories. Accordingly, executives can develop a global, enterprise wide COTA model or shell 300. The enterprise COTA shell 300 is based upon the organization's mission, charter, priorities, values, and goals. In other words, executives can identify a priority for "clients," "outputs," "teams," and "administration" for the entire organization. Selected KID can be stored by executives and/or other approved employees under each heading. The enterprise COTA shell 300 is then passed throughout the enterprise's hierarchy to facilitate and implement business planning. As described above, each level of an organization can access the enterprise COTA shell 300 as well as individual COTA shells such as a business unit COTA shell 310, division COTA shell 320, departmental COTA shell 330, team COTA shell 340 and personal COTA shell 350. One perceived advantage of this facility is that it is seen to add value to the "public folders" concept because it provides an easily understood place for people to find group information. This is seen to create a more coherent management process. For example, if an organization is shifting its focus towards a new or different client base, this shift in focus can be identified under the enterprise COTA shell's 300 "client" category by the executive team. Similarly, the enterprise COTA shell's 300 "output" category details output and value added outputs offered by the organization. The enterprise COTA shell's 300 "teams" category provides an organizational chart for the entire company. The Teams category can include mission statements, rosters, calendars, etc. for each major business unit, division, etc. The enterprise COTA shell's 300 "administration" category contains a variety of administration guidelines, forms, benefit outputs, etc. The scalability of the COTA concept insures that every employee trained to use the COTA system 100 (from executive to associate) instantly understands the enterprise's mission, objectives, etc. and can locate KID in a more efficient manner.

In addition to its universality, transferability, extensibility and scalability, another attribute of the inventive COTA system 100 is that it promotes the creation of a virtual mentoring environment (VME) that:

(1) simplifies the pathways to KID and applications by reverse engineering the pathways from the human thought process;

(2) provides a clear set of guidelines (e.g., rules 152) and signposts (logical partitions 200) along the path;

(3) imparts a basic business values system that keeps all workers in touch with reality of business priorities set by the company (e.g., enterprise wide COTA categories); and (4) while providing individual guidance and letting each level of an organization define and express its priorities (e.g., by maintaining divisional, departmental and individual COTA categories), the VME focuses KID storage around the principles of given vocations. For example, the COTA system 100 is designed to recognize the fluidity by which people move in and out of job positions. While people move, the responsibility of various jobs do not. With these responsibilities comes the need to manage KID particular to a given job assignment. Therefore, the COTA system 100 emphasizes the importance of structuring and managing KID in a standardized manner at the job assignment level to ensure the stability of KID as people move into and out of job positions.

Figure 7:
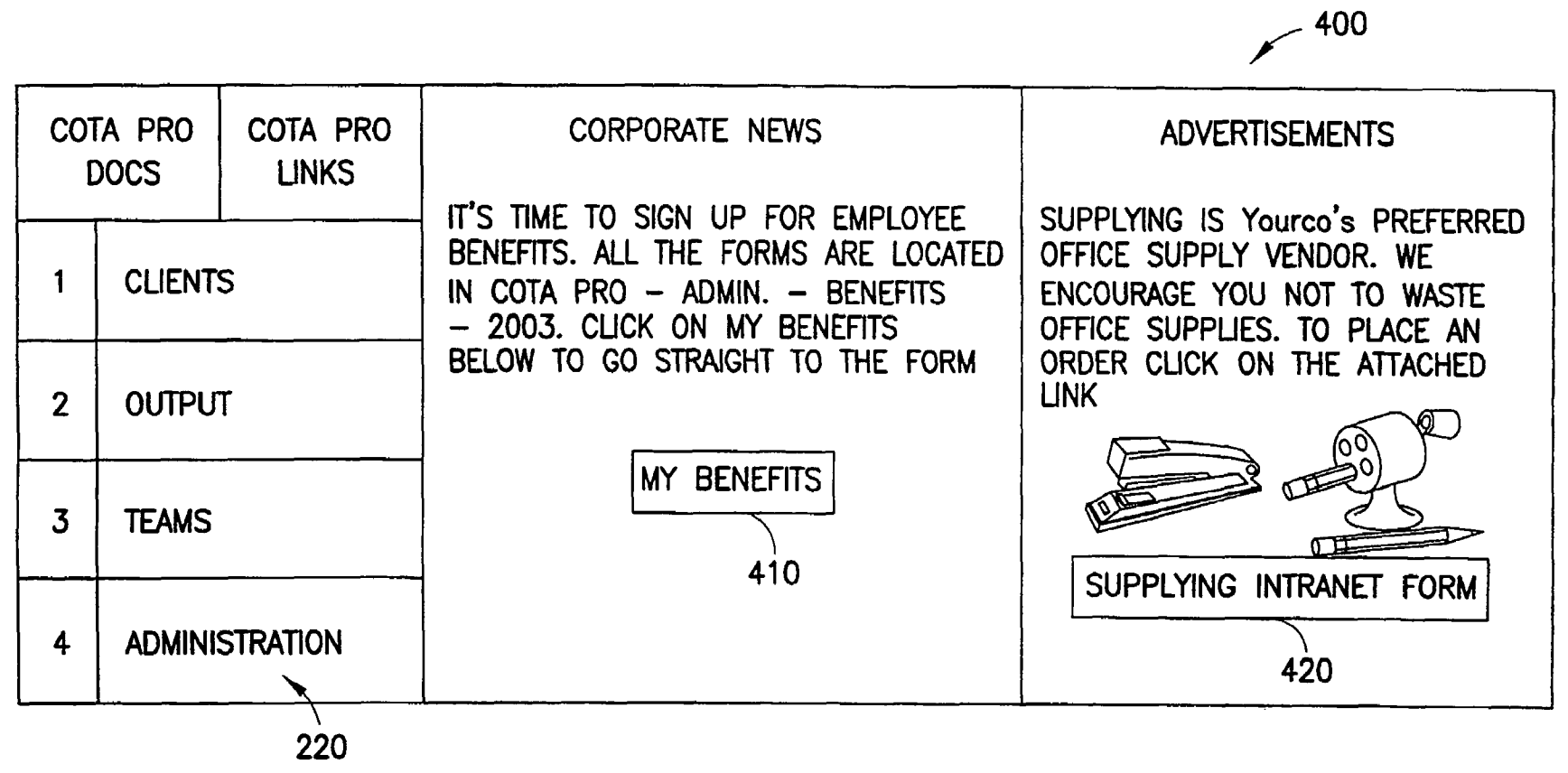

FIG. 7 depicts one embodiment of the interface 150 represented as a graphical user interface shown generally at 400 and referred to hereinafter as a portal. The portal 400 leverages the COTA system's 100 logical partitions 200 so that a user can navigate the TAO 210 and COTA 220 subsets directly from the portal 400 to access KID stored in the UKIDS 160. In one embodiment, the portal 400 is launched from a user's personal computing device and provides access, via the TAO 210 and COTA 220 subsets, to electronic KID residing not only within the user's personal computing device, corporate file server, etc., but also to Intranet and Internet KID. In effect, the portal 400 provides a single context-based location that users can use to access electronic KID. In one embodiment, Internet and Intranet KID is deposited directly into the COTA system 100 such that users do not follow links to external websites. As such, the KID is directly viewable from within the COTA system 100. In one embodiment, differing icons provide a visual representation of the source of KID, e. g., whether it is a document that was previously stored by a user in the UKIDS 160, an Internet or Intranet document.

As described below, the portal 400 presents and/or provides a vehicle for launching one or more of the tools 154 for invoking additional functionality of the COTA system 100. For example, the inventors envision that use of the portal 400 will exceed traffic on every other communication medium available to an organization including Intranet, Internet, regular mail, etc., in part because employees spend so much time storing and retrieving KID. The portal 400 is designed for strategic deployment by an organization to save money and time in the following ways:

(1) tasks like benefits sign up are auto-facilitated through a screen on the portal 400, for example, My Benefits 410 command for initiating an employee benefit review at FIG. 7.

(2) employee specific data is downloaded into the COTA system's 100 logical partitions 200 and users are notified via messages posted on the portal 400. A list of downloads can be made available at the click of a mouse.

(3) links into the company's LOCK can be established at the portal 400 facilitating a rapid retrieval and recovery of key forms and KID.

(4) the portal 400 can be positioned on the employee's computer desktop and could sort software applications in accordance with the COTA system 100 function. This creates even greater visibility for advertisements and announcements.

(5) the portal 400 can highlight urgent corporate announcements. In other words, if there is an important on-line town meeting, it could be viewed through the portal 400 so that the employee need not operate an unfamiliar software system. This adds value to the web meeting function and draws additional attention to the portal 400.

(6) when Intranet/Internet websites are designed they can be patterned after the portal 400 to create a familiar and easy to navigate Intranet site. The portal 400 provides a common visual layout for locating information.

(7) the high cost of attaining employee shelf space could be reduced by partitioning actual shelf space within the COTA system 100 structure with back up reminders placed on the portal 400. Newsletters, email, posters, audio tapes, and binders could be replaced by a less expensive COTA category 200 data targeting delivery mechanism (described below). Notices of delivery can be posted on the portal 400.

(8) advertisers such as preferred corporate vendors could advertise (for a fee) to employees on the portal 400. For example, if the company gets a rebate from a large office supplies vendor for exceeding a certain dollar volume of orders, it may be important to continually inform employees NOT to go to more expensive local vendors but stay with the preferred corporate vendor. Such a message (e.g., link 420 to a form) can be conveyed via the portal 400 at a cost savings to the corporation due to volume rebate, special contract pricing, and possibly advertising revenues charged to the vendor. The portal 400 can trigger certain advertisements and corporate announcements when a worker accesses a particular form or portion of KID. If they have accessed an outdated form, the COTA system 100 warns them that use of the form has been discontinued. When they access a benefits document, the COTA system 100 triggers information or advertisements related to benefits. For example, project management software could be mentioned when new project folders are created. The portal's 400 visibility to the COTA system's 100 TAO categories 210 offers additional opportunities for advertising personal items to employees. Other advertising could include, business unit messages, i.e., information technology department instructions and a computer fixes, human resource department policy changes, holiday card or gift ordering from a preferred vendor, printable discounts to employees offered by key area vendors (e.g., caterers, etc.), corporate sponsored charitable appeals, corporate seminars and training availability, corporate team updates, video message from executives regarding key events, etc.

(9) one or more locations accessible with the portal 400 can be configured to provide access only to approved personnel, e.g., sensitive corporate or personal KID can be password protected.

While described above in terms of a graphical user interface, it should be appreciated that the portal 400 should be interpreted broadly and therefore may be implemented in other ways.

Rules of Operation

As shown in FIGS. 3 and 4, users of the COTA system 100, acting through the interface 150, employ a specialized set of rules 152 that define the method for allocating KID within one of the COTA 220 and TAO 210 categories. Exemplary rules of operation include the following.

1. Central Computer Repository Rule—Save all KID to the COTA system's 100 UKIDS 160 under the TAO 210 and COTA 220 categories. When dealing with electronic KID, some predefined software application storage location defaults should be overridden, e.g., MICROSOFT® WORD's "C:\My Documents\Word" default. The inventors have discovered that fewer storage locations equates to greater ease of navigation and higher productive.

2. Maximum Extensibility Rule—Extend the COTA 220 and TAO 210 categories to every storage platform. The logical partitions 200 span such storage structures as computer hard drives, mainframe and file servers, Intranet and Internet websites, email applications, public folders, portable electronic devices (PDAs), computer links, computer desktop, real desktop, filing cabinet, CD ROM libraries, bookshelves, and the like. The goal is to implement one storage system.

3. Hierarchy Sortation Rule—Use the logical partitions 200, e.g., Level 2 COTA 220 and TAO 210 categories, as a vertical sort to break ties between KID (e.g., folders or documents) that could be placed in more than one location. For example, a client widget proposal could be placed under: (1) COTA/Clients/Client Name/Widget Proposal or (2) COTA/Output/Widgets/ClientName/Widget proposal. Under the COTA category 220 hierarchy, option (1) is selected as "clients" 230 is a priority over "output" 250 subsets (FIG. 5A).

4. The "General" Category Rule—When a document references more than one "client," "output," or "team" category, that document is placed in a "general" folder 232. This breaks the tie for items referencing more than one category and makes retrieval easier by eliminating storage of documents in repetitious subsets.

5. Strategic Labeling Rule—Label all KID documents, including out going email and email attachments, in the following fashion "Year-Month-Clear Title." For example, an email sent in May 2002 containing widget market share information should be labeled "00205 Widget Market Share May." Label outgoing email titles using the COTA system 100 methodology such that receivers do not have to re-label the message when saving it. Label hard copy documents either by hand or computer using the COTA system 100 methodology. Preferably, hard copy documents are labeled on an edge that is at the horizontal top of the document as the document is placed in a file folder. Labeling with bold magic marker is also preferred.

6. Prioritization Rule—Whenever confronted by an increasingly large number of hanging file folders (e.g., greater than fifteen (15) folders), high priority folders should be brought to the top of the sort by use of a numbering system. For example, "1. Big Customer" brings the "Big Customer" to the top of the folders. The inventors have discovered that the numerical assignment system assists relational database search engines because they represent an additional layer of prioritization.

7. Maximum Availability Rule—Place the icons representing the COTA categories 200 (e.g., TAO 210 and COTA 220 categories) on desktop and time management program status bars (e.g., MICROSOFT® OUTLOOK shortcuts bar). Place the COTA system 100 guides, maps, and labels (as described below) on filing cabinets, shelves and other paper data repositories. Doing so provides an intuitive and familiar pathway to locate KID.

8. Filtration/Needle in Haystack Rule—Any element within the COTA system 100 UKIDS 160 that requires searching for one document or folder amongst greater than twenty-five to fifty (25-50) options should be considered a target for re-organization through sub-categorization. For example, if your computer desktop of list of computer links exceeds seventy (70) choices, reorganize it.

9. Purge Rule—Once a year, documents are separated into three groups: 1) Documents that are needed; 2) Documents that are probably not needed but are kept on hand; and 3) Documents that are not needed any longer. Under the Purge rule, the first category is left alone, the second category is placed into a storage folder marked storage documents from a previous calendar year (e.g., 2002), and the third category is purged.

10. Personal Suitcase Rule—When an employee leaves a position, a copy of their TAO category 210 KID is moved to off-line storage (e.g., a diskette (s), zip drive, CD ROM, etc.) and then the TAO category items are deleted. The employee may take the TAO category 210 items to their next position and reinstall it in their new COTA system 100 UKIDS 160.

11. COTA Virtual Tour Rule—Before an employee leaves a current position, they give their successor a guided tour of the COTA system's 100 COTA category 220 items. Important KID is identified. If the successor does not know the COTA system 100 methodology, they are instructed in its features and functions by, for example, a COTA Mentor (described in detail below).

12. KID Targeting Rule—When sending a document or attachment that might need to be saved into the COTA system 100 UKIDS 160, a suggested storage location should be provided to recipients, e.g., "COTA, Output, Product 2, Pricing" directs a recipient to store the document or attachment in the "COTA" category 220, under the "output" subset 250, in a "Product 2" subset 252 and in a "Pricing" folder 254 (FIG. 4).

13. Filing Cabinet and Shelf Rules—File cabinets, shelves, CD ROM library, etc. are arranged to reflect the COTA methodology's logical partitions 200 (e. g., TAO 210 and COTA 220 categories). Cabinet folder holder tags are placed on the left and label using, for example, magic marker. As new documents are added, they are placed at the front of all folders. Important forms are labeled with a horizontal label so they are easily retrieved.

14. Hard Copy Filing Rules—Hard copy filing is viewed in a continuum, e.g., from receipt (at a mailbox, tradeshow, office, in box, create and print, receive and print) to desktop, to filing cabinet or shelf, to long term storage. Guidelines are established for when a document or binder belongs in each location. All physical storage locations (cabinets, shelves, etc.) are labeled using the COTA system 100 logical partitions 200. Standards are established for how many folders are on a person's desktop. Real and virtual desktops are not used as long term storage silos.

15. Content Rule—Folder names should describe the contents of the folder. They should not be named after software applications used to create them or documents stored in them, for example, a "Word" folder named after MICROSOFT® WORD. Documents should not be named after the person that sent or created it, for example, names like "Boss' Directives" or "John's Stuff" are inappropriate. A folder named after a sender creates additional locations for information and degrades the accuracy of the data management system. Use content as a guide for all folder names. For example, when storing a document ask "what (content) does this mean to me (context)?" The answer should be "this document contains information on my client "Client 1" that I may be able to use to close a sale next month". Such an answer would guide storage under "client 1". Answers that dictate location within a KID storage facility should not be "this is something that Dave sent me" or "this is a MICROSOFT® WORD document."

16. Suspension of Rules—Suspension is acceptable only if a viable case can be made. For example, a rare number of outdated software packages currently exists that may not be able to process a character space in a document title. Another example might be to override the hierarchy at level 1 in order to assign a predominately administrative task that vaguely references a Client (s).

17. QDOT—Quality Degradation Over Time Rule—When two potential storage sites for a single document exist, the quality of the storage system degrades over time. The rules of the COTA system 100 are designed to virtually eliminate this possibility through sortation, filtration, prioritization, etc. However, vigilance is required to recognize and repair QDOT situations that arise with long term usage of any system of organization.

18. Email Commandments, ten (10) rules for quality improvement and ten (10) rules for quantity reduction and quality improvement. The quantity reduction commandments address a goal of reducing email volume by ten percent (10%). The quantity reduction commandments include:

(1) Golden Rule—Only send what you would truly want to receive on a busy and exhausting day.

(2) Diversion—Use filters to eliminate junk mail. Create alternative email boxes to proactively divert junk mail.

(3) Limit Exponential Diffusion—Only use distribution lists, "CC," and the "Reply To All" command when absolutely necessary.

(4) Use the following COTA system 100 codes to reduce unnecessary responses:

NRN: No Reply Needed (e.g., I'm incredibly busy today)
NTN: No Thanks Needed (e.g., I'm incredibly busy today)
ELP: Extremely Low Priority (Open Later or Delete if busy)

(5) Elimination of serial jokesters and serial thankers will reduce output by 50-100%.

(6) Go "2 for 1" by combining e-mail messages to a particular recipient or group of recipients.

(7) End Death Spirals (infinite mega threads) by picking up the phone.

(8) Periodically review COTA system 100 email commandments with all teammates.

(9) Aggregate low priority, "FYI Only" messages. Instead, post information to public folders, bulletin boards (electronic or physical) or intranet sites.

(10) Take a team approach to email reduction. If a team improves together there will be more time for what matters most.

The inventors have discovered that a ten percent (10%) reduction in email messages can eliminate eleven (11) continuous hours spent answering email per year for an employee receiving fifty (50) messages per day. For example, 50 email/day×5 days/week×52 weeks/year=13,000 email messages/year; 13,000×30 seconds of time saved/message=390,000 seconds saved; 390,000 seconds=108.3 hours/year answering email×10% time saved=10.8 hours/year saved by following the aforementioned quantity commandments per employee.

The quality improvement commandments address a goal of reducing email volume by twenty percent (20%). The quality improvement commandments include:

(1) Golden Rule—Only send a message if it would be important enough for you to read on a busy and exhausting day.

(2) Clearly label and code the "subject line" of the email message as noted below so that the recipient (s) know exactly what you need them to do:

AR Action Required
ANR Action Not Required
MITO Message In Title Only
FYI For Your Information Only (3) Send messages that are concise, short, simple, and easy to read.

(4) Highlight action steps or key points with two to four (2-4) bullets.

(5) When forwarding or replying, re-title and edit message for maximum clarity.

(6) COTA's Composition Rule—The time investment for composing a cohesive email message should grow with the number of receivers.

(7) Attachments—Avoid unnecessary attachments unless they are absolutely necessary. Make sure that all attachments are clearly identified and ordered to minimize evaluation time for recipients.

(8) Document Targeting: If the recipient(s) is using the COTA system, give them the destination path for important messages that must be saved.

(9) Use language that can be easily understood by all potential receivers.

(10) Include your contact information in auto signature to help receiver's respond to your message through phone, fax, or mail.

The inventors have discovered that a twenty percent (20%) reduction in email messages can eliminate twenty-one and one half (21.5) continuous hours spent answering email per year for an employee receiving fifty (50) messages per day. For example, 50 email/day×5 days/week×52 weeks/year=13,000 email messages/year; 13,000×30 seconds of time saved/message=390,000 seconds saved; 390,000 seconds=108.3 hours/year answering email×20% time saved=21.66 hours/year saved by following the aforementioned quality commandments per employee.

Referring again to FIG. 3, users of the COTA system 100, use the interface 150 to launch one or more tools 154 that access features of the COTA system 100. Exemplary tools 154 include the following.

1. COTA Map

The inventors have discovered that users often struggle to manage extremely large document libraries. The users have no way to guide themselves and others to the appropriate location of information within their computers and offices. This increases the difficulty of finding information and on-boarding new employees.

The COTA system 100 leverages the COTA categories 200 to provide either a hard copy or digital "map" describing the location of KID within the user's UKIDS 160. The digital version is operated with the same nested file folder approach as the hard copy version.

A COTA Map is used to:

(1) Educate new users who inherit a UKIDS system.

(2) Remind the user where information is located on any storage silo. For example, the COTA Map placed on shelf reminds a user where binders are located.

(3) Help the user transfer a UKIDS or storage structure to another storage silo. For example, a hard drive structure may be transferred to a filing cabinet using a COTA Map to direct creation of folders and storage of KID within the folders.

(4) The COTA Map process may include generation of labels and folder tabs, etc. for filing cabinets and shelves.

In effect, the COTA Map shows people where KID is and/or should be stored.

As described in detail below, the COTA Map of an entire UKIDS structure is stored in a computer file that can be downloaded to any portable device. The downloaded COTA Map is interactive and looks like the COTA portal 400. In one embodiment, the downloaded COTA Map is a hollow, interactive shell that does not contain actual documents. The user can page through the downloaded COTA Map to find document locations so that they can be ordered via phone, fax, email, etc. from the host computer system. In one embodiment, the downloaded COTA Map could contain all the document information but it is more likely that it will only contain the file folders and document names. As noted above, this saves space on hand held devices.

2. Information Targeting

The inventors have observed that senders of KID find that their messages fail to be utilized by their targeted receivers. In many cases, receivers fail to use the materials because they lose track of it or fail to understand its value. Most teams fail to develop guidelines for how each member should structure their knowledge library. As a result team members cannot help each other location KID because they all use a different methodology for storage. In response to this challenge many senders send even more messages to receivers, using the "more is better" reasoning. In reality, this reasoning creates more information for the receivers to sort and store effectively and costs corporations a significant expense.

The COTA system 100 provides a solution to this challenge by allowing senders to target storage of KID in a specific location in the receiver's knowledge library (e.g., logical partitions 200 of the receivers' UKIDS 160). The COTA system 100 includes the following options for sending and receiving KID is a targeted manner:

(1) Basic COTA Targeting: A sender predetermines an outgoing message or attachment's storage location within receivers' COTA categories 200 and informs receivers where to store the item by specifying the destination path. For example, a manager sends a pricing sheet to his employees as an email attachment. He instructs them to store the pricing sheet under "COTA 2. Output—Widgets—Pricing." He names the attachment "003 05 Widget Pricing 2003 Spring." Now all of his employees have the message in the exact same location in their COTA categories 200.

Figure 8:
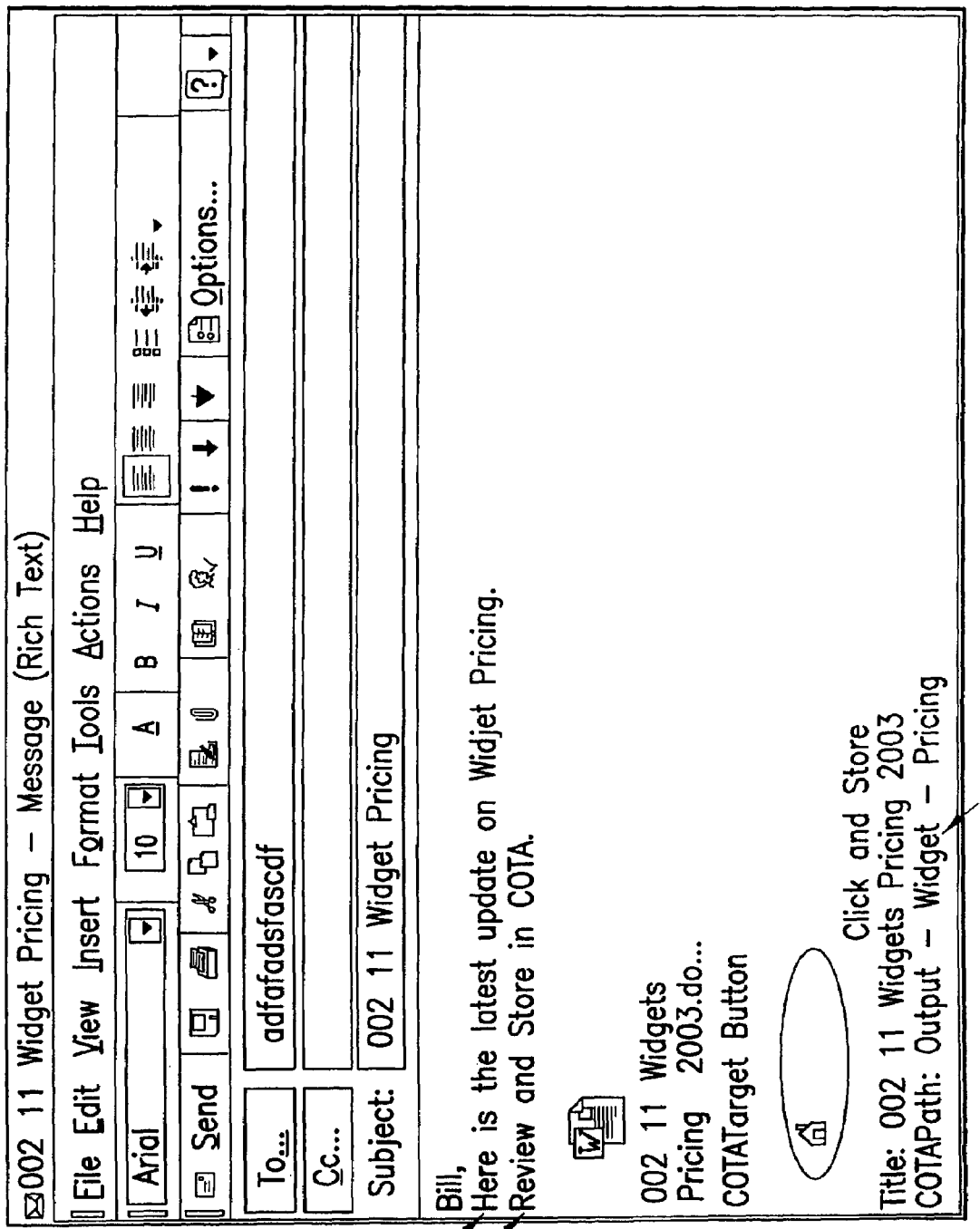
FIG. 8 depicts an electronic mail (email) message including an information targeting feature in accordance with one embodiment of the present invention.

(2) Semi-Automated Data Targeting (SADT)—SADT is a method of creating an email that has saving instructions embedded in its metadata. The receiver presses a button 450 (FIG. 8) and the email message 460, attachment 470, or both the email message 460 and attachment 470 are saved to sender designated path location specified by the sender within the receiver's COTA categories 200.

Information targeting is accomplished because the COTA system 100 users can access one another's COTA maps. COTA maps are representations of a user's UKIDS storage system. That is, the COTA map provides visibility to subsets within a user's COTA categories 200 but not the documents stored in it. Users, Teams, and enterprises can control the level of granularity and visibility of an individual's COTA system 100 for security and privacy purposes.

In the above email example, once the email message is drafted the sender surfs the receiver's COTA map and selects an icon representing the preferred storage location. The COTA system 100 embeds the selected storage pathway into the outgoing email message. When the receiver opens the email message they have the option to store the document instantly by clicking the data target receiver icon, e.g., the button 450, or they can store the message and/or attachment manually.

It should be appreciated that a significant amount of time and energy may be saved utilizing basic COTA targeting or SADT.

Another KID targeting method employs COTA Direct Data Targeting Software. The Direct Targeting Software address situations where information is sent to individuals who do not need to read the entire document until some future time. Examples include changes or updates in a team roster or product price, or a presentation sent by a speaker that everyone wants to keep in file for future reference. This information may not be needed until some future time. The COTA Direct Data Targeting Software sends information directly into one of the COTA categories 200 of one or more receivers.

Senders have an option of alerting or not alerting the receivers that KID was direct deposited. In one embodiment, the COTA Direct Data Targeting Software provides receivers of such delivered KID a Summary Direct Deposit Sheet 480 (FIG. 9). The Summary Sheet 480 is sent for all items that have been direct deposited into a user's COTA categories 200 over a set period of time (e.g., days, hours, etc.). In one embodiment, the COTA Direct Data Targeting Software provides a receipt for senders providing a confirmation of the percentage of KID that reach one or more receiver's COTA categories 200. The receipt includes, for example, names of users who, for whatever reason, did not successfully store the information in the pre-set location. Such a success receipt is a helpful tool. For example, in the event that important legal information needs to be delivered to employees, COTA Data Targeting could improve the accuracy of the transmission beyond simply sending information. It elevates accuracy to a level of providing feedback that information was actually sent, received and stored.

When the COTA system 100 is employed in multiple companies inter-company data targeting is possible. Targeting requires that the companies share target file pathways to ensure accurate delivery of information. For example, a request for quotation is sent from a first company to other companies using the COTA system 100 and the request includes an embedded return address location within the sender's COTA system 100. A COTA Return Feature allows a sender to guide information back to a particular location for batch processing or future use. The Data targeting feature can be used with clients, vendors, and anyone who needs to quickly and accurately transmit information to another entity.

3. COTA Mentor

Many in the Information Technology industry propose development of information "agents" that function act as on-board computer assistants. It is thought that the agent could "learn" a user's needs and use that information to help them with their work. The inventors have noted a number of perceived deficiencies in current development of agents. For example, the inventors have discovered that structural changes are needed to how information is stored before an effective agent theory can be developed. Accordingly, the inventors have developed the COTA system 100 to operate within a Virtual Mentoring Environment (VME), as described above. The VME provides an intuitive structure that addresses the complete KID management within our personal and professional lives. Importantly, the VME includes a COTA Mentor function developed according to the following principles.

The COTA Mentor is based upon a teacher model rather than being based upon a student model, as are conventional software agents. The COTA Mentor is vocation and team focused as it is designed around a job or team. As a teacher, the COTA Mentor assists in the on-boarding of a newly promoted or hired individual by taking them on a tour of their new COTA system 100 and COTA categories 200 with an emphasis on job specific KID and priorities. The COTA Mentor guides a user to work on priority items (as identified from the COTA categories). For example, by accessing document usage statistics the COTA Mentor exhibits the most recently document to highlight immediate priorities and knowledge needed for a successful transition from a former to a new employee.

In one embodiment, the COTA Mentor "observes" the user and notes when they "back out" of a particular document or file search. Back outs may represent occurrences when the user is not sure of the location of KID. They retrieve it only to discover that it is not the desired information. The COTA Mentor notes such back out occurrences as frequent back outs may be shared with the user as potential areas for restructuring or clarification. The COTA Mentor may bring such information to a user's attention at a periodic timetable (e.g., monthly, quarterly, etc.). As such time, the COTA Mentor may also ask if the user requires assistance restructuring their COTA categories 400. The COTA Mentor assists applying the COTA rule set, re-titling KID, re-positioning KID within the COTA categories 200, etc.

The COTA Mentor studies and notes storage pathways based upon all documents' key words, sender, creator, department, divisional information, etc. The COTA Mentor analyzes the user's storage methodology over time and begins to make suggestions based on a cross reference of the above information/meta data and the user's COTA system 100. For example, an email from a corporate purchasing agent requesting a proposal on widgets would alert the COTA Mentor of the following:

(1) The sender is a client of the receiver.

(2) A key word search of the title and text indicates that the content refers to "widgets" and "proposals".

(3) A cross reference to the receiver's COTA categories reveals a matching folder, e.g., "COTA/1. Clients-GM-Widget Project-Proposals."

(4) A secondary scan of the actual content of the document reveals a close match between the incoming document and other documents in the receiver's "GM Widget Projects— Proposals" folders.

(5) Previous correspondence from this sender have been placed in a particular place by the user.

(6) Before the user is done reading the first sentence of the email, the COTA Mentor offers several optional storage locations for the user's consideration.

(7) The user simply selects on the option that best represents where the document should be stored and the COTA Mentor places the document in that location. This automated process is seen to improve the accuracy of storage while reducing the cognitive chore of determining where a file should be located for future use. For example, many people store files that relate to both a "client" and "output" subset only in the "output" subset. The COTA Mentor employs the COTA methodologies to locate such a document under the "client" subset every time based in the inherit priority scheme of the COTA system 100. The chart below shows one version of how the COTA Agent Target Options can be proffered to the user.

In one embodiment, the COTA Mentor periodically sweeps a user's LOCK (e.g., the COTA categories 200) and locates redundant files. It alerts the user of the redundancies and the user can make a choice of elimination or retention. An example of KID that may by its nature lead to redundancies is a team roster that is perpetually updated. The user may be saving a new file containing the roster every time once is published and neglecting to delete the old file. The COTA Mentor can help the user by identifying these files and assigning them a predetermined designation. In one embodiment, the COTA system 100 includes a KID designation as COTA Perpetual Files. Outdated versions of COTA Perpetual files are automatically deleted when a user saves a newer version.

The COTA Mentor observes all incoming and outgoing COTA KID Targeting and offers optional storage locations to the user. In one embodiment, the options are presented in an intrusive way that does not demand a response from the user, e.g., the options are displayed in a blank part of the user's computer screen.

The COTA Mentor observes incoming KID from targeting and email correspondence, notes which of the KID is being deleted without being opened and creates a suggested filtration list for the user's approval. An optional Filtration Summary Sheet provides the user with a quick overview of deleted messages on a periodic basis. This reduces the amount of junk mail coming to the user.

The COTA Mentor assists the user in the configuration of their office by providing computer modeling software for the placement and arrangement of all COTA materials in the physical office environment.

The COTA Mentor observes time management software and creates appropriate links when commanded by the user. For example, the user may have a "Widget Presentation to GM" event schedule for a predetermined date and time. The COTA Mentor can build hyperlinks to a certain position within the user's COTA categories that makes related files and documents accessible to the user on or around the time of the presentation. When the user opens the date in the time management system, they simply see a single, master file folder named, for example, "GM Widgets Proposal." The folder contains all of the sub folders and documents within the user's COTA system related to the GM widgets. A similar process can be used to hyperlink tasks, notes, contact information, etc. into the COTA system 100.

The COTA Mentor helps a user build their COTA Profile over time. The COTA Mentor offers menus that allow the user to document "who they are" and "what they need" to such systems as, for example, external and internal search engines. The COTA Mentor assists in building a profile that describes the vocational and personal "DNA" of the searcher. As noted below, this allows search engines to function more efficiently because they now understand "who is searching for what."

The COTA Mentor surveys user to uncover training, research, quality of life and communication needs. The survey is optional. If a user indicates that they are considering buying a house in two (2) months, the COTA Mentor may surf the Intranet/Internet through the COTA Locator (described below) and provide the user with optional files for review of, for example, current mortgage literature. The information can be direct deposited into the TAO subset 210 of the COTA categories 200 (e.g., "TAO/3. Org. and Admin.—New Home Purchase—Agent Mortgage Research"). The user is then freed from the burden of searching and filtering information. They can simply check the file when they have time before initiating a labor-intensive search. COTA Mentor can query the user to further define the desired information.

The COTA Mentor is designed to be integrated into future computer technology. It isn't designed to be intrusive or demanding of the user's time and patience. All features of COTA Mentor can be modified by user at any time.

4. Power Added Folders

In one embodiment the COTA categories 200 include a number of universal subfolders that are preloaded within the UKIDS 160. Exemplary sub-folders include:

(1) General categories folder: A General categories folder addresses the issue of placing information that pertains to several items into only one subset. For example, a salesperson who receives a report on fifteen (15) of his clients may not know where to place the document, e.g., should it be placed in one or all of the client folders. The General accepts the document and removes the problem.

(2) Success Folder—Folder found under the COTA subset 220 "4. Admin." Category to catalog examples of employees' major successes. This folder aggregates accolades that motivate and qualify employees for future advancement. It allows employees to focus on behaviors that led to key successes.

(3) Form Library Folder—This folder includes all blank forms. Some employees accumulate large numbers of blank forms. The inventors have discovered that aggregating blank forms in one place is extremely helpful. The Forms Library folder can be populated or pre-populated with any blank forms that a team requires. Example forms include facsimile coversheets, memos, order entry forms, agenda forms, action item forms, etc.

(4) Competition Folders—Competition folders are created for all known competitive products. The folders are placed under the "output" subset of the COTA system's 100 UKIDS 160 next to the enterprise's directly competing products. For example, in a COTA system 100 for McDonald's Corporation under "Output—BigMac" COTA category 220 there would be a "Whopper Competitive" folder with information on Burger King Corporation's WHOPPER®. This provides a designated place for competitive information.

It should be appreciated that other Power Added Folders for various business units can be strategically placed into a UKIDS 160. Additionally, most powerful power added folders have multiple levels or layers of folders and documents. These folders can be constructed by the group, by the leader of the group, by other business units or even people from other companies. They can be copied and pasted whenever there is a new "client," "product," "team," "training program," etc.

5. COTA Shell and Template Builders

A COTA Shell Builder delivers a series of queries regarding the COTA 220 and TAO 210 subsets. In response to the queries, a user enters sub-folder titles and characteristics that the COTA Shell Builder uses to create the COTA categories 200 for a particular user. In one embodiment, queries by the COTA Shell Builder include a request to the user to list and prioritize "clients," "output," "teams," and "administration" items. For some categories such as, for example, administration, the user can select from a series of predefined items such as "company car," "travel and expense report," "training," "Information technology," etc. This selection process builds the subfolders within the COTA categories 200 for the user. The user can create a hierarchy of "clients," "output," "teams," and "administration" categories. This helps the user place what matters most at the top of each filing category.

Similarly, the COTA Template Builder software assists the user in creating uniform sub-folder categories and embedded documents. By replicating the template, the user insures that everyone on a particular team has an exact same folder structure for a particular type of folder. For example, if a sales team has one hundred (100) different clients, each client folder may have copies of invoices and proposals. The COTA Template Builder creates a "New Client Folder" template with sub-folders "1. Proposals" and "2. Invoices." Whenever a user adds a client they simply copy and paste the "New Client Folder" template. This functionality, when used within the strategic framework of a UKIDS 160, allows a team to reach unprecedented levels of quality control in information management. The COTA Template Builder software is seen to be the first software designed to assist the user through a series of queries and educational prompts in the construction of high quality templates with a software infrastructure or UKIDS. Use of the COTA Template Builder software drives the LOCK system to a higher degree of standardization while providing the user with a familiar structure to review.

6. COTA Search Engine

Conventional Internet search engines take key word(s) requests and search for the key word(s) in content on the Internet. Search engines typically take into account how often the key word(s) are repeated in content and apply a ranking such that content with more occurrences of the key word(s) are given a higher rank. One perceived limitation of conventional search engines is that they do not make associations between key words and topics the way that the human mind can. As a result, requested queries yield either thousands of responses, when key word(s) are too broad, or no responses, when key word(s) are too narrow. An additional factor complicating searches is that persons requesting searches and persons storing Internet content use a wide variety of words to express a similar notation, e.g., "soda" to one person might be "pop" to another.

The inventors have discovered that the COTA system 100 and, in particular, the COTA categories 200 can be leveraged to improve conventional search engine technology. The inventors have realized that people search for content within the context of either their professional and personal lives. The inventors have discovered that by introducing the context of a search and information about the person searching for content, search results can be dramatically improved. As described herein, the COTA categories 200 are levered to provide this additional contextual information. The following example illustrates how the COTA categories 200 are levered in this inventive way.

Imagine going to a local public library and saying to a reference librarian "windows, architecture, search." The first response you would likely receive from the librarian would probably be "please explain why you needed the information" and "who are you" (e.g., a student, computer technician, chief executive officer, builder or homeowner, etc.). In essence, the librarian is looking for a contextual understanding of what you need to find. As described herein, the COTA system 100 is a context and content driven system designed to reflect the full expanse of KID in an individual's life. Therefore, initiating a search through a COTA system interface improves the accuracy of the search process.

For example, suppose that three (3) people invoke an Internet search for content using key words: "windows" and "architecture." Also assume that a first individual is a software engineer who is searching for information on Microsoft Corporation's WINDOWS® software architecture, a second individual is an executive at a construction company who is searching for information on wholesale windows that meet certain architecture forms of upcoming projects, and a third person is a homeowner who is researching retail windows for various types of houses. Using conventional search engines, all three people are likely to get similar results using the above-defined key words.

In accordance with the present invention, the COTA categories 200 are traversed and levered such that contextual information is automatically included within the search request. That is, the particular user uses a COTA Locator feature to navigate the COTA categories 200 and "perch" themselves within a contextual location that applies to the search, for example, a location in which results of the search are likely to be stored. Once located in this manner, the Internet search engine is invoked. For example, in the homeowner example, the homeowner invokes the COTA Locator function and navigates the TAO subset 210 to a folder "5. TAO Organization and Admin—Home—New Construction project." From this perch, the homeowner invokes a search engine and requests a search using the key words "windows" and "architecture." The COTA Locator supplements the key word search by providing contextual information based upon a "homeowner searching for retail windows for a home construction project." As can be appreciated, more accurate search results should be uncovered.

On the other hand, results will differ for the software engineer because the COTA Locator function is used to navigate to a different subset within the COTA categories 200. For example, the software engineer uses the COTA Locator to navigate to the COTA subset 220 to a "3. Output—Utilities—Windows Office Suite" folder. Once positioned, the software engineer invokes the "windows" and "architecture" key word search. This time the COTA Locator supplements the search with contextual information based on a "professional software engineer searching for information regarding a software tool used by the engineer." In the third example, the construction executive would invoke the COTA Locator and navigate the COTA subset 220 to a "3. Output—Windows—Pricing" folder. Once positioned, the executive invokes the "windows" and "architecture" key word search. The COTA Locator supplements the search with contextual information based on a "professional builder searching for information regarding wholesale prices of materials for a construction project."

As the above examples illustrate, the COTA Locator represents a more meaningful and accurate search. In one embodiment, the COTA system 100 defines a user profile (e.g., the COTA Profile as described above within the context of the COTA Mentor) that may also be utilized by the COTA Locator to supplement searches. For example, the COTA system 100 may initially query users asking them to provide information for the profile. Exemplary questions include, for example, "describe your job," "select your activities from the following menu," etc. These initial queries are added to the COTA Locator key word search to create a more contextual search process.

Another example of the functionality of COTA Locator follows. A salesperson is working on a "widget" project with a client, General Enterprises, Inc. (GE). The salesperson may search the COTA categories 200 for information regarding pricing of GE's widget by navigating to a sub folder "1. Clients—GE—Widgets—Pricing." However, if the salesperson wants to search the Internet for the pricing information relating to GE's widgets the salesperson invokes the COTA Locator. The COTA Locator uses the same pathway (e.g., perches on "1. Client—GE—Widgets—Pricing") to supplement the search engine.

As illustrated herein, each navigation step through the COTA categories 200 denotes a key word that the COTA Locator supplements key word search requests invoked by a user. The COTA Locator determines relevant key words as follows. For the "1. Clients—GE—Widgets—Pricing" search, the COTA Locator parses the navigation path and from "1. Clients—GE" determines that a search relating to an external client named "GE" is being performed. The "Widgets" subset prompts the COTA Locator to focus on a particular product within the GE product line. From the "Pricing" subset the COTA Locator determines that a particular aspect of GE's widgets is being searched. In one embodiment, while the user is navigating the COTA categories a COTA Locator Icon can be selected to add additional key words to the search.

It should be appreciated that the COTA Locator uses a self-referential coding scheme for determining key. Each of the subsets within the COTA categories 200 can be a key word that ensures an Internet search engine receives consistent input. Consistency in the coding scheme is maintained in the following ways:

(1) Context: The input arrives with metadata based on the user's job description (e.g., COTA subsets 220) or their personal life (TAO subsets 210).

(2) Content: The content of the search is consistent because the user is searching from the perspective of their job or personal life. Typically, the content of a person's job or personal life does not radically change from day to day so the accuracy of search techniques actually increases over time. The COTA Locator also eliminates a huge number of useless hits by telling the search engine what it is not looking for. A professional query is clearly not a personal query. A request for pricing on widgets is not a request for a white paper or book advertisement on how to make multi-colored widgets. Additionally, by leveraging the COTA category structure, contextual content is delivered in the same sequence because the process of navigating to a particular area of interest is always the same pathway moving from universal COTA folders (e. g., Level 1 and Level 2) to more specific folders (e. g., Level 3, Level 4, etc. ). The inherit priority scheme utilized by the COTA system 100 (clients, output, teams, administration) also allows the search engine to know what matters most to the searcher.

The inventors have discovered that the COTA Locator increases the accuracy of conventional search engines. The following process flow demonstrates this proposition. A COTA Locator search process includes, for example:

(1) The user needs information.

(2) The user navigates their COTA categories to the place in either the COTA subset 220 or TAO subset 210 where they would normally keep this information. If the information has not already been stored as a document or link, the user may select, for example, a Net Search Button on the portal 400. A choice is provided whether an Intranet or Internet search is requested.

(3) They can add in key words at this point to make the search more accurate.

(4) The COTA Locator analyzes the COTA categories 200 to gain a contextual idea of who the searcher is. For example, if the person requesting the search is the chief executive officer (CEO) of The Home Depot searching for windows product information, COTA Locator directs the search engine to return different results than would be provided to the CEO of Microsoft Corporation. As described above, the search results should be different because the context is different.

(5) The COTA Locator analyzes the specific pathway navigated for the sequence and priority of key words as represented by the COTA subsets and folder titles.

(6) The COTA Locator invokes a search and provides matching results.

(7) The-user can open and save results to the exact same location from which they invoked the query. Since they have already navigated to that location they will have a great opportunity to conveniently save the document correctly.

As can be seen from the above description, searching with the COTA Locator function differs markedly from existing search engines which operate independently from current office software platforms. While some integration exists, the COTA Locator provides an additional layer of content based, contextual searching. As such, searching with the COTA Locator is more accurate and helpful than current search engines.

It should be appreciate that the COTA Locator performs personal searches just as well professional searching. For example, an avid wine drinker may invoke a personal search from the TAO subset 210 for a quality restaurant. The user use the COTA Locator to navigate the user's TAO subset 210 for a "5. TAO—Activities—Wine Information" folder. Restaurants with a reputation for excellent wine cellars could be located and brought to the top of search results. The sensation to the user is that products and information of contextual importance are delivered more frequently by the COTA Locator. COTA Locator makes users feel that an Internet store front has magically pushed items of interest to the front of the queue based upon an understanding of the users COTA categories 200.

The following highlights some differences between conventional search processes and searching with the COTA Locator:

(1) Adds Context to search—Example: Personal vs. Professional searches. Personal searches are more retail focused while professionals are usually searching for wholesale/industrial information. A person who is booking corporate meetings at vacations resorts is a very different searcher than a couple going on a personal vacation. The COTA Locator allows enterprises to contour their responses to the context of the user's search initiation point. So a search is initiated through the COTA subsets 220 (vocational) or TAO subsets 210 (personal) brings up different results with the same key words.

(2) The COTA Locator adds unspecified search information—If a user is searching through their TAO subsets 210 for a vacation spot they might not mention that they like certain activities, e.g., golf and wine. The COTA Locator can add those interests into the search by quickly scanning a titles within a "5. TAO—Activities" folder. This produces a more targeted listing of vacations spots for the user.

(3) Saves Time—A user might want to find the websites for all twenty-five (25) of his clients. In the current system, the only way to do that is to search all twenty-five client names with a key word search that might look like this: "General Motors, Website." In the COTA Locator the user would simply click on "1. Clients" and enter a key word request for "websites." The COTA Locator returns a complete listing of all website links of the users twenty-five client.

(4) Enterprise Benefits. Since the COTA system 100 is a known and standard structure, a team or enterprise could also collect a list of all clients, for example, and create a corporate wide bank of client websites.

(5) Intranet Site Construction Benefits—Intranet sites could be set up to anticipate internal queries through the COTA Locator. If "widget sales per territory" information is updated on a monthly basis but not downloaded to user computers, then the user could simply navigate to a predetermined folder under "Clients—General Clients—Widget Sales by Territory" and select the COTA Locator button in order to open the document.

(6) The COTA Profiler is an optional survey tool that supplements the COTA Locator by indicating information about the searcher that impacts searches. For example, parental blocks, interests, job description, "Clients," "Output," "Team," and "Admin" characteristics can all be loaded to create a richer and complementary contextual picture of the user.

(7) The COTA Locator can be leveraged by any enterprise seeking to connect with customers because it can allow retailers to bring information and products relative to the searcher to the front of their virtual store. Pop menus, while extremely annoying will not be as annoying if they reflect the true needs of the user.

7. Portal Subscribe

Marketers have been relatively unsuccessful at getting users to "subscribe" to automatic delivery of content over the Internet. The inventors have discovered that this lack of interest may be related to problems in the delivery of information, for example:

(1) People are already receiving too much information so it is understandable that they would not want to receive vast quantities of new information in a random fashion.

(2) The free ranging aspect of Internet delivery contradicts the idea that users will be happy with a handful of pre-established communication "channels," the delivery medium of chose in, for example, Microsoft Corporation's WIN-DOWS® environment.

(3) Users lack a reliable system of selecting and storing Internet content.

The COTA system 100 provides a solution to increasing automated delivery of content. A COTA Subscribe software leverages the COTA Portal 400 approach. When a user surfs to an Internet site they are prompted by the COTA Subscribe module to see if they want to subscribe and automatically receive information from the site. The user is prompted to narrow the type of information proffered by the site. The subscription can be limited by topic, amount of information or particular author. This allows the user to feel comfortable that they won't be overloaded with information. When new information appears at that site that matches the user's selected interest, they receive a summary sheet. The user can select (e.g., check off) items that they want to receive or mark the item for deletion. Items that they want to receive will be direct deposited to their COTA categories 200 (e.g., using KID Targeting as described herein). The user also has the option of opening a particular piece of information and reviewing it before permitting download. This batch processing approach saves the user time and gives them the final say on what gets added to their COTA categories 200. In one embodiment, the user can select downloading of a link or actually the content. Either way, when the user needs the information they simply locate the position of the information within the COTA categories and extract it. To avoid a seemingly constant stream of data, the user can specify a number of items that must accrue before a summary deposit sheet is created or specify a predetermined time period for downloads (e.g., nightly, weekly, etc.).

8. COTA Locate and Leverage

Document and file manipulation typically includes actions such as opening, closing, saving, editing, copying, pasting, inserting, deleting, creating shortcuts, opening net links, and like operations. Document and file manipulation within conventional software application generally involves a number of tasks. Before invoking document and file manipulation operations a sequence of events must be completed such, for example:

(1) Locate Application Silo—If a user wants to locate a particular document they must first remember the type of software application they used to create and/or store the document. As described in the Background Section of this document, applications typically store documents in predetermined data storage silos. For example, they may wonder if they saved an email attachment to their hard drive (e.g., "C:\My Documents" directory) or to an email hanging file folder.

(2) Designate Function—Once the data silo is located the user designates the desired operations, e.g., whether they want to insert, save, copy, etc. information. The user generally traverses a function menu to invoke a desired operation.

(3) Recall Sortation Scheme—Once the Application Silo and function are determined the user recalls and negotiates the sortation methodology, e.g., how they set up their folders and documents. For example, if documents are stored in alphabetical order, the user must remember name of the file since a file named "Anvils vs. Widgets" is in a different place than a file named "Widgets vs. Anvils."

(4) Navigation—Once the user recalls the sortation scheme, they navigate to the document location. In the event that they are saving a document, they navigate to the preferred target spot.

(5) Execution—The user finally selects the desired function from, for example, a menu or by selecting an icon or function button.

(6) Optional Step—Remove Redundant Document—If the user is in an email message that is being saved to hard disk (e.g., the "C:\My Documents" folder), the user may have to go back to the source message and delete it.

Figure 13:
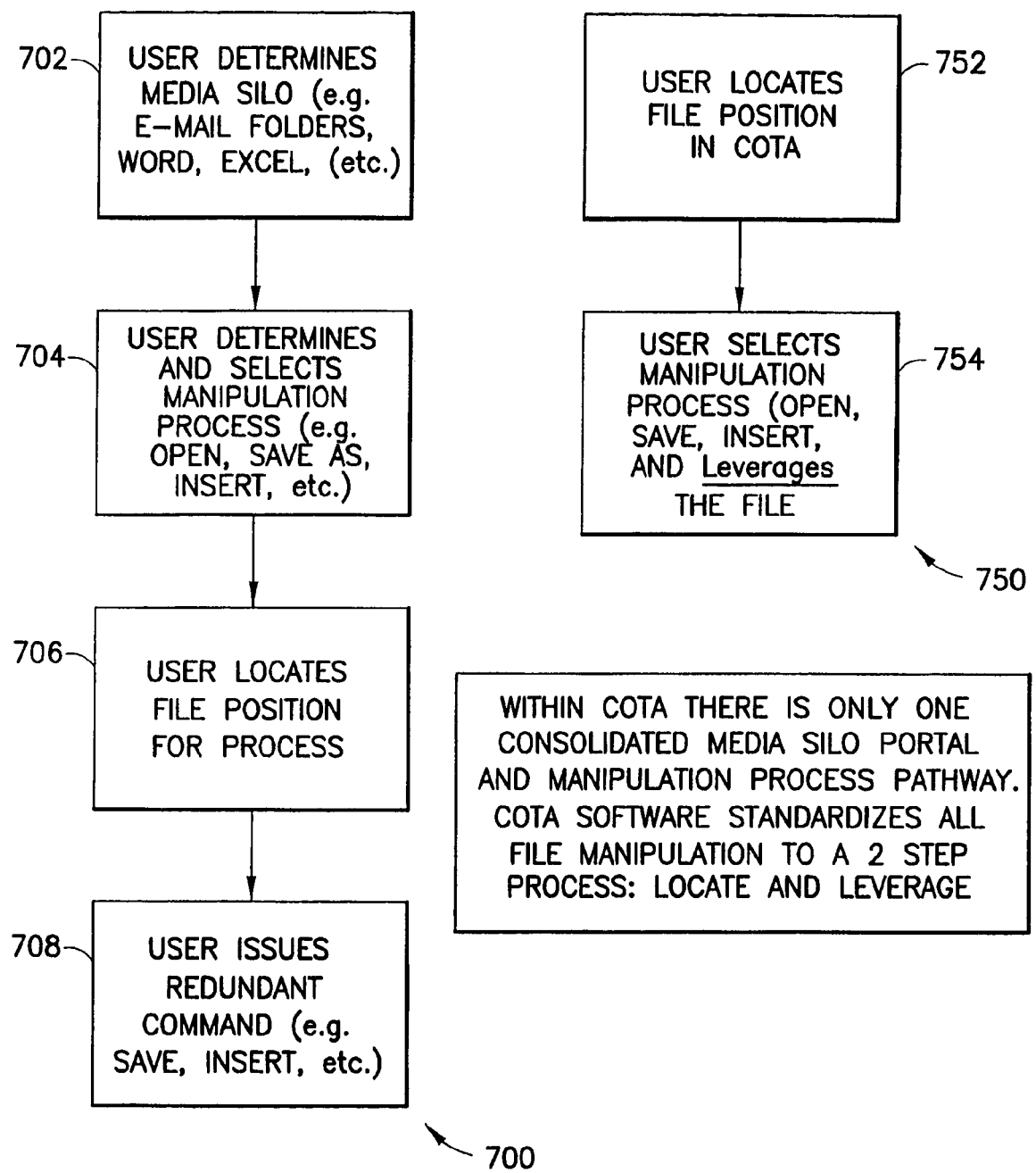
FIG. 13 is a simplified flow chart comparison of conventional and one embodiment of an inventive document and file manipulation methodologies.

The above-described methodology presents problems in that users must navigate a variety of different menus and options in order to manipulate documents. This places a cognitive and physical barrier between the user and their information. As illustrated in FIG. 13, the COTA system 100 provides an alternative document and file manipulation methodology. The conventional process, shown generally at 700 and described above, can be summarized as: (1) Locate storage silo 702, (2) Determine and initiate function process 704 (e.g., insert), (3) Determine sortation scheme and navigate to document 706, and (4) Make redundant function command 708.

The COTA system 100 can run in the above-described manner or in a Locate and Leverage document manipulation process outlined below and illustrated in FIG. 13 generally at 750. The Locate and Leverage process includes a two-step: (1) Locate 752—Regardless of the manipulation function the user wishes to invoke, the user navigates directly into the COTA categories 200 of the UKIDS 160 to immediately locate the desired document, and (2) Leverage 754—Once the user reaches the preferred document position, they select the function from a document/file manipulation command menu that includes, for example: "save, " "save as," "insert," "copy," "open," "print," "send to," "shortcut," "save link," etc.

In one embodiment, when saving a document the COTA system 100 automatically time stamps the document. If the document is being saved for the first time, the COTA system 100 asks if the user wants to rename or re-label the document for greater clarity.

With COTA Locate and Leverage 750 redundancies are eliminated because users only need to select functions once. No longer will the user select, for example, "Insert File" and then have to hit a redundant insert button at the end of the process. The COTA system 100 allows the user to simplify and standardize the "Locate" process and it simplifies, standardizes and shortens the "Leverage" process. As illustrated in FIG. 13, the Locate and Leverage 750 process is a simple two-step function versus vs. the conventional four-five step process.

In one embodiment, the COTA system 100 includes an inventive file/document naming scheme. When saving a file/document to a targeted location, the COTA system 100 creates a highlighted "target" position that allows the user to save into a particular numeric place. For example, if the user is saving a file folder for a new Client that is to become their new third priority client, the COTA system allows the user to save the folder to the target location and automatically re-number all of other folders in a next higher numeric sequence (e.g., old third becomes fourth, old fourth becomes fifth, etc.). This encourages users to use a priority-based system versus an alphabetical system. In conventional file/document management systems, users would have to select and renumber all subsequent client folders. In one embodiment, the COTA system 100 allows users to toggle between alpha, temporal, and numeric sortation schemes. Users can also use a hybrid sortation scheme. This is useful when the user wants to concentrate on a limited number of high priority accounts, e.g., a first ten accounts can be numbered in order of importance and the remaining thirty accounts can be ordered in alphabetical order. This provides a means of lifting what matters most to the user to the top of the sortation page. The inventors have found this a valuable tool for users managing large streams of documents.

9. COTA Business Planning Software

The inventors have observed that enterprises spend millions of dollars developing business plans but employees find it difficult to keep track of all of the tactics, strategies, goals, objectives, etc. contained in the plan. Many business plans are created with the best intentions but are rarely referred to on a regular basis. A recent study by Franklin Covey indicated that less than thirty percent (30%) of employees know their enterprise's key goals and objectives. Most are unaware of the specific tactics and timelines outlined in the enterprises' business plans. This is also true of business plans that are accessed on a separate website. Users find it cumbersome to surf to a different location, remember a different password, negotiate a different structure, and operate a different software function to access basic business plan information. As a result, the best business plans often fail to be used and implemented.

The COTA system 100 provides a solution including its own business plan module. A COTA business plan represents a complete departure from business plans that are stored as documents or accessed through shared working spaces such as websites. The COTA business plan leverages the COTA categories 200 and system 100. At the beginning of each business plan cycle, a user invokes the COTA business plan module for example, by selecting a desktop icon called COTA Plan. The COTA business plan software opens up an exact replica of the user's COTA categories 200. Since the COTA categories 200 already represent a hierarchy of importance, the categories underscore business imperatives. The user starts with a review summary of the executive business plan, corporate mission statement, and vision statement, within the context of the COTA categories 200. Next, the user is prompted to update the prioritization of all COTA categories 200 starting with "1. Clients." The user can select and drag their "Clients" subset into any priority order that is appropriate. The COTA business planning software changes prioritization of all subsequent folders. The user is prompted to focus on a predetermined percentage of their client base as a priority. If the user has sub-groups within clients the user is prompted to create priorities within each sub group by selecting and dragging the accounts that matter most to the top of the list. Once the user has selected the top priority clients, they are prompted to enter specific goals, strategies, and tactics that they hope to achieve with that priority client within a specified time period. General client strategies may also be completed. This data entry occurs in a replica of their COTA categories 200. When they select a particular client folder instead of seeing all of the KID that is normally stored in COTA subset, data entry screens open up. The users complete convenient standard electronic forms requesting typical business plan information. Enterprises can customize and/or populate electronic forms. Goals, strategies, tactics, etc. are set up with deadlines and milestones. Once a timeline is set up, the COTA business plan software automatically passes key tactical times into the enterprise's time management software for tracking. Next the user moves to the "output"subset. "Products," "services," "value added products and services" are prioritized in a similar manner as described for the "clients." Again, the user is prompted to document goals, strategies, and objectives for priority output. Just as the COTA categories 200 determine a hierarchy for storing KID, the COTA business plan software uses the categories 200 as a filter. For example, any information already explained in the "client" subset need not be re-explained in the "output" subset. So the "output" subset contains overall goals for products and services, and the user's plan to become more knowledgeable about a particular product or service, etc. The same process is repeated for the "teams" and "administration" subsets. What "teams" matter most in the coming year? What will the user try to accomplish on each team. Will they take on a new project or leadership role? How the user will become more organized is covered under the "administration" subset. What processes the user will seek to streamline?

The user can designate shared goals if they are on a team. A team can complete the COTA plan together, if appropriate.

Once completed, the user presses an icon and the business plan embeds itself in the COTA system 100 in two ways.

(1) A special business plan icon appears at the top of each relevant folder. For example, if CLIENT 1 is the user's top priority account, the software moves CLIENT 1 to the position as follows:

| 1. Clients |
| --- |
| CLIENT 1 |
| *CLIENT 1 Business Plan Objectives |
| Project Folder 1 |
| Project Folder 2 |
| . . . |
| CLIENT 2 |
| Etc. |

The asterisk connotes a unique business plan icon. Within that folder, the CLIENT 1 objectives, strategies, and tactics are placed. The user can look up their business planning content using the same system that stores their KID, e.g., the COTA system 100. In fact, the business planning software insures that the COTA system 100 is reflective of the current business planning priorities because it resets the order of contents based upon the business plan imperatives. The COTA Plan marries the user's KID to their stated plan for each account. The COTA principle of a single structure and system for managing information can be leveraged over and over again.

(2) A complete copy of the business plan is stored, for example, under the appropriate "3. Teams/BusinessPlan/Business Plan 2004" subset. When the user needs to review a tactic or goal they simply navigate to the location of that tactic within the COTA categories 200 and read or update the tactic. The update is passed to the master plan in the "3. Teams" subset.

Teams can also designate a shared goal or an entire shared COTA plan. Each plan has its own unique icon for folders so the user can differentiate between team and individual business plan goals. The COTA plan relates to other team members COTA plans so that universal updates can be made. When an update occurs users can be notified via email in real time or by receiving a monthly update sheet that automatically summarizes all business plan updates. The summary document itemizes which tactics have either been completed or not completed on time. It also summarized the tactics that need to be completed in the coming month. The user can set the frequency and time periods to other intervals (e. g. quarterly, weekly).

The COTA plan, like the COTA system 100, may be scaled up throughout an organization. Information is aggregate and leveraged by the rest of the organization. The COTA business plan priorities are used as a sortation feature. For example, Information Technologies group could assist the Market Analytics department in aggregating a priority account list by simply performing a search for priority accounts in the "1. Clients" subset of the COTA categories 200. The enterprise could examine the degree to which the enterprise is on track with its tactics by aggregating the monthly updates and tracking the percentage of On Target, Missed Deadlines, or Completed rating given by users. Executives can be in charge of managing the enterprises global COTA plan. Information regarding global client sales is tracked using the same COTA business plan methodology used by an entry level sales representative to track territory sales. Business units serving internal clients are also able to articulate their business plans more effectively because the entire enterprise is using the basic COTA categories 200.

In one embodiment, when a goal is achieved the COTA plan folders change appearance to signify that the goal is completed. This provides a convenient visual means for targeting non-completed goals. When a timeline is missed, that timeline folder turns red. This, along with a reminder in Lotus Notes Calendar, Outlook, etc. informs the user to open the business plan folder and see where they are falling behind. At the end of the year, the COTA plan provides a rating for goals that were and were not achieved. This rating is used as one criterion to judge the success or failure of an individual, team, or enterprise in a given year.

10. Project Management Software

The inventors have discovered that project management requires that an individual or team pull together KID that may be scattered throughout the individual or entire team's universe of knowledge. Spreadsheets, word documents, hard copy documents, action plans, presentations, meeting notes, goals, tactics, rosters, are just a few of the documents that need to be tracked for the completion of a successful project. Project management software often requires extensive training. Users of project management software often complain that existing packages are counterintuitive. Typically, the software creates an independent storage location for its plans.

The COTA system 100 provides a solution to project management by providing, for example, document templates to:

(1) Determine goals, strategies, objectives, and tactics;

(2) Create and track a series of events on a timeline; and (3) Assign responsibility to certain individuals for the completion of tasks, etc.

What differentiates the COTA system's 100 project management module (COTA Project) is the way that it organizes and stores all of the KID needed to run a project. Any team that is working on a project invariably stores a large number of documents related to that particular project. A first feature of the COTA Project is that it provides a Folder Template Builder that helps the project team build a shared project folder that contains all of the relevant documents and links needed for the completion of the project. Team members or the team leader construct the folders based on the project's requirements. Folders are created to, for example, store the mission of the project, goals, strategies, timelines, flow charts, tactics, source material, rosters, related links, best practices, milestones, and any other important project information. Users can choose from pre-existing templates or create their own folder structure through a query system. Once the project shell is completed, users populate the project template with the appropriate documents. In one embodiment, the COTA Project modules allows all documents to be e-mailed to the team member designated as having primary responsibility for populating the COTA Project shell. Once populated the shell is e-mailed out to users who target it to a specific location in their COTA categories 200. In one embodiment, a LAN or server connects team members to universally update and modify documents. The LAN/server implementation allows all team members to work on their portion of the project at their convenience.

A second feature of the COTA Project which distinguishes it from conventional project management software, is that the user does not have to navigate to a team website to perform modifications to documents but rather, accesses the COTA Project Shell from within their own COTA UKIDS 160. One benefit is that the user does not feel like they have to surf to a foreign site. Since COTA uses folders that look and act in a similar fashion to standard explorer folders, the user feels comfortable with manipulating COTA Project. In this way, COTA Project leverages the familiar COTA categories 200 to simplify and empower the project management process. Once all project team members have the project template, they can COTA Target information out to the whole group to create a standardized set of information. If a project team member leaves the replacement member is able to quickly review the project content and timelines.

Generally speaking, all KID relevant to any project is stored in one place with the COTA categories 200. However, sometimes project contents exist in another location. For example, product specifications relevant to a project could be stored under "output" subset. COTA Project allows the user to link a secondary or tertiary copy of such a document into the Project Template folder. This provides the ability to look at all KID in one place at one time. COTA project templates come preloaded with a flow chart planning tool. This tool creates a simple primary flow chart for all projects where documents, member responsibilities, dates, prioritization and notes are embedded in the flow chart. The COTA Project software relates to Outlook, Lotus Notes, etc. and provides reminder messages to members to complete tasks at appropriate times. The flow chart relates to COTA Business Plan for each individual member. It is important for any major project to be relevant to the team's or individual's overall business plan. The COTA Project module allows pooling of project knowledge, simpler flow charting, relationship to the business plan, and transferability in the event that a member leaves. The COTA Project Template provides structure and cohesion by adding a standardized framework for project managers and members.

11. Change Management Software

When an employee leaves it is often a difficult task to teach their successor how to quickly access inherited KID. The COTA Change Management software module assists a user who is new or has inherited all or a portion of their predecessor's UKIDS 160. The COTA Change Management software provides a guided tour of existing information including the largest, most used, and recently used file folders. The software describes the priorities and knowledge needed for success. If the outgoing employee is unavailable, the Change Management software includes an ability for the former employee to document their thoughts on the most important information within the system. The former employee can also record a list of important things that the outgoing employee believes that the new employee should complete in the first few months on the job, can explain what templates exist within the outgoing employee's COTA system 100. The COTA Change Management Software also assists the user in storing their TAO System and other business related KID on their new computer. In effect, the COTA Change Management system provides the information and functions needed for a smooth and productive transition of employees.

12. Voice Recognition Software

Blending a UKIDS with voice recognition technology yields a product with improved capabilities and utility for both handicapped and non-handicapped users. The inventive COTA system 100 provides a voice recognition system that leverages the logical arrangement of specifically named folders and sub-folders (e.g., the COTA categories 200) to locate desired KID with greater speed, accuracy and ease of use. User of COTA voice recognition would identify a master folder (Level 0), Level 1 folder name, level 2 folder name etc. (e.g., "COTA, Clients, Client 1, Widget Proposals") to enable the user to drill down to a smaller more meaningful subset of folders, which can then be searched or sorted with a relational or other type of database search engine. Such a parse would eliminate roughly ninety-nine percent (99%) of KID that does not pertain to the sought after information.

This inherent parse of undesired KID solves the major challenge of conventional relational search engines, e.g., that they tend to bring up a huge number of irrelevant documents that is difficult for business people or blind users to manage. Additionally, the universality of the COTA system 100 makes it easier and more productive to implement a voice recognition system throughout a department, division or enterprise. The fact that workers have common folders at Levels 1, 2, and to some degree level 3 means that training and set up are simplified.

The known hierarchical structure and fact that all KID is accessible within one data structure (e.g., of the COTA system 100 UKIDS 160) promotes hand free operation and remote data manipulation.

The COTA Map facility (described below) aids implementation of a voice recognition module in that a list of folder names under the COTA categories 200 can be produced based upon the order and hierarchy. By reading each folder title back into a voice recognition recording device specific matching digital voice maps are created.

When operating the voice recognition system a user need only call out the prerecorded names and drill down to the desired KID just as they would if they were manually traversing the COTA categories 200. Since UKS rules dictate that exceedingly long strings of documents should usually be sub-divided into smaller folders, the user can quickly drill down to a very small subset of documents.

When a user who is blind or unable to view their computer screen can not remember the next folder or actual document name, the voice recognition system can be queried with a key word to rapidly read off the files/document options at the next level. The user can choose the proper document or folder by voice, telephone pad, PDA, computer, etc. The user can also switch to a relational database sort at any time. For example, when confronted by two or more potential documents or folders that may contain the sought after information, the user can then put voice search on hold and request a relational content or title search comparison of the remaining KID. The benefit is that this provides a much more focused area of sorting, which is essential for voice recognition technologies.

The user can vocally maneuver through the COTA system 100 with a series of voice commands including but not limited to "Back 1," "Back 2," etc., "forward 1," "forward 2," etc., "back home," "forward end," etc. This allows the user to rapidly cruise on a path to and from a particular document. All other obvious functional features that relate to documents would be employed such as "save as", "open," etc. Once located, the user is able to print, edit, fax, email, etc., the document to anyone who needs it with voice commands.

A special module for blind users allows greater user of voice recognition to title, retrieve, read, and write documents. The COTA voice recognition module for blind users includes the ability to print Braille labels, COTA Maps and guides for organizing filing cabinets, shelves, CD Rom libraries, etc. This aids blind users in manipulating an increasingly large number of Braille documents within filing cabinets. For quadriplegics and other handicapped individuals, the COTA system 100 presents a low cost, mouse free alternative that will allow more rapid location, retrieval, and storage of information.

The COTA system's 100 time stamp labeling feature (described below) can be employed to easily locate time clustered documents once document level is reached or approached. The user simply says "June 2000" or "summer 2002" and the COTA voice recognition system locates documents in or around that time frame.

At each level, the user can give some specific information that further narrows the field including but not limited too, document type (e.g., Adobe, Word, etc.) document content, relative document size (large, medium, small, etc.), document structure (letter, proposal, etc.), keywords within document, creation date, etc. The user has the ability to preset their interpretation of a letter, large document or folder.

In one embodiment, the COTA system 100 is loaded to recognize a wider variety of voices at the more general levels so that users who inherit a system can quickly access a portion of the LOCK on their first attempt at voice recognition. This would be helpful for people who are serving as a proxy for the primary operator in accessing sought after files when a person is out sick or on vacation. Additional recognition systems are available for character, handwriting, and other forms of symbolic recognition. Operating system commands can be added to the functionality once document level is reached.

13. Handheld Assistant Interface Software

The inventive COTA system 100 includes a digital handheld assistant software module that provides an interactive COTA Map for storage on a personal digital assistant (PDA), BLACKBERRY device, mobile radiotelephone, or like handheld electronic devices. The handheld assistant interface software provides a representation of the aforementioned portal 400 for accessing the COTA categories 200 of the UKIDS 160. The handheld representation differs from complete the COTA categories 200 in the UKIDS 160 as it does not contain actual KID, rather only titles of KID is stored in the handheld COTA map. As can be appreciated, memory space is at a premium in handheld devices therefore it is not desirable to store the contents of all KID stored in the COTA categories 200.

Benefits of the handheld assistant software are apparent when the user is in a remote location and needs a particular KID. In this case, access to the KID may be obtained by undertaking the following actions:

(1) The user pages through the handheld COTA Map and locates one of thousands of KID titles stored within the COTA categories 200 of the UKIDS 160.

(2) The user selects the KID title and chooses one of the following options from a menu:

(A) Retrieve the KID from the COTA categories 200 of the UKIDS 160 and send the complete KID item (e.g., a document) to the requesting handheld device.

(B) Retrieve the KID from the UKIDS 160 and send it to another device (e.g., a facsimile machine, another handheld device, a computing device of a co-worker, client, etc.).

(C) Edit the KID first, then send to the requesting handheld or another device.

(D) Print, rename, or save the KID as under a different title.

(3) Once instructions are provided the user presses send.

(4) The handheld device then sends a request message by, for example, email, telephone, satellite, or other communications method etc. to a host device. The host device accesses the UKIDS 160 and retrieves the requested KID. The host device then transmits the requested KID in accordance with the requested instruction (e.g., back to the requesting handheld or to another device).

While conventional systems permit remote access to some KID repositories (e.g., email, or file management systems), these systems are not seen to support remote access and manipulation of a universal KID storage library such as the aforementioned UKIDS 160 system. It should be appreciated that the principles described herein applied to any remote device including remote handheld computer devices, radiotelephones, cell phone, etc. and any other equipment that contains computer technology such as cars, sports equipment etc. For example, a map could be requested from a car's computer system to the operator's PDA for up link via a satellite system.

Some other advantages of using the handheld assistant software and handheld COTA Map include:

(1) The handheld COTA Map matches the COTA categories 200 of the UKIDS 160 and therefore is familiar to the user and should be easier to learn and negotiate. The similarity of the maps is intended to eliminate creation of an additional data storage silo.

(2) Search facilities available through the COTA system 100 are generally a faster and more accurate way to locate an urgently needed document.

(3) Since a UKIDS is used across an entire organization, the transmittal of KID as attachments in email messages will increase the ways that information can be transferred throughout organizations. The handheld assistant software can be used by remote operatives who may need a variety of documents, forms, etc. at any given time from their own computer based COTA categories 200 in the UKIDS 160.

(4) The use of the handheld assistant software enables users to request KID from their own computer systems from remote locations with relative ease.

(5) The handheld assistant software can also be used when taking meeting notes on a handheld device. The user initiate an import of the meeting notes directly to the appropriate COTA categories 200 of the UKIDS 160 by selecting a save feature.

(6) The handheld assistant software accommodates synchronization processes of conventional handheld devices such that changes made to COTA categories 200 and/or previously requested and downloaded KID are mirrored between the handheld COTA Map and the UKIDS 160.

14. Security Software

It has been reported that billions of dollars of intellectual property assets in the form of electronic and paper documents are stolen every year. The inventors have discovered that one reason why documents are stolen is that individual storage systems are rarely, if ever, reviewed by team leaders or other persons in positions of authority. One factor complicating any review process is that few people store KID is a similar manner. In this environment, it is far easier for outgoing employees to copy and/or delete KID in the last few days of their employment.

As noted above, the COTA categories 200 permit creation of shared UKIDS 160 for storing KID in universal storage locations. The COTA system 100 represents a new and unexpected tool for securing documents for the following reasons:

(1) It is easier to secure a centrally located structure;

(2) It is harder to steal things when co-workers can review your work;

(3) It is easier to write software to monitor a large mass of data that is structured with the help of a universal organizational principles; and (4) It is easier to assign a priority value to information that is already prioritized.

In one embodiment the COTA system 100 includes COTA-LOCK security software having, for example, the following functions:

(1) Each employee's COTA categories 200 are periodically backed up to an archive storage medium (e.g., a zip drive, CD ROM, network server, etc.). The backup can be done by designated employees or automatically by the COTA system 100.

(2) A team leader or other person of authority periodically reviews backed up information. Back ups and reviews can be, for example, monthly, quarterly, annually, etc. If preferred, administrative assistants or other can facilitate the maintenance and inspection of back up libraries. Additionally, the COTA system 100 includes a software module for inspecting KID that is backed up to insure that users are using appropriate COTA categories, titles, labeling, structure, rules, etc. Such an automated review is possible because KID is arranged in the familiar and user-friendly structure. Currently, this kind of evaluation would be very difficult.

(3) Reviewers (e.g., the team leaders, etc.) access and navigate each employees' COTA categories 200. This allows the reviewer to coach team members on activity level, quality of database, goals achieved, team organization, etc. Reviewers can review individual COTA categories 200 in relation to Team or Global Enterprise COTA. If the subject employee is not gathering useful information then they can be redirected towards appropriate goals. The review not only benefits the employee but also familiarizes the reviewer with a each employee's library of knowledge (e.g., LOCK) that they may need to reassign if the subject employee departs.

In one embodiment, benefits and elements of a security review using the COTALOCK module include the following:

(1) Review discourages employees from hiding KID in their personal TAO subset 210. The security software records KID transfers from the vocational COTA subset 220 to the personal TAO subset 210 to prevent gradual erosion of professional KID into the portable personal subset.

(2) Reviewers are trained to encourage development of the COTA categories 200 of the UKIDS 160 (e.g., expand the LOCK) with a goal of simplified transferability. When reviewers work with employee this sets the stage for reviewers helping incoming employees learn their predecessor's KID, COTA categories 200 and UKIDS 160.

(3) The reviewer inspects the COTA categories 200 to make sure that professional documents are being placed in the professional portion of UKIDS 160, e.g., with the COTA categories 220. This review makes it more difficult for an employee to "hide" professional documents in their personal folders, which are generally confidential, password protected and off limits to reviewers.

Figure 10:
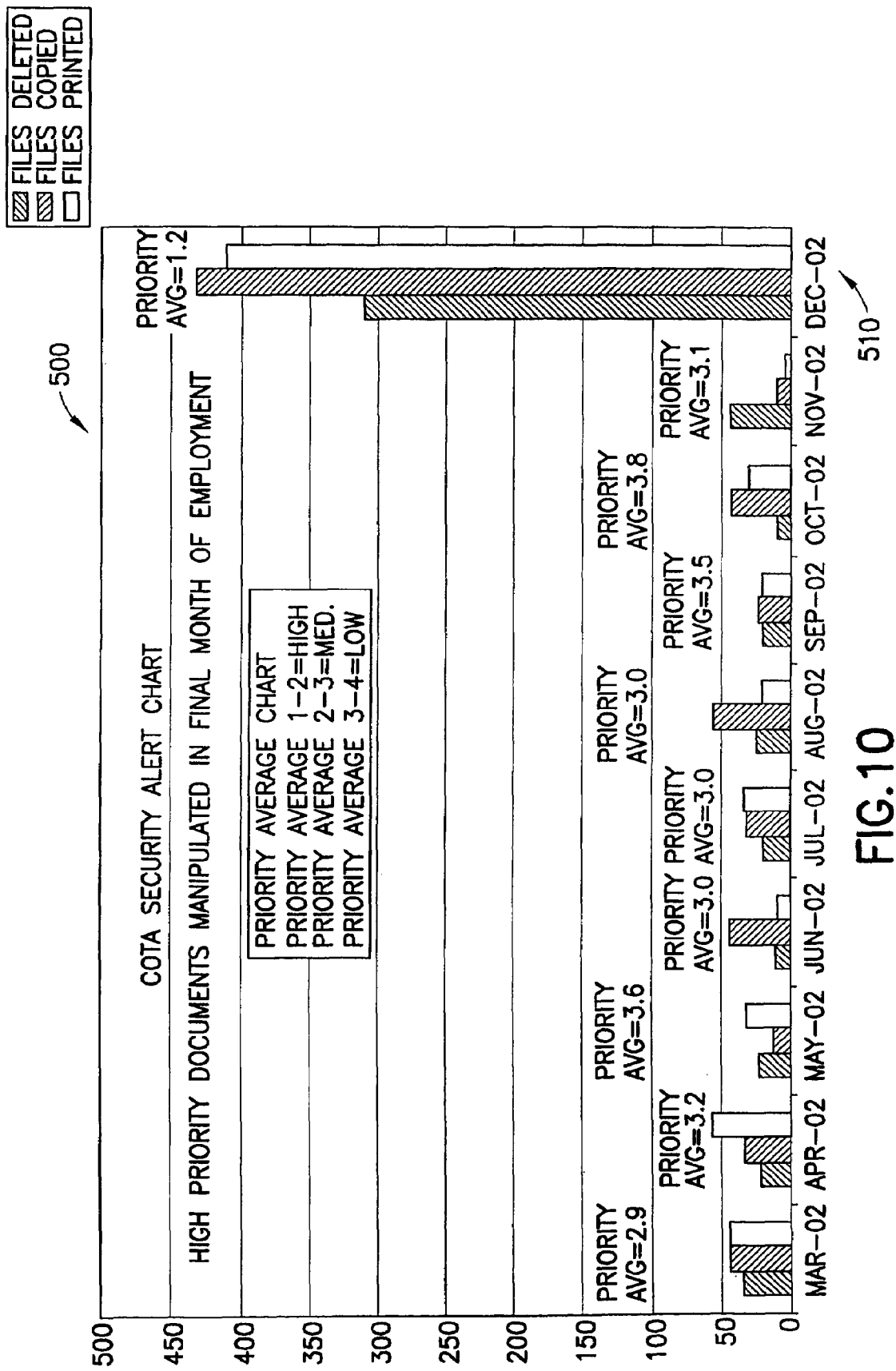
FIG. 10 depicts one embodiment of a security alert chart detailing transaction activities of a subject user.

(4) The COTALOCK security software records transactions that are relevant to protection of intellectual property. The software prints relevant information and periodically forwards the information to reviewers via email, fax, etc. For example, the COTALOCK software detects dramatic increases in copied, deleted, or printed documents at or around the time an employee leaves a company. The software provides a COTA Security Alert Chart or report 500 (an example of which is illustrated in FIG. 10) including the title and priority rank of items based on the documents location within the COTA categories 200. The COTALOCK software allows management and legal teams to quickly locate the missing KID and place it in context of the employee's departure. For example, an outgoing employee that copies or deletes hundreds of documents from their UKIDS 160 on their last official day at work is quickly identified using the Security Alert Chart 500.

As illustrated in FIG. 10, the Security Alert Chart 500 includes a priority indicator 510 that indicates that the KID deleted pertains to high priority clients. Business unit leaders or other authorized personnel can designate which portions of a user's COTA UKIDS 160, if any, can be downloaded and taken to the user's next job. For example, a user can take KID within the TAO subset 210 and some corporate KID such as, for example, information on their own 401K benefit plan. User's are prohibited however, from taking KID corresponding to important or confidential output KID such as projects relating to new product development.

Business unit leaders can also designate portions of the user's COTA categories 200 that are of highest priority in terms of theft of intellectual property. For example, in FIG. 10, the Security Alert Chart 500 indicates at 510 that a former sales person deleted a large number of high priority client folders before leaving ABC Co. A priority rating of "1.2" represents that the user either deleted client files or files assigned a high priority by business unit leaders. The volume of deletions is a strong sign that the former sales person may have been attempting to steal or damage files. Additionally, since the COTA system 100 facilities backup processing, the COTALOCK security software compares previous backup files of the former sales person's COTA categories 200 and determines exactly which files where taken.

(5) The COTALOCK security software creates a list of KID that should exist within an employees COTA categories 200 based upon comparisons of, for example, a global enterprise COTA categories and the former employee's computer. Management and/or legal teams can reference the comparison to determine what was deleted and how it fits in to the context of the employee's departure. Attorney's can more readily prosecute former employees for theft of intellectual property because for the first time, they have a paper trail of transactions and an easily navigable back up from which to draw comparisons.

(6) The reviewer can direct the COTALOCK software to create special reports on sensitive topics. For example, a reviewer could request that the security software provide reports on output that is classified or secret. The software can also be requested to provide greater tracking of specific KID, for example, KID pertaining to important clients.

(7) The reviewer may also focus reviews on particular COTA categories 200, for example, during a first year of employment the review may be limited (e.g., COTALOCK software may be limited to reviewing) KID within an employee's "4. administrative" subset. In second and later years of employment, the review may be expanded to consider all aspects of the COTA categories 200 or focus upon selected ones, e.g., "1. clients" subset.

The inventors have found that the COTALOCK security software acts as a deterrent to theft, duplication, print out, deletion etc. of intellectual property. Additionally, the COTALOCK software prevents large-scale deletion of KID because comparisons can be made to backup files and "lost" KID may be recovered.

15. Secure Folder System

In the U.S. legislation such as, for example, the Sarbanes-Oxley Act, require enterprises to more accurately track and manage important business documents. The inventors have found that many enterprises lack a strategy for managing information stored in individual employee's file management systems such as, for example, their personal file folders, electronic files such as "C:\My Documents," etc. Since users are free to configure their file management systems "on the fly" and without any standardized structure, prioritization scheme, or guidelines, there is virtually little chance for an enterprise to monitor mission critical documents. The death, replacement, departure of just one key individual could significantly impact an enterprise's ability to respond to an important task.

As described herein, the COTA system 100 provides a universal KID management structure to address the aforementioned and other challenges. Specifically, the COTA system 100 provides a solution for managing enterprise critical KID in accordance with document tracking legislation such as the Sarbanes-Oxley Act. COTA Secure represents a completely different approach to the storage of critical KID. With the implementation of an enterprise-wide UKIDS 160 a mandatory location within the UKIDS 160 can be assigned for storing critical KID in all employee's COTA categories 200. In one embodiment, the COTA Secure module:

(1) Assigns non-modifiable, fixed pathways within the UKIDS 160 for storing critical documents.

(2) Places a non-deletable, standard folder in the fixed pathways.

(3) Enforces education and training principles taught to employees regarding the importance of placing critical KID into the standard folder by periodically sweeping each employee's UKIDS 160 and retrieving KID stored in the standard folders. Comparisons are then made to determine whether the employee is following protocols established within the COTA Secure module.

(4) Issues warnings to employees who are not placing the critical documents into the standard folders or who tampering with the folders in any way.

(5) Scales the individual secure folder pathway structure to larger sites (e.g., Internet or Intranet sites) for easy comprehension and location of critical documents.

Many applications exist for the COTA secure module such as, for example:

(1) Secure primary (Level 1) or other COTA categories 200 such as Level 2 "clients," "output," "teams," etc.

(2) Secure key COTA target pathways. For example, the marketing team might create a secure pathway to the sales department's COTA categories 200 such as "COTA/2. Output/Widgets/Pricing."

(3) Enterprises might want to secure policies and procedures information.

(4) Key departments such as a training department may want to secure training information to maximize retention of critical information, etc.

Securing certain portions of employee's COTA categories 200 preserves quality and allows the enterprise to leverage standardization. The COTA Secure module provides a skeletal framework that can't be changed without authorization. The COTA Secure module can secure any KID such as documents, folders, or sub-folders that might exist within a UKIDS 160. The inventors see a significant benefit to users of the COTA data targeting software.

16. Resiliency/Disaster Recovery Software

Enterprises typically formulate plans to recovery KID lost in the case of catastrophic events. Most recovery plans preserve of the KID that has been accumulated to date in a separate location. Current plans do not have a strategy preserving and restoring a contextual understanding of what a departed user's Knowledge actually means to the enterprise. For example, once a person's KID is saved, how does a replacement quickly understand what all of the KID really means? The KID stored in any individual's computer represents a significant investment to the enterprise. However, the vast majority of individuals do not have a LOCK system for storing KID that is easily navigated or understood by co-workers. Therefore, even if a recovery team rebuilds lost KID, if the creators of the KID are not available the corporation lacks the ability to make sense of an alarmingly large portion of the rebuilt KID.

The COTA system 100 provides a solution in the form of COTA Resiliency Software (CRS). Use of a consolidated and structured UKIDS 160 such as is employed within the COTA system 100 makes the reconstruction of a departed individual's KID less complex. Recovery agents search only a central data repository (e.g., the UKIDS 160), which has a familiar and useful structure to locate important KID. As described above, the COTA system's 100 UKIDS 160 contains clustered and prioritized KID. A new user can quickly review the UKIDS 160 and gain a content and contextual understanding of the KID.

In one embodiment, the CRS creates e-mail messages by cross-referencing the COTA system 100 and the enterprise's time management contacts. The messages are customized and are immediately launched by the recovery crew. These messages contain important information on what has happened and how business is affected. These messages contain new contact information so that clients can contact key personnel and ask questions about critical issues. These messages also provide timelines or reference key ongoing projects. The CRS educates replacements on a departed user's COTA UKIDS 160. The CRS takes replacements on a virtual tour of all KID and helps them to understand what matters most. CRS acts as an agent by analyzing the departed user's priority client list and cross-referencing that list to time management tasks, calendar dates, and email messages. For example, CRS creates a list of messages of importance to the replacement worker. This list includes, for example, messages such as:

"A review of your COTA system indicates that the prior user had a calendar appointment with a #3 Priority Client-Client 1, at 2PM on Tuesday August18th. Top priority current projects with Client 1 include Widget Proposal and Anvil Proposal. Both can be found at 'COTA/1. Clients/Client 1/Proposals.' There is a highly prioritized task that references #3 Priority Client, Client 1, that reads as follows: 'Complete Widget Proposal by August15th'."

CRS runs mock trials of disasters and allows users to become adept at quickly understanding and leveraging existing LOCK systems for deceased or injured co-workers. In the past this type of training was difficult because of the variety of information management methods being deployed. Employing a standardized UKIDS within the COTA system maximizes transferability. It also provides a standard for all employees to strive to achieve. Standardization allows coaching and performance review of the quality of employee's UKIDS storage within the context of disaster recovery. CRS comes loaded with analysis tools that help disaster recovery experts to ascertain the true transferability of a given system. COTA Consultants can help enterprises target and test the most critical users' COTA Systems. COTA Systems receiving high marks from CRS would be easily transferred to other workers, new hires, replacements, etc.

The following scenario describes how CRS functions.

(1) On Oct. 5th 2008 an earthquake demolished a large sky scraper in the San Francisco bay area. ABC Co.'s headquarters was destroyed and many people died in the tragic event. On the east coast, a team of recovery experts immediately springs into action using existing KID recovery tools and CRS. The team recovers ninety percent (90%) of the Knowledge that existed before the quake.

(2) Jake Smith, a disaster recovery expert, was assigned to David Day's knowledge system. David had been killed in the earthquake. The system that Jake was reviewing included all of David's KID and computer information and settings that had been backed up by ABC's IT department through a third party vendor. Jake finds it relatively easy to examine and manipulate David's KID because it is stored under the COTA system principles.

(3) CRS takes Jake on a tour of David's COTA system 100 and UKIDS 160. CRS points out "clients," "output," "teams," and "administration" priorities. Since Jake is familiar with the COTA system 100 priorities he quickly understands the nature of David's job. He feels that he could quickly locate almost any file folder in David's system. CRS runs Jake through some quick exercises to see if he can find files within David's System.

(4) CRS then compares David's COTA system with his time management system (e.g., Outlook). CRS generates standard emails explaining what has happened to all of David's clients. Jake can edit and review the messages before sending them. CRS also provides a list of a predetermined percentage (X %) of David's top priority clients so that Jake can spend more time reviewing tasks, appointments, and projects with these clients. For example, CRS brings up all of the tasks and appointments scheduled with David's top X % clients. The prioritization used in the COTA system 100 provides an ideal tool for Jake to address issues that would have mattered most to David.

(5) CRS focuses on finding mission critical projects, appointments, deadlines, that must be met in order for an enterprise to survive.

(6) Within two hours Jake feels that he intimately understand David's job. CRS provides additional software so that Jake can efficiently train and update David's replacement.

As illustrated above, CRS helps to preserve and transfer what is arguable the most important asset of any enterprise, its KID. CRS provides enterprises with a new and useful tool in their resiliency planning. They can now quickly understand and interact with the departed employee's information more rapidly. Today's recovery tools do not recover a person's tacit perspective and understanding of their own job. CRS does.

17. Meeting, Agenda, and Notes Process/Software

The inventors have found meetings are a common event within most enterprises. Meetings usually consist of a series of topics melded together within the framework of an agenda. Attendees often feel that parts of the meeting are "pointless." One reason that apathy and boredom ensue is because attendees feel disconnected from the material presented. That is, attendees fail to see the significance of a presentation to their every day job responsibilities. Good meeting leaders remind attendees of the importance of each aspect of the meeting on their jobs. Leaders often struggle to win over the group to the purpose and mission of the meeting. The inventors have discover that this may occur because attendees lack a simplifying structure that places each portion of a meeting into the context of their jobs. Additionally, the inventors have observed that when attendees return home from a meeting or convention they often have a huge amount of materials to store. This can be a time consuming and difficult process.

The COTA system 100 provides a solution to some of these challenges. A COTA agenda module formulates an agenda that is broken out by the COTA categories 200 that can be used by the employees to store all of their KID. Utilizing a familiar and useful structure as a basis for agenda creation provides meeting planners with an ongoing metaphor that underscores the importance of each portion of the meeting. The COTA agenda module contains pictures and layout tools that allow the agenda creator to link each agenda item to the COTA system. For example, client discussions can be clustered together under the "1. Client" subset 230 of the agenda. In one embodiment, this section is color coded green. If client portions of the meeting need to be broken up, they can be linked together with the other client sections of the meeting in a master overview agenda document that is reviewed before, during, and after the meeting.

Hyperlinks into existing the UKIDS 160 of the COTA system 100 automatically color codes KID with COTA Colors (described below). The creator of the agenda can choose from graphics that symbolize client service, quality products, teamwork and the importance of administration. The COTA Agenda provides agenda layouts, images of the COTA Flow Chart (described below), quotations on clients, output, teams, and administration.

It should be appreciated that a meeting does not have to follow the hierarchy of the COTA categories. The point is that attendees know how meeting content relates to the COTA categories within the context of their jobs. Attendees also are constantly reminded of the importance of each section of the COTA model. As with COTA data delivery mechanism, handouts or presentations provided at the meeting should include storage recommendations and file pathways listed on them so that users know where to store each item within the COTA categories 200 of their UKIDS 160. PowerPoint presentations employ symbols, color coding, movies, file pathways, and graphics to orient the attendee to the relevance of each section of the meeting.

A COTA Meeting Notes software module assists users in taking notes on each section of the meeting. Notes, like the agenda items, are color coded and path labeled by the user. The COTA Notes software module allows for sections of a single notes document to be broken out and stored under various sub folders depending on COTA categories 200, if needed. COTA Color coding and file path designation allow the user to assign portions of a notes document to the appropriate sub folder. A master version of the notes can be stored under, for example, "3. Teams—Meeting Notes" subset. Additionally, all meeting content that is required by users can be direct deposited into their LOCK systems. As described above, a Direct Deposit Summary sheet can be provided to attendees so that they will know what and where KID was deposited before, during, or after the meeting.

All hard copy materials such as brochures, binders, CD ROM, etc are color coded and include a clearly labeled storage location within each attendee's UKIDS 160. This reduces the complexity of storing materials acquired at a meeting.

18. Interview Software

The inventors have discovered that some interviewers miss crucial aspects of an interviewee's professional history and skill set. The problem may occur when the interviewer is focused on one aspect of an applicant's career. Structuring an interview can be time consuming and difficult. The challenge of summarizing an individual's professional and personal accomplishments is difficult because interviewers often have no overarching, familiar, and useful organizing principle for KID collection during an interview.

The COTA system 100 provides a solution to this challenge by providing COTA interview software. The COTA interview software provides a series of interview questions for each COTA category 200. This allows the interviewer to cover main areas of a business career, for example:

(1) How was an interviewee providing value to clients;

(2) What is the extent of output knowledge and how has the interviewee developed it;

(3) What team contribution has the interviewee made to the delivery of output to clients;

(4) What administrative process capabilities does the interviewee possess; and (5) How has the interviewee combined items (1)-(4) to create maximum contribution and value to a former employer, enterprise, etc.

COTA represents all of the major areas or buckets of information for an individual's career. Therefore it makes sense that those buckets should contain valuable information for evaluating the success of an employee's career. The COTA interview software module contains pre-set questions that cover these important areas. The user selects questions for each section of the interview: Clients, Output, Teams, Admin, and combination of the COTA categories. The COTA interview software also has a tool that helps interviewers to create their own questions. All of the questions are then melded into an interview document that is easy for the interviewer to use because it progresses logically through the familiar and useful COTA structure used possibly by both the interviewer and interviewee on a daily basis. Color coding and an automated scoring section help the interviewer to automatically score applicants. The COTA interview software can read an applicant's COTA Map from a prior job and generate questions based upon the COTA categories. All traditional interview techniques can be employed but the overall structure of the interview is what changes with the implementation of the COTA interviewing software.

19. Flow Charting Software

Flow charts are commonly used within enterprises to describe processes. Individual business units, teams, and individuals create a multitude of flow charts that vary tremendously. The variation erodes the comprehension of flow charts through out organizations. In addition, many individuals do not understand the importance of creating flow charts. They fail to see that "a picture is worth a thousand words" and choose to create long documents that are difficult for others to understand.

The inventors have developed a COTA Process Flow Charting software that improves upon conventional process flow charting software such as, for example, VISIO and FLOW!. While including some of the traditional features of conventional process flow charting software, the COTA Process Flow Charting software provides a global starting point for all enterprise flow charts. For example, the COTA Flow Chart software provides contextual path information that orients viewers to the COTA categories 200 from which a particular flow chart belongs. Each COTA flow chart contains a color code key/path description that describes what COTA category a flow chart is related. In one embodiment, the COTA Flow Chart software is programmed to nest a flow chart within a larger sub-folder flow chart. For example, while presenting a flow chart a speaker can show an administrative flow chart being described coming out of the "4. Administration" subset.

The COTA flow charts reside as individual folders within the COTA system 100 but for presentation and research purposes the flow charts can be sorted out and shown in a vacuum. This allows users to pull all flow charts created out of the COTA system and see how they fit within the context of the individual, team, and enterprise. This feature helps enterprises understand key administrative processes. All processes can be viewed within a super structure for the first time. Key processes can be flow charted throughout an enterprise and then viewed together as a series of interlinked processes nesting one within another. Being able to view processes within the context of a master flow chart allows enterprises to become more efficient and productive.

20. Needs Assessment Software

The inventors have discovered that many business teams find it difficult to accurately assess the needs of both internal and external clients. As a result, many enterprises lose valuable external customers who are better services by competition. Dissatisfied internal clients can create a negative image of an internal team that can result in loss of personnel, funding, and even outsourcing. Failure to please internal and external clients can result in significant difficulties.

The COTA system provides a solution by providing a COTA Needs Assessment tool. The COTA Needs Assessment tool leverages the familiar and useful COTA categories 200 to assess client needs. The user develops a needs assessment within the context of the COTA system 100. When the Needs Assessment tool is invoked the user navigates file folders with the exact same methodology as they navigate their COTA categories 200. However, instead of the subsets containing documents the user finds needs assessment questions and guidance. In one embodiment, the user can add customized questions to the appropriate COTA categories 200. The user selects standardized and/or customized questions that they want to use in the needs assessment. The user then visits a client and follows the COTA categories structure asking questions such as, for example, the client's goals, objectives, etc. The user also asks questions about the client's needs. The user fills in the client's answers to the needs assessment questions as they relate to each aspect of the COTA categories 200. In one embodiment, results from the needs assessment are stored within that a "client" subset for the assessed client. Current needs assessment tools do not mirror the structure of a user's UKIDS. Also, current systems do not open and query users through a series of questions that relate directly to COTA categories 200.

Exemplary questions include:

(1) Client Questions:

What are your key goals and objectives for the next twelve (12) months?

What do you need to accomplish this year?

What obstacles do you see in the future?

Can you tell me about your internal or external clients?

What aspects of your team's mission keeps you up at night?

What would you like to achieve if you had unlimited resources?

Lets discuss your idea of return value. What do you think is fair return value for poor output, good output, and great output?

If we provide you with excellent output, would it be possible to increase return value through increased loyalty, volume commitments, extended contracts, etc.

What are your personal interests: Sports, Music, Family, etc.

(2) Output Questions:

Please describe what excellence in Output/Products/Services means to you?

What will your current output needs be for the coming year?

How would you rate my team's output?

List areas of improvement and strengths of my output?

What is your budget for output this year?

What kinds of value added output would be helpful to you?

How would you compare my output to my competitor's output?

Why would you say you give X amount of business to my competitor?

(3) Team Questions:

Please describe your idea of an excellent Vendor Team.

Which vendor team is your favorite team? Why?

Please be frank: How would you describe my Team?

Have you ever been left high and dry by one of your vendor teams?

Can you describe the incident and relate your impressions of the experience?

How can we best service your team in the coming months?

(4) Administration Questions:

Can you describe your administrative needs in the coming years?

Will your team be requiring any new administrative processes this year?

How do you prefer to communicate, be invoiced, receive quotes, etc.

21. Client Satisfaction Measurement Tool (CSMT)

The COTA Client Satisfaction Measurement Tool (CSMT) is used by individuals, teams, and the entire enterprises. CSMT provides a series of questions to judge an internal or external client's current level of satisfaction with a team's provision of Output. What makes COTA CSMT unique is that the results of the survey (e.g., percent satisfied) are posted within the user's UKIDS 160, e.g., next to the particular client's "1. client" subset (shown generally at 550 of FIG. 11).

Figure 11:
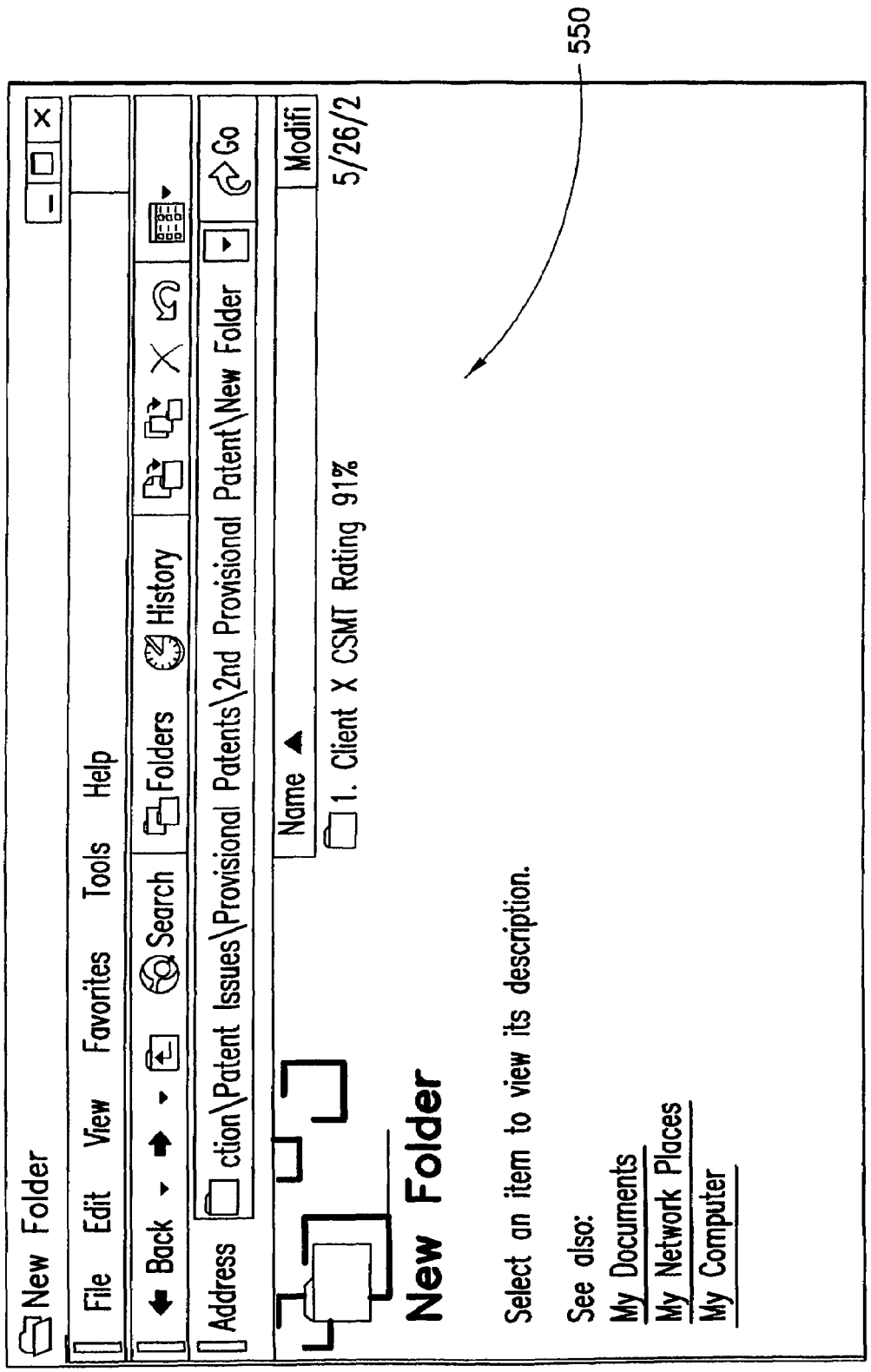
FIG. 11 depicts one embodiment of a client portion of a UKIDS including a display of a client satisfaction measurement.

As illustrated in FIG. 11, CSMT provides an ongoing measurement reminding the user of their rating with that particular client. Users, Teams, or Enterprises can use Client Satisfaction as a useful sortation device. For example, an enterprise can assemble a list of its top five percent (5%) "most satisfied" and "most dissatisfied" external clients by searching UKIDS 160 of its sales staff. The inventors have discovered that sorting clients by "satisfaction level" is an excellent way to improve overall sales and efficiency. The satisfaction questions can be tailored to a specific client or be pulled from a bank of questions in the software. Enterprises have an option of developing a uniform CSMT tool for all teams through the deployment of standardized questions. So the questions can be all custom, all standardized, or a mix of both. The user or enterprise can sort by Satisfaction level. The placement of the satisfaction rating next to the "1. client" subset is a constant reminder of a particular satisfaction rating. In one embodiment, the user can select the satisfaction rating and open the COTA CSMT Survey to review specific responses of a client.

Exemplary satisfaction questions include:

(1) Please rate our team's performance on a scale of one to five (1-5).

(2) Please rate your satisfaction with our team's output on a scale of one to five (1-5).

(3) Did our output meet your needs over the past three (3) months.

22. On-boarding Team Book

Teams often put together what may be referred to as a "team book," "battle book," "on-boarding book," "orientation book" or the like, to document team activities, mission, goals, participants, roles, etc. Invariably information is randomly placed in various parts of the book, as there are generally no structural guidelines given. Accordingly, team books are all created differently. If a person leaves one team for another they will find a completely different book with completely different structure. This makes such books cumbersome to use for both new and experienced team members.

In the COTA system 100, a COTA battle book leverages the familiar and useful UKIDS structure and COTA categories to determine its structure. For example, information relating to client is followed by information relating to output, which is followed by information relating to teams, which in turn is followed by information relating to administration.

23. Scale-Scalability Software

Today's Knowledge workers are confronted with a vast array of public folder structures and net structures. As a result, site designers are often confused and surprised that so few people use sites that may have cost enterprises hundreds of thousands of dollars to design and implement. Many business leaders lament that the public folders application is underutilized. This highly useful tool is often ignored because users are tired of suffering for information in multiple divergent data structures. Information technology experts often complain that the information residing on an enterprises server is "a structural mess!" This common concern arises from the fact that users create a large and disorganized amount of folders and documents that are stored in the server/web with almost no thought of how their information fits into the enterprise's overall information management scheme. IT experts commonly complain about bizarre folder and document names. They also say that upkeep of server document sites is an extremely tiring, boring, and time consuming task. They have no way of knowing what information is important or obsolete. The storage space consumed by useless documents on servers is also a concern. It is hard to envision a future in which both individual and enterprise storage is not unified in some way by an overarching set of standards and guidelines.

Once again, the COTA system 100 has a solution. A COTA Design software and consulting allows designers to scale the COTA categories design to servers, public folders, intranet websites and all manner of KID storage. The COTA Design software helps users build sites around the familiar and useful COTA categories saving design time, reducing costs, and improving the usefulness of KID storage sites. Users surfing these sites find it extremely easy to find information because the sites mirrors their own COTA systems 100. The functionality of the software can also be communicated manually via licensed COTA Consultants.

The COTA Design software includes, for example:

(1) Design tools for websites linked to the COTA categories, color code, guidelines, flow chart process etc.

(2) Instruction Builder—Designers can pull instructions from a standardized instruction bank. This makes it easy to communicate COTA guidelines.

(3) Site Builder Tool—A software interface that allows the user to build portions of the site by surfing through what appears to be a COTA file folder system. First, the user opens the "clients" folder and answers a series of queries that help the software to build the client structure of the site. The same process is repeated for each COTA category, e.g., output, teams, and administration. The user can then add features such as, for example, a bulletin board and news section.

24. To Do List

A COTA To Do List creates a task list that is sortable by the COTA categories structure. The task list is color-coded and sorts based upon the COTA hierarchy. This helps the user to see what they need to accomplish for clients, output, teams, and administration.

25. Time Management Enhancements

The COTA system can extend the COTA hierarchy (e.g., COTA categories) and color coding into time management processes such as tasks, calendar, contacts, etc., so that users can sort tasks by the familiar client, output, team, and administration subsets. Color coding allows for users to see a different dimension to their information. It also allows for a synergistic relationship of programs like Outlook and the COTA system. The COTA system allows Outlook information to populate into a COTA categories 200 of the UKIDS 160. In essence this provides a new and useful means for sorting any kind of information found in a time management/Outlook/Lotus Notes type of software. An example of this would be green color coding of all client email messages. This provides a secondary sortation device that allows users to prioritize incoming information.

26. Organizational Chart

The inventors have realized that some team members struggle to understand which people within internal or external client hold what positions. Decision-making is generally better when team members are placed within their hierarchal context by teams that are serving them. For example, it is generally important to know whom the primary client contact reports to. It is also important to know who is subordinate to the primary client content or at a peer level. When an employee leaves an enterprise, they often take such intimate knowledge of the client's/team's internal structure with them. Without this information miscalculations can occur such as, for example, failing to recognize a high-level executive at a meeting. Similar challenges emerge when building internal organizational chart and team rosters.

The COTA system 100 provides a COTA Organizational chart that works in conjunction with contacts information stored within, for example, time management programs such as Outlook, Lotus Notes, etc. The COTA Organization Chart software allows users to automatically sort all of their clients and then paste those clients into an organization chart. COTA users simply select and drag contacts folders into a COTA Organizational Chart page. Using the Organizational Chart software, the users arranges the folders into appropriate places and use flow chart style arrows to connect contacts in a simple and highly transferable feature. This feature allows for a simple mental model of client accounts to be developed, leveraged and easily transferred to other team members.

The same Chart building methodology can be used to build any kind of roster. For example, a COTA Roster Builder allows copying of contacts into a shell for the purposes of populating a roster. This feature is much faster than typing address information into a spread sheet or developing a mail merge type application for a team of say ten (10) people. Rosters or organizational charts can be created by copying contacts information into charts as above or spreadsheets. The COTA Organizational Chart software also allows the user to preset aspects of the contact file for display such as, for example, name, title, address, phone, etc.

27. Filing Cabinets

Figure 12B:
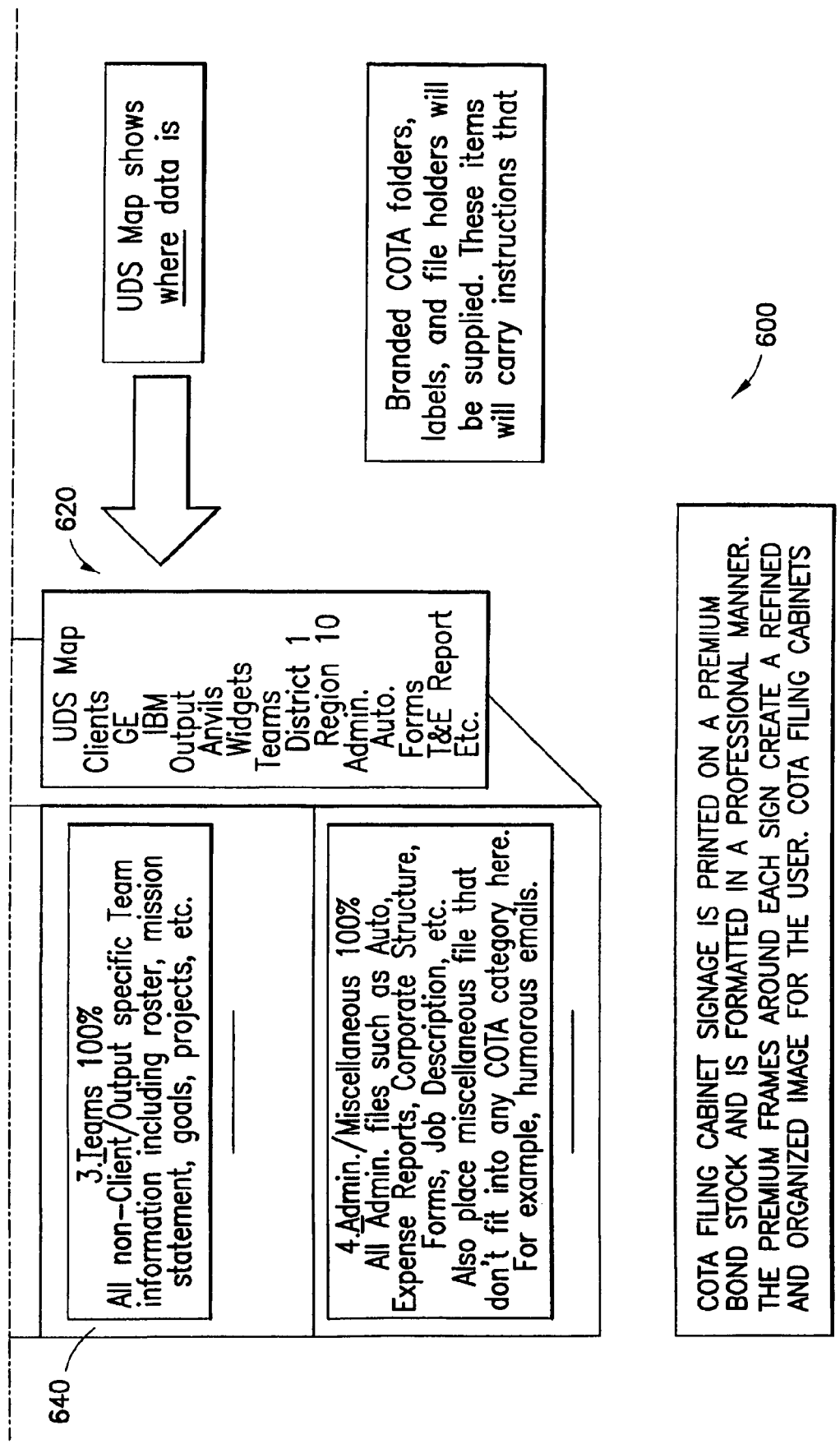
FIG. 12 is a simplified block diagram view of a physical storage silo displaying various mechanisms guiding knowledge, information and data storage in the silo in accordance with principles of the present invention.

The COTA system 100 includes an inventive arrangement of physical or hard copy KID storage mechanisms. One mechanism, depicted in FIG. 12, is a COTA filing cabinet 600. The COTA filing cabinet differs from convention filing cabinets in the following ways.

(1) Unlike other filing cabinets, the COTA filing cabinet 600 includes clear and concise directions on how to file KID using the COTA system 100. In one embodiment, the directions document, referred to as 'COTA Guide' 610 fits neatly into an attractive, built in transparent pouch on a side or a front portion of the filing cabinet 600. The COTA Guide 610 reminds users of some basic guidelines for setting up and maintaining their KID using the COTA categories.

(2) The COTA system 100 provides a COTA map document 620 detailing the contents of the COTA filing cabinet 600. Preferably, the COTA map 620 is a summary of the user's specific data layout within COTA. The COTA map 620 is updated periodically to reflect the current contents of the COTA filing cabinet 600. Anyone who needs related KID from the filing cabinet 600 consults the COTA map 620 and quickly locates the KID stored therein. This feature is optional and not recommend for those who have highly sensitive KID in their COTA cabinet 600.

(3) The COTA filing cabinet 600 includes cards or labels 630 that are attached to the front of draws 640 of the filing cabinet 600 for defining each major COTA category stored within the draws 640 of the filing cabinet 600. The cards 630 include a percentage that indicates how much of the draw 640 includes KID related to a referenced COTA category. For example, a first upper card 630 of the filing cabinet 600 notes that one hundred percent (100%) of the draw 640 includes client files. This feature allows the user to know exactly which draw contains KID within one of the COTA categories. It should be appreciated that KID from one or more categories may reside in one or more draws 640. For example, as illustrated in FIG. 12, KID relating to clients spill over into an output category draw.

(4) The filing cabinet may also come with a supply of filing materials including color coded COTA labels, COTA manila file folders, and COTA file holders. Each item comes with a clear explanation of how it is used within the COTA system.

It should be appreciate that the aforementioned cards, labels, maps etc. can be paper-based (e.g., made of card stock) or electronic (e.g., presented on a display device such as an LCD).

28. Shelves

A second hard copy KID storage mechanism employed by the COTA system 100 includes COTA shelves. The COTA shelves are constructed with indicators that show where each primary COTA category (clients, output, teams and administration) begins and ends. If most of binders or books for a particular user are found in one of the COTA categories (e.g., the output section), this section is stretched or marked on the bookshelf with sliders or other markers/partitions. In on embodiment, shelves include placeholders for the COTA Maps, the COTA guide, etc.

29. Spiral Bound Notebook Spines

The COTA system 100 also includes a labeling mechanism for spiral spine. As can be appreciated, it is generally difficult to identify on a spline the contents of a spiral bound book that is sitting on a shelf. As a result, it is common for important information to be ignored because users eventually forget that a particular spiral bound binder was created for a particular reason. The COTA system employs Spiral Splines for tagging spiral binder. The Spiral Splines can be labeled and placed inside the spiral wiring of a spiral bound notebook so that the external label is clearly shown to the user. This allows an enterprise to leverage the low cost of spiral bound production while helping users to use and leverage the information without losing it. The spiral insert can be attached before shipping, with shipping, or purchased separately by users at any time.

30. COTA Keyboard and Mouse

A COTA Keyboard is similar to conventional Qwerty computer keyboards. However, several differences do exist such as, for example:

(1) Buttons are conveniently placed on a COTA keyboard for each Level 1 of the COTA categories 200 (e.g., COTA— "clients," "output," "teams," and "admin." as well as TAO— "teams and people," "activities," and "organizations"). When the buttons are selected the user is taken directly to that particular partition of stored KID which can then be navigated by mouse or other navigation means.

(2) Buttons are color coded and clearly labeled.

(3) Buttons are large and easy to press without even looking up from the screen.

(4) In the COTA system 100 the buttons can be password protected, e.g., "clients," "output," "teams," and "admin" buttons can provide immediate access to corresponding COTA categories while "teams and people," "activities," and "organizations" buttons representing the personal TAO categories can be password protected. Of course, one or more of the buttons corresponding to any of the COTA categories may be password protected.

(5) Function key buttons can also be programmed for the same functionality. When function or shortcut keys are used, color-coded labels or plastic covers can be placed over the keys to identify the COTA pathway that they represent. The COTA Keyboard functions all operating environments, e.g., WINDOWS 95, 98, 2000, LINUX, etc. platforms and with the Locate and Leverage methodology described herein.

(6) Additional buttons may or may not be added to the COTA keyboard for common document manipulation techniques such as, for example, "save," "saveas," "copy," "paste," "insert," etc.

In one embodiment of the COTA system 100, one or more buttons representing the COTA logical partitions 200 may be added to a standard mouse. When depressed, a user can navigate directly to a particular partition in the UKIDS 160. Buttons can be placed in any convenient place upon the mouse. This allows the user to navigate with greater speed and agility. Additional buttons can be added to the COTA Mouse for the most common document manipulation techniques such as, for example, "save," "saveas," "copy," "paste," "insert," etc.

An example highlights some benefits of implementing the COTA Keyboard and Mouse. A user with the COTA Locate and Leverage technology and the COTA Mouse and Keyboard receives an email with two attachments. They want to save one of the attachments in "COTA/1.Clients/GM/Widgets" and the other in "COTA/Output/Widgets/Pricing" folders. The procedure includes:

(1) Highlight the first attachment and hit the "client" button on the COTA Keyboard and then use the COTA Mouse to select a "GM/Widgets" folders then hit a "save" button on the inner right portion of the COTA Mouse.

(2) Highlight the second attachment and hit the "output" button on the COTA Keyboard, use the COTA Mouse to select "Widgets/Pricing" folder, then hit the "save" button on the inner right hand side of the COTA Mouse.

Contrast this with the steps that a user might take in the current hardware/software configuration:

(1) Select the first attachment, select a "save" command from a menu, select a "C:/My Documents" folder, select "Clients/GM/Widgets" folder and click on "save" button again.

(2) Select the second attachment, select the save command, select the "C:/My Documents" folder, select "Output/Widgets/Pricing" folder, and select a "save" button.

Generally speaking, use of the COTA Keyboard and Mouse requires a total of fourteen (14) actions, while the conventional process requires twenty (20) actions. In other words the COTA Keyboard/Mouse/Locate and Leverage scenario saves the user about thirty percent (30%) of the manual effort required to save an attachment. When one considers that there are almost one billion computers in use worldwide, a thirty percent reduction in a fundamental task could result in billions of hours of saved time and increased productivity each year.

Optional features that may be added to the COTA Keyboard and Mouse are "favorites," "TAO categories," "data targeting," etc.

The UKIDS/COTA Mouse and Keyboard can also be configured to work with PDAs, cell phones, etc. This will allow users to navigate through their actual COTA system or a COTA Map, Guide, or Shell. This will allow a user to operate two devices with the same input devices. Standardizing input devices will make operation of these devices more intuitive although size of keyboards and mice may limit usage in some situations.

31. COTA Meeting Material

The COTA system also employs a COTA Meeting Material that includes folders of various sizes having partitions that allow users to store the contents of a meeting in a logical manner based upon the COTA categories. The COTA Meeting Materials include, for example:

(1) A four (4) compartment folder holder with designations for each of the COTA categories (client, output, teams, and administration). These folder holders are clearly labeled and color coded.

(2) Binder design and partitions: Some meetings include the distribution of binders. Binders can be sub-divided by the COTA categories and employ COTA Color Coding. Binders on a particular COTA sub-category, for example, an expense report binder, can be pre-color coded and COTA Labeled for easy storage after the meeting.

32. COTA Kit

Working with filing cabinets, book shelves and CD ROM libraries requires a large number of office supplies including file folders, labels, folder holders (large and small), folder holder tab holders, folder holder tab inserts, CD ROM holders, spine inserts, spine labels, etc. Another problem is that users are usually not given any guidance as to how to structure their filing cabinet system.

After a user has converted their computer storage system to COTA methodology, all physical storage platforms to can be converted to the COTA methodology. To ease this transformation, a COTA Kit is provided. The COTA Kit includes all of the filing and office supply materials needed to convert the current filing cabinet, book shelves, and CD ROM library to a COTA system 100. The COTA Kit can sit in a milk crate sized file folder box. The COTA Kit contains an external sleeve for the user's COTA Map, Guide, and a table of COTA Kit contents. The COTA Kit includes, for example:

(1) Regular and large sized hanging File folder holders, file folder holder tabs, color coded laser labels, Manila folders, CD Rom Holders, Binder Spines, COTA Spiral Spines (see description below), Magic Markers, Spine supports, and all items needed to convert an normal size Filing Cabinet, CD Rom Library, Title Labels and inserts, and Book Shelf and Binder Shelf over to COTA.

(2) The COTA Kit also contains an actual prototype of how the user will structure files. In other words, if the user is working with COTA they will receive a prototype that shows:

(A) How major Partitions are defined (Left-most folder holder tab) (proposed color coding: "1. Clients"=Green; "2. Output"=Blue; "3. Teams"=Yellow; and "4. Admin."=Red), (B) How sub folder holder tabs (e.g., Client 1) are color coded and placed (Center position)

(C) How file folders are color coded and place (1. Clients=Green, 2. Output=Blue, 3. Teams=Yellow, and 4. Admin.=Red) using right cut file folder tabs, for example. The effect of this strongly suggested placement is that the user can read titles from General to Specific locations from left to right, which mirrors the way that most computer software sets up filing architecture. The prototype serves as a constant reminder of the enterprises preferred structure.

The COTA Kit includes spine labels for binders and marketing materials that have no designation in their spine. The COTA Kit also includes everything the user needs to create and label a manual CD ROM library with the COTA categories.

33. Labeler

Users often struggle to maintain their hard copy filing systems for several reasons. Firstly, materials distributed to users often do not lend themselves to accurate storage. For example, spiral bound notebooks when placed on a bookshelf do not readily reveal the actual content of the binder. Many marketing pieces and three-ring binders are distributed without any spine designation. The problem occurs when the user needs to retrieve the binder but cannot locate it. Secondly, handouts are often given in brochure sleeves that do not fit into a filing cabinet folder so the user is responsible for creating and accurately labeling a folder. Thirdly, when creating file folders it is difficult for the user to use the same naming conventions as they used on their computers because users have no ability to quickly recall computer naming conventions. This leads to non-standardized file names between filing platforms. Finally, employees are receiving an increasing number of CD ROMs has been developed to date. No global strategies for labeling and storing these CD ROMs have been developed to date.

The COTA system provides a solution, the COTA labeler. The COTA labeler is a combination of software and printer that a user employs to create all of the folder labels, folder holder tabs, notebook/binder spines, CD ROM labels, file cabinet placards, CD ROM binder spines and chapter tabs. The COTA labeler contains the users COTA category information that can be displayed on a simple LCD or computer screen. The COTA labeler integrates into the user's printer, computer system, or sits as a stand alone printer-software computer combination on the user's filing cabinet or bookshelf. The standalone COTA labeler can receive wireless or wired updates of the user's COTA categories. The user can also create new folder names if necessary.

The following scenario describes how the COTA labeler saves time for a user:

(1) Joe has implemented the COTA system on his computer and is in the process of converting his filing cabinets to match the COTA structure as closely as possible.

(2) Joe needs to create a large number of new folder titles. Joe goes to his filing cabinet and sees the familiar COTA categories from his computer.

(3) Joe taps his way through the menu to select a computer file folder that he wants to recreate in his filing cabinet.

(4) The COTA labeler quickly prints out a color coded file label that contains the parallel title and file path for Joe.

Within 15 minutes, Joe has created and affixed his labels to the appropriate folders. This makes the file cabinet conversion extremely fast for Joe. The COTA labeler prints out labels for folder holder tabs and file cabinet drawer title cards. Once Joe has completed his filing cabinet conversion it is easy to keep it updated with computer printed labels. Joe's coworkers sometimes have to access his files when he is away. They appreciate the clean look of the fonts on the labels. The color coding and COTA structure/system make it easy to find Joe's information. Of course, it makes filing a breeze for Joe especially combined with a COTA kit.

34. CD ROM Player

CD ROM disks can be placed in a multiple CD ROM storage unit. The unit resembles a multiple (for example 300 disk storage) CD ROM Stereo component. All of the users Computer CDs can be placed into the unit. As each CD is placed into the unit, the user's computer allows them to assign a location based upon position within the COTA categories on the user's computer. For example, the client management software would be placed under "COTA/1. Client" within the CD ROM library. The position of the CD ROM will be shown within the COTA category structure or be side the COTA structure for documents within the portal 400.

When a user wants to run a game, business application, musical CD, etc. they simply select CD ROM on the portal 400 and select on the icon for that particular CD ROM. The CD ROM is then selected and loaded for use by the unit. The CD holder may or may not contain a CD burner. If it does contain a CD burner, new CD ROMs could be entered into the COTA system as they are created. This concept could apply to any digital or analog medium now known or developed in the future. Similar functions would allow for turning off the application and returning it to the CD ROM library. Combining the benefits of a UKIDS with CD ROM technology creates a powerful new tool for information managers.

As an additional feature the COTA CD ROM unit also leverages the COTA Data Targeting feature. If a department sends out a CD ROM to a distributed workforce, they can program code into the CD ROM that will cause it to automatically load to the appropriate place in the user's CD ROM display. The user can then see all of the CD ROMs that have been placed into the CD ROM Unit within the order of the COTA Structure. This will allow for faster location and installation of CD ROM discs in the user's system.

35. File Folders and Hard Copy

Each day millions of people search filing cabinets with their heads turned sideways trying to re-locate documents with key information buried in small print and rotated ninety degrees (90°). This is not a user-friendly method of searching for important letters, documents.

The folder or document can be pre-stamped with the file pathway and proper COTA labeling. Important documents can be labeled with a bold horizontal lettering across the left side so that they can be more easily retrieved in the future without forcing the user to cock their head sideways to read the small print on a letter or other sought document.

36. Color Coding Scheme

Color coding is used throughout all applications of the COTA system. A distinct color can be designated for each major logical categories (e.g., levels) and that color code is used to designate, for example: email, documents, software applications, file cabinet components (drawers, file folders, file folder labels, file tabs, file folder holders, etc.), book shelf components, CD ROM library components, the COTA portal 400, COTA PDA applications, and all other applications of the UKIDS.

One benefit of color coding is to make it even easier for people to find information by associating a distinct color with each major logical bucket of the Universal Data Structure. This color coding also appears on the desktop icons that signify the UKIDS entry point for the end user. Color coding can be leveraged by users and manufacturers of UKS merchandise to make the product more user-friendly.

One exemplary color coding scheme for the COTA system 100 follows:

(1) Clients—Green—Symbolized Value
(2) Output—Blue—Symbolizes Quality and Truth
(3) Teams—Yellow—Positive Role of Teamwork
(4) Administration—Red—Symbolizes the need for balance between administration and core job responsibilities.

Implementation

In another aspect of the present invention, an installation process leverages:

(1) Customer specific research and general research to underscore information overload challenge;
(2) The removal of risk of data storage reconfiguration through mandatory data back up;
(3) A motivational/inspirational presentation; and
(4) Humor to overcome the inertia to change felt by most knowledge workers and organizations.

The installation process itself includes the following steps:

(1) Pre-work—Trainee and organizational leaders completes pre-survey to determine level of information overload and information that will fill the COTA categories of respective UKIDS 160;
(2) Pre-work—Trainee backs up hard drive information which eliminates virtually all risk associated with restructuring;
(3) Class begins—Trainee (from any vocation) attends class and receives overview of goals of the COTA system 100.

The attendees are informed that they can return to their old system of organization (if desired) because they have backed up their information;

(4) Trainee shown how to install specific and universal COTA categories, e.g., Level 1 and Level 2 categories on their hard drive. In one embodiment, an educational CD ROM, instructor, or combination of technologies such as Web broadcast, is implemented to guide trainees through this step;

(5) Trainee shown how to install specific and universal folders at Level 3, Level 4, etc. For example, universal lower level folders include the "general" folders (e.g., "General Clients," "General Output," "General Teams," and "General Administration" folders), Power Added folders, Forms folders, Organizational Chart Folder, and more;

(6) Trainee instructed to install customized Level 3 Folders, which can be predetermined by management or the employee.

(7) Trainee adds additional standard COTA Level 3, 4, etc. folders;

(8) Trainee creates "COTA" and/or "TAO" category icons on lower, left side of windows, and desktop;

(9) Trainee is then taught the COTA system rule set (as described herein);

(10) Trainee shown how to convert existing database over to the COTA categories 200. For example, KID is re-labeled and relocated from existing file structures within a user's hard drive (e.g., "C:/My Documents") and email hanging file folders into the COTA system. All documents are specifically labeled for ease of future retrieval and time stamped to create an additional sort at the document/bottom level; and

(11) Trainee given specific exercises to re-enforce the COTA system skill set for future use.

Figures 2, 14A:
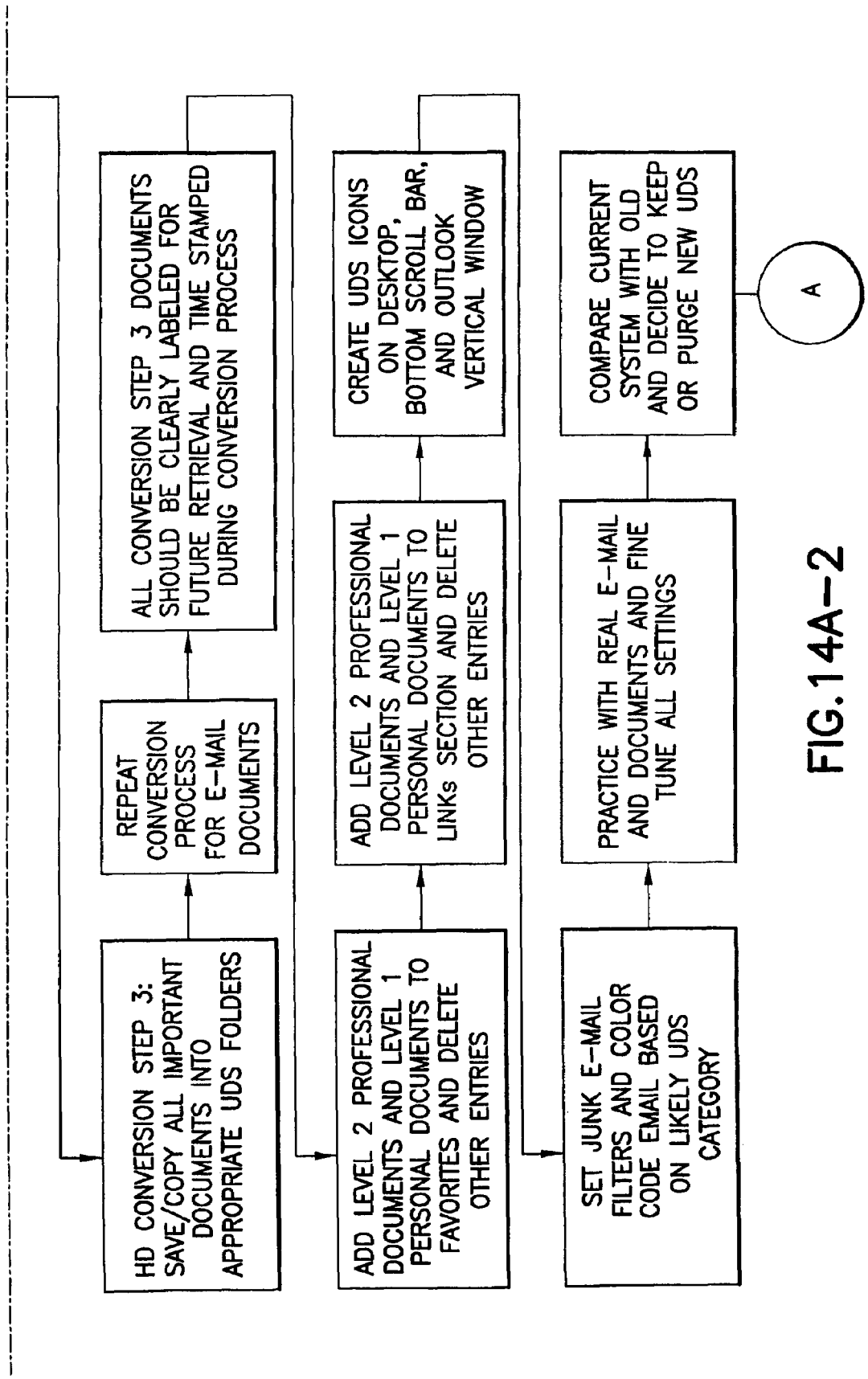
FIGS. 14A and 14B depict a simplified flow chart illustrating one embodiment of a process flow for implementing the COTA system.
Figure 14B:
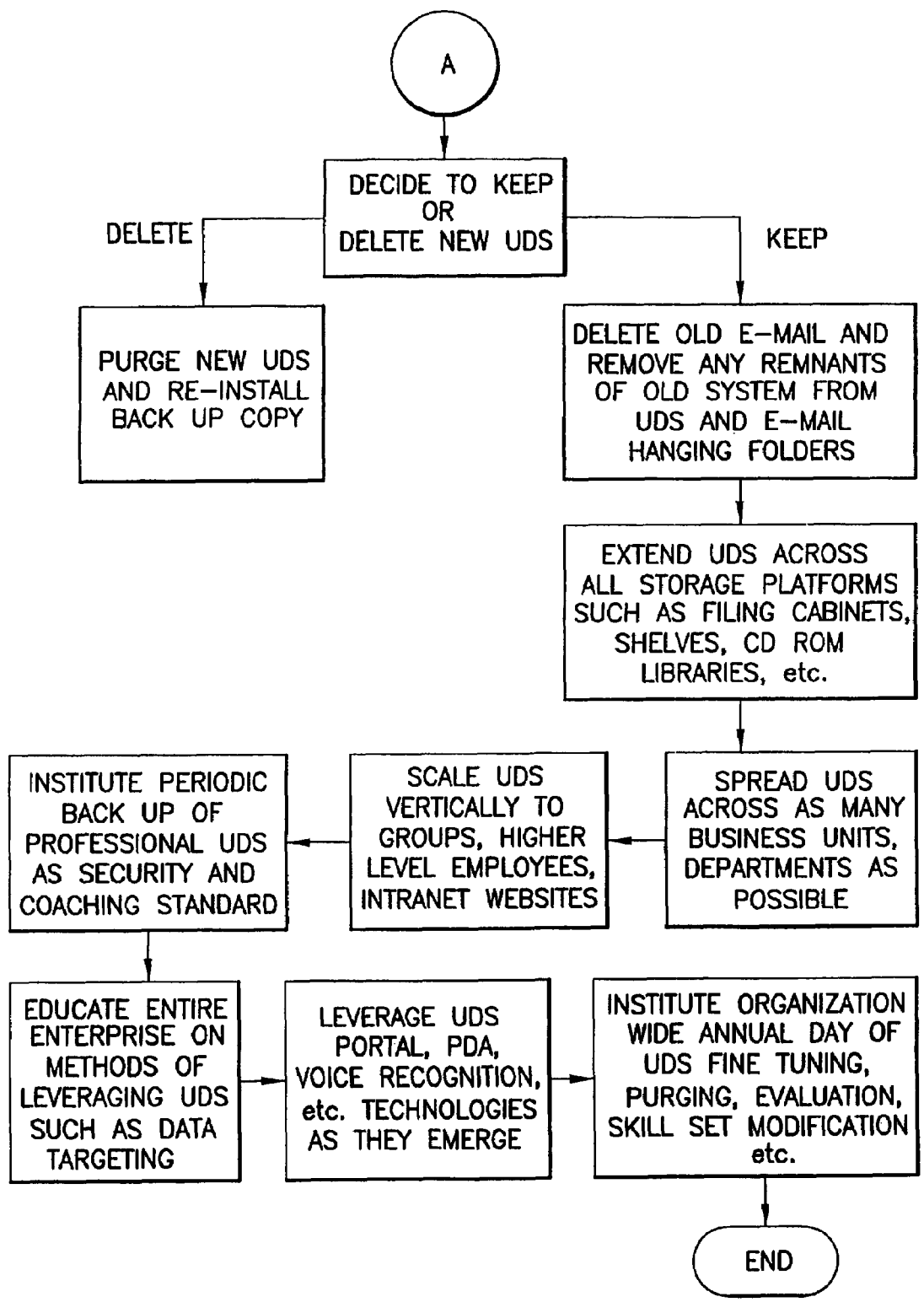

FIGS. 14A and 14B illustrate one embodiment of a process flow for the aforementioned implementation process. Once the installation process is complete, the trainee has a user friendly, simple, universal, scalable, transferable, and extensible filing structure installed on their computer. It should be appreciated that the COTA system implementation process is a unique process for restructuring data into a highly effective LOCK.

COTA Consulting and Training

In yet another aspect of the present invention, COTA authorized consultants provide insight and training into features and functions of the COTA system 100 and methodology. The process of converting an entire enterprise's KID systems to a UKIDS encompasses a process of, for example:

(1) Needs Assessment—The COTA Consultants study the current management of KID within a target enterprise.

(2) The COTA Consultants work with the enterprise to develop an implementation plan for the COTA system 100.

(3) The implementation plan include, for example:

(A) Replacement of multiple, unconsolidated data storage systems (MUDS) with LOCK Systems;

(B) Training for field to executive level employees (C) The COTA consultants look for any major business process in which large amounts of KID exist in an unstructured environment. COTA Agenda is a great example. Usually Team leaders do not think very much about creating universal content and context based agenda. COTA allows for a simple sub-division of meeting items based upon a known and familiar structure.

(D) The COTA Consultants look for situations where users have to search divergent silos for KID. The COTA Consultant takes these scenarios and offers redesigns and COTA products to create a uniform search methodology. An example of this is the implementation of COTA Business Plan. COTA Business Plan uses the same methodology to search for information as the COTA system.

(E) Data targeting meetings with all departments teach senders of information how to create cohesive targeted messages. The COTA consultants demonstrate how difficult it is for receivers to make sense of varied and poorly constructed messaging.

(I) Challenge: Enterprises spend millions of dollars sending information to their own people. Some departments have become almost obsessive about sending out multiple versions of the same message. For example, the Human Resources department of a large Fortune 500 company sends out their monthly benefits update via newsletter, letter, and email. This ends up costing the corporation a great deal of time and money. The fear is that the individual will not read and store the information so Human Resources send out multiple transmissions at a substantial cost.

(II) Solution: The COTA consultants assist enterprises in developing COTA targeting strategies for all business units. For example, COTA consultants meet with a marketing department that sends copious marketing materials to the Sales Department. The COTA consultants work with the Marketing Team to target their materials to a single place in the COTA categories. This could reduce the vast amounts of money spent on internal and external marketing.

(F) The COTA consultants help organizations to scale the COTA system from field level employees to upper management. Scaling is also extended to Public Folders and Intranet websites, which are configured to reflect the COTA structure.

(G) The COTA consultants assist organizations in educating various business units that may not feel that they have a "client." The COTA consultants find creative and powerful methods of revealing that all employees do create value for internal and external clients.

The COTA consultants provide enterprises with unique, proprietary UKIDS, COTA, and TAO instructional information that helps them leverage their COTA systems across the enterprise. The COTA consultants and trainers help develop and implement the COTA system and methodology at all levels of an enterprise. Once implemented across a team, business unit, and enterprise, the COTA consultants also demonstrate how the basic methodology is used for the creation of an effective UKID System. For example, how the COTA categories are leveraged such that KID received during the course of a person's professional and personal life fall into clear categories that can, in turn, be sub-divided. COTA Consultants will share this unique methodology with their clients.

COTA Leadership Consulting—Tool Kit Software

Executives often struggle to communicate meaningful information to the rest of the enterprise. It is difficult to describe complex business issues to entry level or even experienced staff. There are so many mental models for business that almost any statement designed to create positive change meets tremendous resistance from a large percentage of the enterprise. There are so many people competing for resources within an organization that Clients needs often suffer. IBM CEO Lou Gerstner describes these issues in vivid detail in his book "Who says Elephants Can't Dance?" These are some of the problems defined by Gerstner: (1) Some business unit leaders build fiefdoms by adding unneeded people to their ranks. (IBM Europe Team) They do this to gain prestige. (2) Some administrative processes become so difficult and legalistic that they paralyze progress in an organization. (IBM Admin. Team) (3) Finally, some individual's focus so heavily on their product that they forget that the client no longer needs the product (IBM 360 Mainframe).

The COTA system provides a solution by offering a COTA Leadership Toolkit. The Toolkit can be delivered via seminar or by software to business leaders by the COTA consultants. The COTA Leadership Toolkit helps business leaders to leverage their employees' familiarity with the COTA categories and mental models in order to explain complex business realities. Never before has an executive had a metaphor for so many potential business problems and challenges. Until COTA, no one has ever suggested using an enterprises storage structure as an executive instructional tool. The COTA Leadership Toolkit allows executives to design charts which reflect all of the above describe issues at IBM on a single page. For example, the COTA and free enterprise models of "clients," "output," "teams," and "administration" are leveraged to emphasize employees' role in achieving goals of the enterprise.

COTA Leadership Software

A COTA Leadership Software module provides:

(1) Tutorial on how to communicate with COTA categories in email messages, speeches, letters, etc.

(2) COTA Chart Creation Software (3) Integrating COTA Business Planning Software for your Team or Enterprise (4) PowerPoint Presentation for other leaders (5) PowerPoint Presentation for subordinates (6) Lessons on how to get External and Internal Clients to return maximum output COTA Quality Tune Up Software and Kit The COTA software can be updated to include periodic Quality Tune Up functions. These quarterly, bi-annual, or annual tune ups guide the user through the process of repairing any parts of their COTA system that are flawed. It also creates a back up copy of the user's COTA system 100, which can be used to for security and change management purposes at a later date. The Quality Tune Up includes a tour of the user's COTA System. The user can also show the software areas where there are problems.

TAO-COTA; TAO-TAO Lifetime Applications and Features

COTA and TAO Classes begin at the age at which an individual first begins to work with computers. TAO is the Personal section of the COTA UKIDs. COTA TAO software allows users to create a UKID shell that will serve a person from cradle to grave. The software allows parents to pre-populate "wisdom, knowledge, information and data" (WKID) including Family values, Pictures, Family History, Social Security Numbers, inheritance information, financial holdings etc. into the appropriate TAO Sub Folder. This transfer of KID will allow for tacit information to be explicitly transferred in an efficient and meaningful fashion. This can be critical in the event of a sudden divorce or death in the family. The child carries the parent's values, history, guidance, KID, and learns with them. The TAO Software allows parents or guardians to select what will be transferred from a menu of all of their COTA and TAO KID. Parents can synchronize changes to their TAO system to the child's TAO system on a daily basis to facilitate changes over time. For example, changes in a living will. This novel methodology allows the child to grow up with the TAO system. As the child begins to use the computer artwork, pictures, games, and other activities can be saved to their TAO Activities Sub Folders. This allows the child to retain important lessons from both their parents and their own life experiences. The strategic nature of the COTA and TAO systems allows for a structure that effectively predicts all of the KID that they will receive over the course of their life time. TAO and COTA software allow users to archive KID at appropriate times as the individual transitions from life experience to life experience. For example, College COTA Systems can be archived when an individual gets a job in the "real world".

The transition from TAO (Personal) to COTA (Professional) is also facilitated by the software. When individuals begin schooling they begin to enter information into the COTA Section because school is a stepping stone for vocational employment. So a person's life starts with the TAO module, graduates to the TAO-COTA (Education), TAO-COTA-(Real Job), and ends with TAO as the individual retires. TAO and COTA Software actually transcends the individual's life because their TAO section can be pre-populated before a child/grand child is born. Wisdom, Knowledge, Information, and Data can be downloaded to descendents before or after the individual dies. In this regard, COTA and TAO KID are completely novel. The real benefit is that the user can leverage KID that is located in an intuitive and easy to find place in their UKIDs system. The TAO module comes factory pre-populated with important optional lessons for each part of an individual's life. Lessons include all manner of KID relating to living a happy, healthy, and productive life. Customized modules can be purchased for specific lessons such as spirituality or specific or complex activities (concert pianist) etc. The COTA and TAO Software will dramatically improve the effectiveness and productivity of education in the world.

COTA Class (Grade School, High School, College, and Beyond)

Students often leave academic institutions and join the workforce with few real world document and project management skills. The role of a student doesn't adequately prepare them for the volume and complexity of corporate communications. Remarkably, educational institutions are not unlike commercial enterprises in their complete lack of concern about their student's organizational skills and learning skills. This is stunning when we consider that the dissemination of knowledge is an educator's primary responsibility. How many brilliant discoveries, ideas, or research projects have slipped away because an individual lacked the ability keep track of their knowledge, information, and data??? Sadly, when students reach the "real world" they tend to mimic other co-workers who create sub-standard "on the fly" information systems. Enterprises resort to expensive and complex CRM style software packages that add layers of complexity to protect Knowledge, Information, and Data. This is a broken system that needs to be restructured.

COTA/TAO Class consists of a several educational modules that teach grade school, high school, college, adult, and corporate students how to effectively create and manage a world class LOCK System. The COTA Class below is designed for college-aged students. However, the basic methodology and structure of education would be very similar for all levels of students. The COTA Course could be taught in many ways but we are highlighting one particularly non-obvious method below. One version of COTA class contains but is not limited to the following curriculum:

(1) Week 1—Overview of Life: This module explores the structure of human life and demonstrates how COTA is reverse engineered from our own thought process. The Chart below demonstrates how the COTA and TAO buckets were originally created. Week 1 consists of a 10,000 foot view of Life and the long term benefits of COTA for students. Students are given the basic System, structure, and guidelines for using COTA and TAO.

(2) Week 2—Overview of Clients Section: This module consists of exercises that reveal the nature of Internal and External Client relations to the student. The class is broken into work teams and given exercises to determine the Primary, Secondary, and Tertiary Clients for an enterprise. The concept of return value is discussed throughout the course but is particularly emphasized in the Client section. Clients are defined as the people who provide or impact return value to the Team. A long term assignment involving the team's analysis and response to a particular Mock Client's needs begins at this time. The Team constructs its Client UKIDs system. This construction process continues throughout the assignment. A computer or teacher can begin e-mailing and mailing messages to the students who must process the information into the correct buckets.

(3) Week 3—Overview of Output: Students learn to define Output as more than, just products or services. Value Added Products and Services are also discussed in detail. Creating and Managing Output relative to Client's needs is discussed at length. E-mail and mail arrive that help the team differentiate between items that need to be stored under Client and items that need to be stored under Output.

(4) Week 4—Overview of Team Module: This section consists of 2-3 Mock meetings that are held to discuss the Team's Mission, Output, Clients, etc. The Mock meeting involves notes, rosters, agenda's action items, presentations, and other standard meeting materials. The Team learns how to manage this kind of information as a cohesive unit. Again, a computer program or teacher now begins to send Client, Output, and Team related information to the Team via Mail, E-Mail and even Voice Mail.

(5) Week 5—Overview of Admin.—This section teaches how things like a 401K statement, Resume, Travel and Expense Report should be stored. The Team now begins to receive information on all 4 COTA categories.

(6) Week 6-COTA TAO—The group takes one week to create personal TAO folders. This portion of the class is done individually because students are creating REAL TAO folders. The purpose of this is to make sure that all students have their personal affairs in order. Fun exercises are given to help students organize their personal lives.

(7) Week 7-8—Assignments—Assignments are now given out and the team begins to work on a MOCK project. They have to create matching team project folders and leverage the information that has been sent to them over the past 6 weeks.

(8) Weeks 9-10—Presentations: The Teams present their findings to the rest of the class. A computer or teacher grades the COTA structures created by the class and the quality of the team project folders that have been created.

(9) Weeks 10-12 Discussion of COTA and TAO—In the final 3 weeks of the class the teacher ties together the COTA concept with the free enterprise system. Students are asked to consider what kind of job they will be doing in the future. They COTA map their own future vocations and discuss how they will achieve success. How will they provide better Output to Clients to gain increased Return Value. How will they differentiate themselves from other employees. How do their Client populations break out? Are their subdivisions of any of the COTA categories. What is their strategy for moving through learning curves more rapidly? Examples of successful people including entrepreneurs, artists, and executives are given to help students visualize a mental model for success wrapped around the COTA System.

COTA Class also contains an overview of Work Life Balance Issues. COTA and TAO are perfect metaphors for the amount of effort, time and energy that one places on their personal vs. professional lives. COTA Work-Life Balance classes help users to balance their time between work and personal life.

Students may attend or purchase software that teaches how to use TAO throughout their lives. It also teaches the use of TAO as a method of KID management that transcends the lifetime of the individual.

COTA Organic Intelligence Software

Many IT researchers are currently working to develop systems that track the development of relationships between various pieces of information. They track the number of times a particular entity interacts with a particular virtual website or document. They track these "hits" and form a web of behavioral pathways. They search for patterns in those pathways and evaluate the patterns. They are trying to answer questions like "Where do people seek information and why?" "How could robots be trained to seek out and evaluate information or experiences in the future?" This process described above mimics the human thought process in that our experiences tend to create neural grooves in our brains. When nerves fire in a repeated direction these grooves are reinforced. Behavioral patterns can be imprinted in this fashion. Alcoholism is a primary example of a grooved in behavior. In general, people are creatures of habit because our brains tie together certain experiences and sensations into a collective series of behaviors. So IT Researchers are tracking KID pathways and behaviors in much the same way that neurologists and behavioral experts seek to understand how behaviors emerge. But what is lacking in the IT research is an acknowledgement of the need for a structural framework within which to evaluate the observed pathways. Such a framework should be based on a hierarchy of content and context based KID. In other words, merely tracking places that someone visits is not as important as knowing who they are and why they are making the trip. Knowing that a child ran downstairs in the morning is not as important as knowing that it is Christmas day and the child is running to open presents. The Context and content of the experience are what matters most. COTA Organic Intelligence Software provides this important link between the "Neural Pathways" Approach and the COTA Contextual Approach. We can clearly see that any useful robotic or artificial intelligence system will need to view the world not solely as a series of potential pathways but rather as a series of potential pathways with clear ramifications for the "I" or "Self" represented by that organism. Any robot navigating through the world will need to make decisions about where they need to go and what they need to do. If we want machines to behave in a useful and appropriate fashion then we need to share our structural outlook with them. COTA organic intelligence software provides a map of the human thought process for the expressed purpose of blending that structure with Neural Pathways approaches to form a superior understanding of human KID needs and behavior. The merging of these two organic approaches results in a superior ability to create entities with true artificial intelligence.

TAO Lock Box

Any information in COTA or TAO can be locked up with the use of a simple password that can be delivered via any means of password protection including alpha-numeric, eye scan, Voice recognition, etc.

TAO and COTA Games for Children

It is possible to begin teaching children about TAO at a very young age. All children intuitively understand that they are surrounded by Teams of People including Family and Friends. Children also understand that their days consist of Activities that usually involved teams of people. TAO Games are interactive games that help children to begin to place aspects of their lives into the three major sub-divisions of TAO. The TAO Game is a board game with a spinner and cards. Children spin the spinner and proceed that number of spaces. Colorful childhood activities are depicted on the board. As the child lands on a particular space on the board they draw a card. Each Card has a question regarding the TAO bucket into which a particular thing belongs. There are cards for family, friends, people, activities, and Organization and Administration. This simple game can be augmented with COTA cards for when the child enters school. The COTA Questions, if answered correctly are rewarded with certificates of achievement and money. The basic game is a metaphor for life that helps children to understand the transition between ages 1-5 (TAO) and ages 5 and older (TAO+COTA).

COTA TAO Life Balance Software

People often struggle to strike an adequate balance in and between their professional and personal responsibilities. This software calculates the time spent working on each aspect of the user's COTA and TAO Systems. It provides charts showing the individual's COTA TAO Life Balance. This software helps users to budget both their personal and professional time by using the COTA and TAO Flow Charts. Calculations of time and effort spent can be calculated and represented in numerical or graphical form. Graphical formats would involve depicting time as volume. An individual spending too much time on work vs. personal life would have an oversized COTA graphic. Workers who spend too much time on Admin or Clients would have these results reflected by a chart showing these categories to be oversized along with a numerical estimate of time spent on each category. The software could also be used to demonstrate what aspects of people's lives are considered to be Activities (fulfilling things that the person does) vs. Org. and Admin. (Necessary tasks that must be completed). Many people fail to enrich their lives with adequate activities and become unhappy. COTA TAO Life Balance Software helps them to evaluate the possible structural causes for unhappiness. They may be in a relationship with someone who views visiting relatives as an enjoyable activity while their partner views these visits as Organizational/Administrative. This would be caused by a disconnect within the relationship that could result in problems. COTA TAO Life Balance Software simply calculates and quantifies virtually all of life's actions into basic categories and then explores the relative time, energy and task commitment levels to each category.

Although described in the context of preferred embodiments, it should be realized that a number of modifications to these teachings may occur to one skilled in the art. By example, the teachings of this invention are not intended to be limited to storage of any specific information, that is, the invention is not intended to be utilized as only a system for storing paper and/or electronic documents. It should be appreciated that the present invention may be used for a more efficient and reliable means for storing and retrieving any information of interest to a particular user.

While the invention has been particularly shown and described with respect to preferred embodiments thereof, it will be understood by those skilled in the art that changes in form and details may be made therein without departing from the scope and spirit of the invention.

What is claimed is:

1. A system for storing knowledge, information and data (KID), comprising:

a plurality of sources of KID;

a plurality of receivers of KID from said plurality of sources; and a universal knowledge, information and data store (UKIDS), said UKIDS having a plurality of physical and logical levels and partitions for segregating and storing said KID in a priority-based and standardized scheme within said UKIDS, said priority based and standardized scheme includes a clustering of KID into a plurality of predefined personal and professional storage subsets for transferability between said receivers, extensibility across data store platforms within said UKIDS and scalability in understanding of said KID by each of said receivers, said predefined professional storage subsets cluster KID into said levels and partitions of an enterprise shell, a business unit shell, a division shell, departmental shell, team shell and an individual shell, said system further including rules and tools for configuring said UKIDS and for storing and accessing KID included therein;

said rules define methods for allocating KID within one of said plurality of predefined personal and professional storage subsets, for purging KID from said UKIDS, and for efficiently sharing and distributing KID between said receivers;

said tools include features and functions for presenting news and advertising of interest to said receivers, for identifying targeted storage locations within specific ones of said plurality of predefined personal and professional storage subsets, for backup and archiving KID and for securing KID in said UKIDS; and a first one of said physical and logical levels and partitions segregates and stores KID into one of said predefined personal storage subsets and said predefined professional storage subsets, said predefined personal storage subsets segregates and stores KID into a second one of said physical and logical levels including partitions of a TEAMS OF PEOPLE storage subset, an ACTIVITIES storage subset and an ORGANIZATION AND ADMINISTRATION storage subset, and predefined professional storage subsets segregates and stores KID into a plurality of second ones of said physical and logical levels, each of said plurality of second ones of said physical and logical levels including partitions of a CLIENTS storage subset, an OUTPUT storage subset, a TEAMS storage subset and an ADMINISTRATION storage subset, and each of said plurality of second ones of said physical and logical levels is one of said enterprise shell, said business unit shell, said division shell, said departmental shell, said team shell and said individual shell for said KID;

wherein said rules for allocating KID include;

eliminating software application default storage locations such that electronic KID is stored within one of said plurality of logical levels and partitions;

implementing one storage system spanning electronic and physical storage locations;

using said priority based and standardized scheme of said plurality of physical and logical levels and partitions to break ties when KID is placeable in more than one of said plurality of predefined personal and professional storage subsets;

using a general storage subset for storing KID that properly references more than one of said plurality of logical levels and partitions;

labeling all KID so as to include at least a date and a title thereof;

employing a numerical indication of priority within a subset label for a selected storage subset when said selected storage subset contains a relatively large number of KID subsets;

maximizing availability of icons representing subsets of said physical and logical levels and partitions to highlight pathways for locating KID;

when options for searching one subset of said plurality of physical and logical levels and partitions exceeds a predetermined number of KID storage locations, re-organizing said subset through sub-categorization;

arranging physical storage locations to reflect said priority based and standardized scheme of said plurality of physical and logical levels and partitions and consistently labeling said physical storage locations;

establishing guidelines for duration of KID storage in electronic and physical UKIDS storage means; and naming subset KID storage categories to describe content and context of the KID being stored therein.

2. The storage system of claim 1 wherein said TEAMS OF PEOPLE storage subset includes KID pertaining to family, friends, and other groups of person of interest to said receivers.

3. The storage system of claim 1 wherein said ACTIVITIES storage subset includes KID pertaining to vacations, sports, entertainment, spirituality, hobbies, and other activities.

4. The storage system of claim 1 wherein said ORGANIZATION AND ADMINISTRATION storage subset includes KID pertaining to home upkeep, bills and other financial concerns.

5. The storage system of claim 1 wherein said CLIENTS storage subset includes KID pertaining to philosophical groups of internal and external clients, customers, patrons, client projects, markets, key vendors, and sales territories.

6. The storage system of claim 1 wherein said OUTPUT storage subset includes KID pertaining to products, services, value added products and services, and any of the aforementioned offered to clients.

7. The storage system of claim 1 wherein said TEAMS storage subset includes KID pertaining to partnerships, collaborations, and any grouping of individuals that provide output to clients.

8. The storage system of claim 1 wherein said ADMINISTRATION storage subset includes KID pertaining to an operation and coordination of a business, business services, work flow and personnel, and non-core job responsibility.

9. The storage system of claim 1 wherein said plurality of physical and logical levels and partitions span a plurality of data storage platforms including electronic and hard-copy storage means.

10. The storage system of claim 9 wherein said electronic storage means includes computer hard drives, backup and recovery media and off-line storage media.

11. The storage system of claim 1 further including a graphical user interface that allows each of said receivers direct access to electronic stored KID within said logical levels and partitions of said UKIDS and to launch one or more of said tools.

12. The storage system of claim 11, wherein said graphical user interface allows each of said receivers to distribute KID to other of said receivers and to identify a targeted location for storing said KID within one of said plurality of physical and logical levels and partitions.

13. The storage system of claim 12 wherein said targeted storage location is comprised of a path for manual storage of said distributed KID within said physical and logical levels and partitions.

14. The storage system of claim 12 wherein said targeted storage location is comprised of at least a partially automated one of said tools such that, upon request, said distributed KID is automatically stored in a specified one of said physical and logical levels and partitions.

15. A storage management system, comprising:

a universal knowledge information and data store (UKIDS), said UKIDS having a plurality of physical and logical levels and partitions for segregating and storing knowledge, information and data (KID) in a priority-based and standardized scheme within said UKIDS, said priority based and standardized scheme includes a universal clustering of KID into a plurality of predefined personal and professional storage subsets for transferability between receivers of said KID, extensibility across data store platforms within said UKIDS and scalability in understanding of said KID by each of said receivers, said predefined professional storage subsets cluster KID into said levels and partitions of an enterprise shell, a business unit shell, a division shell, departmental shell, team shell and an individual shell, said system further including rules and tools for configuring said UKIDS and for storing and accessing KID included therein;

said rules define methods for allocating KID within one of said plurality of predefined personal and professional storage subsets, for purging KID from said UKIDS, and for efficiently sharing and distributing KID between said receivers;

said tools include features and functions for presenting news and advertising of interest to said receivers, for identifying targeted storage locations within specific ones of said plurality of predefined personal and professional storage subsets, for backup and archiving KID and for securing KID in said UKIDS; and a first one of said physical and logical levels and partitions segregates and stores KID into one of said predefined personal storage subsets and said predefined professional storage subsets, said predefined personal storage subsets segregates and stores KID into a second one of said physical and logical levels including partitions of a TEAMS OF PEOPLE storage subset, an ACTIVITIES storage subset and an ORGAN IZATION AND ADMINISTRATION storage subset, and predefined professional storage subsets segregates and stores KID into a plurality of second ones of said physical and logical levels, each of said plurality of second ones of said physical and logical levels including partitions of a CLIENTS storage subset, an OUTPUT storage subset, a TEAMS storage subset and an ADMINISTRATION storage subset, and each of said plurality of second ones of said physical and logical levels is one of said enterprise shell, said business unit shell, said division shell, said departmental shell, said team shell and said individual shell for said KID;

wherein said rules for allocating KID include:

eliminating software application default storage locations such that electronic KID is stored within one of said plurality of logical levels and partitions;

implementing one storage system spanning electronic and physical storage locations;

using said priority based and standardized scheme of said plurality of physical and logical levels and partitions to break ties when KID is placeable in more than one of said plurality of predefined personal and professional storage subsets;

using a general storage subset for storing KID that properly references more than one of said plurality of logical levels and partitions;

labeling all KID so as to include at least a date and a title thereof;

employing a numerical indication of priority within a subset label for a selected storage subset when said selected storage subset contains a relatively large number of KID subsets;

maximizing availability of icons representing subsets of said physical and logical levels and partitions to highlight pathways for locating KID;

when options for searching one subset of said plurality of physical and logical levels and partitions exceeds a predetermined number of KID storage locations, re-organizing said subset through sub-categorization;

arranging physical storage locations to reflect said priority based and standardized scheme of said plurality of physical and logical levels and partitions and consistently labeling said physical storage locations;

establishing guidelines for duration of KID storage in electronic and physical UKIDS storage means; and naming subset KID storage categories to describe content and context of the KID being stored therein.

16. The storage system of claim 1, wherein said rules for purging KID include, at a predetermined time period:
separating KID into a first category of KID that is needed, a second category of KID that is not needed but retained on hand, and a third category of KID that is not needed and not retained;
purging said third category; and
placing said second category into a long term storage location.

17. The storage system of claim 1, wherein said rules for purging KID include, when an employee leaves a position, providing a copy of said plurality of personal storage subsets to said employee, moving said plurality of personal storage subsets to a long term storage location, and purging said personal storage subsets from said UKIDS.

18. The storage system of claim 1, wherein said rules for sharing and distributing KID include:
prior to when an employee leaves a position, having said employee provide a successor employee a tour of said plurality of physical and logical levels and partitions within said UKIDS and identify important KID stored therein;
identifying to a recipient receiver a targeted location for storing distributed KID within one of said plurality of physical and logical levels and partitions; and
employing quantity reduction and content quality improvement goals for reducing a volume of distributed KID.

19. A system for storing knowledge, information and data (KID), comprising:
a plurality of sources of KID;
a plurality of receivers of KID from said plurality of sources; and
a universal knowledge, information and data store (UKIDS), said UKIDS having a plurality of physical and logical levels and partitions for segregating and storing said KID in a priority-based and standardized scheme within said UKIDS, said priority based and standardized scheme includes a clustering of KID into a plurality of predefined personal and professional storage subsets for transferability between said receivers, extensibility across data store platforms within said UKIDS and scalability in understanding of said KID by each of said receivers, said predefined professional storage subsets cluster KID into said levels and partitions of an enterprise shell, a business unit shell, a division shell, departmental shell, team shell and an individual shell, said system further including rules and tools for configuring said UKIDS and for storing and accessing KID included therein;

said rules define methods for allocating KID within one of said plurality of predefined professional storage subsets, for purging KID from said UKIDS, and for efficiently sharing and distributing KID between said receivers;

said tools include features and functions for presenting news and advertising of interest to said receivers, for identifying targeted storage locations within specific ones of said plurality of predefined professional storage subsets, for backup and archiving KID and for securing KID in said UKIDS; and a first one of said physical and logical levels and partitions segregates and stores KID into said personal storage subset and said plurality of predefined professional storage subsets, said plurality of predefined professional storage subsets segregates and stores KID into a plurality of second ones of said physical and logical levels, each of said plurality of second ones of said physical and logical levels including partitions of a CLIENTS storage subset, an OUTPUT storage subset, a TEAMS storage subset and an ADMINISTRATION storage subset, and each of said plurality of second ones of said physical and logical levels is one of said enterprise shell, said business unit shell, said division shell, said departmental shell, said team shell and said individual shell for said KID;

wherein said rules for allocating KID include:
eliminating software application default storage locations such that electronic KID is stored within one of said plurality of logical levels and partitions;
implementing one storage system spanning electronic and physical storage locations;
using said priority based and standardized scheme of said plurality of physical and logical levels and partitions to break ties when KID is placeable in more than one of said plurality of predefined personal and professional storage subsets;
using a general storage subset for storing KID that properly references more than one of said plurality of logical levels and partitions;
labeling all KID so as to include at least a date and a title thereof;
employing a numerical indication of priority within a subset label for a selected storage subset when said selected storage subset contains a relatively large number of KID subsets;
maximizing availability of icons representing subsets of said physical and logical levels and partitions to highlight pathways for locating KID;
when options for searching one subset of said plurality of physical and logical levels and partitions exceeds a predetermined number of KID storage locations, re-organizing said subset through sub-categorization;
arranging physical storage locations to reflect said priority based and standardized scheme of said plurality of physical and logical levels and partitions and consistently labeling said physical storage locations;
establishing guidelines for duration of KID storage in electronic and physical UKIDS storage means; and
naming subset KID storage categories to describe content and context of the KID being stored therein.

* * * * *